United States Patent
Takeyama et al.

(10) Patent No.: US 7,236,294 B2
(45) Date of Patent: Jun. 26, 2007

(54) OPTICAL AMPLIFIER

(75) Inventors: Tomoaki Takeyama, Kawasaki (JP);
 Shinya Inagaki, Kawasaki (JP);
 Yoshihito Onoda, Kawasaki (JP);
 Takashi Shimizu, Kawasaki (JP);
 Keiko Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/069,015

(22) Filed: Mar. 2, 2005

(65) Prior Publication Data

US 2005/0146782 A1 Jul. 7, 2005

Related U.S. Application Data

(63) Continuation of application No. PCT/JP03/10921, filed on Aug. 28, 2003.

(30) Foreign Application Priority Data

Feb. 3, 2003 (JP) .............................. 2003-025740

(51) Int. Cl.
 *H01S 3/00* (2006.01)
(52) U.S. Cl. ............... 359/337; 359/337.13; 359/337.4
(58) Field of Classification Search ............. 359/337.1, 359/337.4, 337.12, 337.13, 337
 See application file for complete search history.

(56) References Cited

U.S. PATENT DOCUMENTS

| 6,055,092 | A | 4/2000 | Sugaya et al. |
| 6,333,807 | B1 | 12/2001 | Hatayama et al. |
| 6,650,467 | B2* | 11/2003 | Lee et al. ................. 359/337.4 |
| 6,697,189 | B2* | 2/2004 | Courtois et al. .......... 359/337.1 |
| 6,839,162 | B2* | 1/2005 | Sekiya et al. ............. 359/337.4 |
| 6,977,770 | B2* | 12/2005 | Komaki et al. ......... 359/337.11 |
| 7,034,993 | B2* | 4/2006 | Kajiya et al. ........... 359/337.13 |
| 2001/0003550 | A1 | 6/2001 | Yamaguchi |

FOREIGN PATENT DOCUMENTS

| JP | 09-214034 | 8/1997 |
| JP | 2000-004062 | 1/2000 |
| JP | 2001-094181 A | 4/2001 |

\* cited by examiner

*Primary Examiner*—Mark Hellner
(74) *Attorney, Agent, or Firm*—Staas & Halsey LLP

(57) ABSTRACT

A contrivance, if a WDM signal state changes, is to improve an optical transmission quality by compensating gain flatness. A first excitation control unit sets a first optical pumping light source unit to emit excitation power needed to get the same amplifying operating level of a first amplifying medium as at the time of a maximum wavelength count when allocating wavelengths after a change in wavelength count at an equal interval in a wavelength range. A wavelength allocation bias estimation unit compares a present monitor value of optical power after outputting of a gain equalizer 13 with wavelength equi-allocation power associated with the recognized wavelength count, and thus estimates a wavelength allocation bias occurred as a concomitant of the change in the wavelength count. A primary gradient calculation unit obtains a primary gradient quantity defines as a gain deviation from the wavelength allocation bias. A second excitation control unit sets, in a second optical pumping light source unit, the excitation power needed to cancel the primary gradient quantity. An attenuation quantity control unit controls a variable optical attenuator to fix a gain by compensating an amount of change in the sum of gains.

21 Claims, 35 Drawing Sheets

OPTICAL AMPLIFIER

CROSS REFERENCE TO RELATED APPLICATIONS

This is a continuing application, filed under 35 U.S.C. §111 (a), of International Application PCT/JP03/10921, filed Aug. 28, 2003.

BACKGROUND OF THE INVENTION

The present invention relates an optical amplifying device, and more particularly to an optical amplifying device for amplifying a WDM (Wavelength Division Multiplex) optical signal.

Over the recent years, with developments of the Internet technologies, there has been a great leap in demands for information services, and a larger capacity and a more flexible network configuration are required of an optical transmission system in a backbone system.

There is WDM (Wavelength Division Multiplex) as a most effective transmission technology that responds to such a system demand. The WDM is defined as a transmission method of multiplexing fluxes of light having different wavelengths and simultaneously transmitting a plurality of signals via a single optical fiber, and its commercialization is now underway as centralized in North America.

On the other hand, an EDFA (Erbium-Doped Fiber Amplifier) is given as a key component for actualizing the WDM system. The EDFA is an optical amplifier capable of amplifying batchwise the wavelength-division-multiplexed optical signals by utilizing a wide gain band, wherein an Erbium ($Er^{3+}$) doped fiber (EDF: Erbium-Doped Fiber) is used as a medium for amplification (the EDFA is capable of the wavelength-division-multiplexing amplification that is on the order of approximately 88 waves in, e.g., C-band).

An optical repeater for the WDM transmission generally takes a configuration in which the EDFAs are connected at multi-stages. Further, the EDFA has a gain wavelength characteristic. Therefore, it is of importance to flatten the gain wavelength characteristic within the signal band by equalizing the gains in a way that controls a sum of gains of the EDFAs at the respective stages into a fixed value in order to reduce both a scatter of peak power of each wavelength after the WDM transmission and S/N (Signal-to-Noise) deterioration.

FIG. 16 is a view showing a control image of the gain equalization. A gain wavelength characteristic (the same loss wavelength characteristic as) opposed to EDF gain wavelength dependency, is necessary for flattening the gain of an EDFA 101. Accordingly, the gain is flattened by providing a gain equalizer 102 having the same loss wavelength characteristic as the EDF gain wavelength dependency.

Further, FIG. 20 is an explanatory view in the case of controlling the gain equalization by the multi-staged EDFAs. For flattening the wavelength characteristic of a sum of gains of an EDF 111 and of an EDF 112, the gain is flattened by providing the gain equalizer 102 having a loss characteristic opposed to the gain wavelength dependency of the sum of the EDF gains.

On the other hand, if an optical input level, etc. of the optical repeater fluctuates with the result that the sum of gains of the multi-staged EDFs deviates from a fixed value, the flatness is not kept, and a tilt (gradient) occurs. This leads to decreases in transmission distance and in transmission band.

FIG. 17 is a view showing a result of measuring the fluctuation in the gain wavelength characteristic. Supposing that the 2-staged EDFs are installed in one single optical repeater, let A be a gain of one EDF and B a gain of the other EDF, and the axis of ordinates indicates the gain wavelength characteristic fluctuation (dB), while the axis of abscissa indicates the wavelength (nm).

An input signal to the optical repeater has, for instance, 8 waves equally allocated in signal wavelength bands 1575 nm through 1610 nm, and total power is changed between −14 dBm and −6 dBm (a dynamic range is 8 dB), wherein an amount of change is measured from the gain wavelength characteristic at −10 dBm.

In the case of controlling so that a sum of gains becomes a fixed value, i.e., A+B=k (fixed) at −10 dBm, the flatness is kept. In other cases where the gain tilt (gradient) is not compensated, however, when the input signal power to the optical repeater changes from −14 dBm to −6 dBm, it is understood that the gradient of the gain wavelength characteristic changes to "positive" from "negative".

The occurrence of such a gain gradient induces deterioration of the transmission quality. Accordingly, the deterioration of the gain flatness has hitherto been compensated by performing the gain fixing control in a way that provides a variable optical attenuator (VOA) between the stages of the EDFs.

FIG. 18 is a diagram showing level diagrams of the optical amplification. Shown are optical levels of sections d1 through d3 in such a case that a VOA 114 is provided between the EDF 111 and the EDF 112 (an illustration of an optical pumping light source is omitted), and the optical signal is inputted from a left end of the EDF 111. Further, the level diagram when in a state 1 is depicted by a bold line, the level diagram when in a state 2 is drawn by a dotted line, and a level-overlapped portion is indicated by a fine solid line.

Supposing that A is the gain of the EDF 111 and B is the gain of the EDF 112, a desired amplifier gain G0 (a gain of the optical output) with no tilt shall be obtained when an attenuation quantity (a VOA set value) of the VOA 114 is v1 in the state 1. Thereafter, if the optical input level decreases from the state 1 down to the state 2, it is necessary to establish A+B=the fixed value in order not to cause the tilt in the desired amplifier gain G0. Hence, the relation "A+B=the fixed value" is kept as it is, and an amount of level fluctuation is adjusted by setting the VOA set value of the VOA 114 to v2 (the attenuation quantity is decreased), thereby obtaining the same amplifier gain G0 as in the state 1.

A conventional gain control using the VOA is that the deterioration of the gain flatness is compensated by providing a plurality of VOAs for every wavelength so as to fix the output level of the optical signal demultiplexed by a demultiplexer (e.g., Patent Document 1).

Further, as shown in FIG. 21, there is proposed a device contrived to obtain a fixed gain by applying gain fixing control at an input and an output of the EDFA (e.g., Patent Document 2). Moreover, as shown in FIG. 22, a method of applying the gain fixing control at each stage of the EDF (e.g., Patent Document 3).

Patent Document 1

Japanese Patent Application Laid-Open Publication No.2000-004062 (Paragraph No. [0020]–[0022], FIG. 1)

Patent Document 2

International Publication W001/005005 (pp. 11–12, FIG. 1)

Patent Document 3

Japanese Patent Application Laid-Open Publication No.8-248455 (Paragraph No. [0031]–[0032], FIG. 1)

SUMMARY OF THE INVENTION

The conventional gain flatness compensating technology using the VOA is based on the premise that a WDM signal state is fixed (a wavelength count (the number of wavelengths) or wavelength allocation is fixed without any change), or alternatively a large change does not occur. If the wavelength count or the wavelength allocation changes, however, a change occurs in the effect of the non-linear phenomenon appearing in the EDF with the result that a gain wavelength characteristic (profile) gets deformed. Consequently, a gain deviation is caused, and there arises such a problem that the gain flatness is not compensated according to the prior art that does not take the change in the wavelength count or the wavelength allocation into consideration.

Herein, the non-linear phenomenon appearing in the EDF is exemplified by SHB (Spectral Hole Burning) and ESA (Excited State on Absorption).

The SHB is a phenomenon in which carriers (a generic name for electrons and halls) become short of a carrier having a level in a position corresponding to a signal wavelength due to a rise in optical intensity, a gain in this area is restrained, and there occurs a state as if a gain spectrum is holed. This hole is gradually filled up through a dispersion process in which the carrier gets involved, and the gain spectral form is thus recovered. The non-linear phenomenon, however, appears because of being unable to follow up with a change in photoelectric field having a speed equal to or higher than this recovery time.

Further, the ESA is defined as a phenomenon in which when a rare earth ion such as Erbium ($Er^{3+}$), when in an excited state (exhibiting high energy), transits to the excited state exhibiting the higher energy if consecutively absorbing incident light. Note that if there occurs radiant relaxation (which connotes that photons having the energy equal to an energy difference between states are emitted when returning to the low energy state from the high energy state) from the excited state exhibiting the higher energy, it follows that the light having a shorter wavelength (the higher energy) than a wavelength of the incident light is emitted.

FIG. 19 is a diagram showing a result of measuring a gain deviation caused due to the non-linear phenomenon. The axis of ordinates indicates a gain deviation (dB), wherein it herein shows the deviation from an average gain when inputting 40 waves. The axis of abscissa indicates a wavelength (nm).

In a conventional optical repeater designed so as not to have the gain deviation in a case where a wavelength multiplexing count of the WDM signal is 40 waves, and the respective wavelengths are allocated at an equal interval, when inputting the WDM signal of which the wavelength multiplexing count is set to 8 waves, wherein 1 wave is allocated on a short wavelength side, and 7 waves are allocated on a long wavelength side, a gain deviation expressed by a primary gradient quantity k as shown in FIG. 19 is caused. This type of peak-to-peak gain deviation (the primary gradient quantity k) due to the non-linear phenomenon such as the SHB, etc. increases when the wavelengths existing at both ends of a wavelength range are inputted. Especially the primary gradient quantity k becomes more conspicuous with a smaller wavelength count on the short wavelength side and with a larger wavelength count on the long wavelength side.

Thus, in the conventional optical repeater designed to compensate the gain deviation on the premise that the WDM signal state is fixed or is not largely fluctuated, if there occurs the state fluctuation involving a large change in the wavelength allocation bias as a concomitant of a change in the wavelength count as shown in FIG. 19, it follows that the gain deviation occurs due to the non-linear phenomenon such as the SHB, etc. Therefore, the gain flatness can not be compensated, and a transmission quality is deteriorated (i.e., even when restraining the gain deviation by use of the VOA to establish the relation "A+B=fixed value", if the WDM signal state largely changes, a new gain deviation occurs due to the effect of the non-linear phenomenon such as the SHB, etc. under the conventional gain fixing control).

Further, in the case of the EDFA having 40 waves at the maximum, though the signal wavelength count might change arbitrarily in time from 1 wave up to 40 waves, it is desirable that the gain is invariably fixed without depending on this wavelength increment/decrement setting. In fact, however, a gain of channel unrelated to the increment/decrement setting fluctuates at a speed that is on the order of milli second or under when effecting the wavelength increment/decrement setting. In a system including the EDFAs connected at multi-stages, the gain fluctuations are accumulated simply corresponding to the number of stages of the amplifiers, and hence a receiving error instantaneously occurs in an O/E receiver.

The present application puts a further focus on main two points among factors of the gain fluctuation as a concomitant of the wavelength increment/decrement setting.

A first point is that the gain fluctuates when performing the wavelength increment/decrement setting from 40 waves to a smaller wavelength count as an optimum ASE (Amplified Spontaneous Emission) correction value differs according to ch at the time of the small wavelength count, particularly at the time of 1 wave.

FIG. 23(a) is a diagram showing level diagrams of the optical amplification. Shown are optical levels of sections d1 through d3 in such a case that a VOA 114 is provided between an EDF 111 and an EDF 112 (an illustration of an optical pumping light source is omitted), and the optical signal is inputted from a left end of the EDF 111. This optical level can be measured by reading the power branched off at a coupler in each portion by use of the PD. In FIG. 23(a), a solid line La represents the optical level when effecting the wavelength increment/decrement setting from 40 waves to 1 wave.

Thus, when performing the wavelength increment/decrement setting from 40 waves to 1 wave, this wavelength gain becomes lower than a specified gain by dint of influence of the ASE as shown in FIG. 23(b).

This is because when conducting the gain fixing control so that the output comes to the specified value, the output contains the ASE as well as the signal component. If in the case of amplifying the signal having 40 waves, the ASE is small for the signal component, and hence a target gain is acquired even by executing the gain fixing control with the output including the ASE. When effecting the wavelength increment/decrement setting down to 1 wave, however, a ratio of the ASE to the signal component increases (e.g., approximately 1:1), and, when conducting the gain fixing control with the output including the ASE, the signal gain decreases (down by, e.g., 3 dB) as shown in FIG. 23(b).

For preventing this, if small of the number of input waves, especially at the time of 1 wave, a target value of the gain has hitherto been so controlled as to be raised (padded) as indicated by a dotted line in FIG. 23(a), thereby obtaining the specified gain as in FIG. 23(c). This padded quantity is called an ASE correction quantity.

This optimum ASE correction quantity at the time of 1 wave differs in terms of the primary gradient according to the wavelength (ch) of the optical signal as illustrated in FIG. 24. Particularly in the EDFA having a large gain, the ASE correction quantity itself rises, and ch dependency of the ASE correction quantity becomes unignorable. The EDFA is unable to obtain ch-number information from outside, and hence there has hitherto been no alternative but to apply the uniform ASE correction quantity without depending on ch. As a result, it follows that the ch dependency of the gain is retained at the time of 1 wave.

For the reason elucidated above, the gain fluctuation occurs when making the wavelength increment/decrement setting from 40 waves to 1 wave with respect to ch with the 1-wave gain deviating away from the specified gain.

A second point is a gain wavelength characteristic occurred in a case where an optical component or an EDF length deviates at the time of 40 waves and also occurred when effecting the increment/decrement setting from 40 waves down to a small wavelength count as derived from the primary-gradient-wise gain wavelength characteristic.

For example, the EDFA having the primary gradient of the gain at the time of 40 waves as in FIG. 25 and subjected to the fixing control to get an average gain of 27.7 dB, controls to fix a sum of gains with 1 wave when making the increment/decrement setting from 40 waves to 1 wave, and therefore the gain fluctuates by 0.5 dB at the maximum. Namely, a signal of 1ch is controlled at 28.2 dB at the time of 40 waves and decreases by 0.5 dB down to 27.7 dB when making the increment/decrement setting to 1 wave, resulting in occurrence of a receiving error.

It is an object of the present invention, which was devised in view of the points described above, to provide an optical amplifying device contrived to improve an optical transmission quality by compensating gain flatness even for a fluctuation in WDM signal state.

An optical amplifying device according to the present invention adopts the following configurations.

(1) An optical amplifying device amplifying a WDM optical signal comprises a first gain block constructed of a first amplifying medium doped with an active substance for optical amplification and of a first optical pumping light source unit for emitting excitation light, the first gain block serving to effect the optical amplification, a second gain block constructed of a second amplifying medium doped with an active substance for the optical amplification and of a second optical pumping light source unit emitting the excitation light, the second gain block serving to effect the optical amplification, a gain equalizer for, in the case of exciting the first optical pumping light source unit by excitation power serving as an amplification operating level of the first amplifying medium at the time of a maximum wavelength count of the optical signal, monotonically increasing or decreasing a gain wavelength characteristic of the optical signal outputted from the first gain block, a variable optical attenuator, disposed between the first gain block and the second gain block, fixing a gain by adjusting an optical attenuation quantity based on an attenuation quantity setting signal, a first excitation control unit generating a piece of wavelength count information by recognizing a wavelength count from power of the optical signal to be inputted and for, if there is a change in the wavelength count, setting the first optical pumping light source unit to emit the excitation power needed to get the same amplifying operating level of the first amplifying medium as at the time of the maximum wavelength count when allocating wavelengths after the change in the wavelength count at an equal interval in a wavelength range, a wavelength allocation bias estimation unit previously storing wavelength equi-allocation power of the optical signal when allocating the wavelengths after the change in the wavelength count at the equal interval in the wavelength range, recognizing the wavelength count based on the wavelength count information, comparing a present monitor value of the optical power after outputting of the gain equalizer with the wavelength equi-allocation power associated with the recognized wavelength count, and thus estimating a wavelength allocation bias occurred as a concomitant of the change in the wavelength count, a primary gradient quantity calculation unit obtaining a primary gradient quantity defined as a gain deviation from the wavelength allocation bias, a second excitation control unit setting, in the second optical pumping light source unit, the excitation power required for canceling the primary gradient quantity, and changing a sum of gains of the first gain block and of the second gain block, and an attenuation quantity control unit controlling the variable optical attenuator by obtaining an optical attenuation quantity that should be adjusted from the present monitor value and outputting the attenuation quantity setting signal to fix the gain in a way that compensates an amount of change in the sum of gains.

(2) In an optical amplifying device according to (1), gain forms of the first gain block and of the second gain block are previously set, and a gain wavelength characteristic at an output stage of the gain equalizer is monotonically increased or decreased.

(3) An optical amplifying device amplifying a WDM optical signal comprises a first gain block constructed of a first amplifying medium doped with an active substance for optical amplification and of a first optical pumping light source unit for emitting excitation light, the first gain block serving to effect the optical amplification, a second gain block constructed of a second amplifying medium doped with an active substance for the optical amplification and of a second optical pumping light source unit for emitting the excitation light, the second gain block serving to effect the optical amplification, a gain equalizer executing a wavelength equalizing process of an optical signal outputted from the first gain block, a filter for, in the case of exciting the first optical pumping light source unit by excitation power serving as an amplification operating level of the first amplifying medium at the time of a maximum wavelength count of the optical signal, monotonically increasing or decreasing a gain wavelength characteristic of the optical signal outputted from the gain equalizer via the first gain block, a variable optical attenuator, disposed between the first gain block and the second gain block, fixing a gain by adjusting an optical attenuation quantity based on an attenuation quantity setting signal, a first excitation control unit generating a piece of wavelength count information by recognizing a wavelength count from power of the optical signal to be inputted and for, if there is a change in the wavelength count, setting the first optical pumping light source unit to emit the excitation power needed to get the same amplifying operating level of the first amplifying medium as at the time of the maximum wavelength count when allocating wavelengths after the change in the wavelength count at an equal interval in a wavelength range, a wavelength allocation bias estimation unit previously storing wavelength equi-allocation power of the optical signal when allocating the wavelengths after the change in the wavelength count at the equal interval in the wavelength range, recognizing the wavelength count based on the wavelength count information, comparing a present monitor value of the optical power after outputting of the filter with the wavelength equi-allocation power associated with the recognized wavelength count, and thus estimating a wavelength allocation bias occurred as a concomitant of the change in the wavelength count, a primary gradient quantity calculation unit obtaining a primary gradient quantity defined as a gain deviation from the wavelength allocation bias, a second excitation control unit setting, in the second optical pumping light source unit, the excitation power required for canceling the primary gradient quantity, and changing a sum of gains of the first gain block and of the second gain block, and an attenuation quantity control unit controlling the variable optical attenuator by obtaining an optical attenuation quantity that should be adjusted from the present monitor value and outputting the attenuation quantity setting signal to fix the gain in a way that compensates an amount of change in the sum of gains.

(4) An optical amplifying device amplifying a WDM optical signal comprises a first gain block constructed of a first amplifying medium doped with an active substance for optical amplification and of a first optical pumping light source unit for emitting excitation light, the first gain block serving to effect the optical amplification, a second gain block constructed of a second amplifying medium doped with an active substance for the optical amplification and of a second optical pumping light source unit for emitting the excitation light, the second gain block serving to effect the optical amplification, a gain equalizer for, in the case of exciting the first optical pumping light source unit by excitation power serving as an amplification operating level of the first amplifying medium at the time of a maximum wavelength count of the optical signal, monotonically increasing or decreasing a gain wavelength characteristic of the optical signal outputted from the first gain block, a variable optical attenuator, disposed between the first gain block and the second gain block, fixing a gain by adjusting an optical attenuation quantity based on an attenuation quantity setting signal, a first excitation control unit causing the first optical pumping light source unit to emit such excitation power as to fix a monitor value with respect to the optical signal outputted from the first gain block, a wavelength allocation bias estimation unit recognizing a wavelength count from power of the optical signal to be inputted and for, if there is a change in the wavelength count, setting, as reference excitation power, the excitation power needed to get the same amplifying operating level of the first amplifying medium as at the time of the maximum wavelength count when allocating wavelengths after the change in the wavelength count at an equal interval in a wavelength range, comparing such monitor value fixing excitation power of excitation light as to fix the monitor value with the reference excitation power, and thus estimating a wavelength allocation bias occurred as a concomitant of the change in the wavelength count, a primary gradient quantity calculation unit obtaining a primary gradient quantity defined as a gain deviation from the wavelength allocation bias, a second excitation control unit setting, in the second optical pumping light source unit, the excitation power required for canceling the primary gradient quantity, and changing a sum of gains of the first gain block and of the second gain block, and an attenuation quantity control unit controlling the variable optical attenuator by obtaining an optical attenuation quantity that should be adjusted from the monitor value fixing excitation power and outputting the attenuation quantity setting signal to fix the gain in a way that compensates an amount of change in the sum of gains.

(5) In an optical amplifying device according to (4), gain forms of the first gain block and of the second gain block are previously set, and a gain wavelength characteristic at an output stage of the gain equalizer is monotonically increased or decreased.

(6) An optical amplifying device amplifying a WDM optical signal comprises a first gain block constructed of a first amplifying medium doped with an active substance for optical amplification and of a first optical pumping light source unit for emitting excitation light, the first gain block serving to effect the optical amplification, a second gain block constructed of a second amplifying medium doped with an active substance for the optical amplification and of a second optical pumping light source unit for emitting the excitation light, the second gain block serving to effect the optical amplification, a gain equalizer for executing a wavelength equalizing process of an optical signal outputted from the first gain block, a filter for, in the case of exciting the first optical pumping light source unit by excitation power serving as an amplification operating level of the first amplifying medium at the time of a maximum wavelength count of the optical signal, monotonically increasing or decreasing a gain wavelength characteristic of the optical signal outputted from the gain equalizer via the first gain block, a variable optical attenuator, disposed between the first gain block and the second gain block, fixing a gain by adjusting an optical attenuation quantity based on an attenuation quantity setting signal, a first excitation control unit causing the first optical pumping light source unit to emit such excitation light as to fix a monitor value with respect to the optical signal outputted from the first gain block, a wavelength allocation bias estimation unit recognizing a wavelength count from power of the optical signal to be inputted and for, if there is a change in the wavelength count, setting, as reference excitation power, the excitation power needed to get the same amplifying operating level of the first amplifying medium as at the time of the maximum wavelength count when allocating wavelengths after the change in the wavelength count at an equal interval in a wavelength range, comparing such monitor value fixing excitation power of excitation light as to fix the monitor value with the reference excitation power, and thus estimating a wavelength allocation bias occurred as a concomitant of the change in the wavelength count, a primary gradient quantity calculation unit obtaining a primary gradient quantity defined as a gain deviation from the wavelength allocation bias, a second excitation control unit setting, in the second optical pumping light source unit, the excitation power required for canceling the primary gradient quantity, and changing a sum of gains of the first gain block and of the second gain block, and an attenuation quantity control unit controlling the variable optical attenuator by obtaining an optical attenuation quantity that should be adjusted from the monitor value fixing excitation power and outputting the attenuation quantity setting signal to fix the gain in a way that compensates an amount of change in the sum of gains.

(7) A gain control method of controlling a gain of an optical signal when in WDM transmission, with respect to a first gain block constructed of a first amplifying medium doped with an active substance for optical amplification and of a first optical pumping light source unit for emitting excitation light and serving to effect the optical amplification, and with respect to a second gain block constructed of a second amplifying medium doped with an active substance for the optical amplification and of a second optical pumping light source unit for emitting the excitation light and serving to effect the optical amplification, comprises monotonically increasing or decreasing a gain wavelength characteristic of the optical signal outputted from the first gain block by use a gain equalizer in the case of exciting the first optical pumping light source unit by excitation power serving as an amplification operating level of the first amplifying medium at the time of a maximum wavelength count of the optical signal, generating a piece of wavelength count information by recognizing a wavelength count from power of the optical signal to be inputted and, if there is a change in the wavelength count, setting the first optical pumping light source unit to emit the excitation power needed to get the same amplifying operating level of the first amplifying medium as at the time of the maximum wavelength count when allocating wavelengths after the change in the wavelength count at an equal interval in a wavelength range, previously storing wavelength equi-allocation power of the optical signal when allocating the wavelengths after the change in the wavelength count at the equal interval in the wavelength range, recognizing the wavelength count based on the wavelength count information, comparing a present monitor value of the optical power after outputting of the gain equalizer with the wavelength equi-allocation power associated with the recognized wavelength count, and thus estimating a wavelength allocation bias occurred as a concomitant of the change in the wavelength count, obtaining a primary gradient quantity defined as a gain deviation from the wavelength allocation bias, setting, in the second optical pumping light source unit, the excitation power required canceling the primary gradient quantity and changing a sum of gains of the first gain block and of the second gain block, and disposing a variable optical attenuator between the first gain block and the second gain block, and controlling the variable optical attenuator by obtaining an optical attenuation quantity that should be adjusted from the present monitor value to fix the gain in a way that compensates an amount of change in the sum of gains.

(8) A gain control method of controlling a gain of an optical signal when in WDM transmission, with respect to a first gain block constructed of a first amplifying medium doped with an active substance for optical amplification and of a first optical pumping light source unit for emitting excitation light and serving to effect the optical amplification, and with respect to a second gain block constructed of a second amplifying medium doped with an active substance for the optical amplification and of a second optical pumping light source unit for emitting the excitation light and serving to effect the optical amplification, comprises monotonically increasing or decreasing a gain wavelength characteristic of the optical signal outputted from the first gain block by use a gain equalizer in the case of exciting the first optical pumping light source unit by excitation power serving as an amplification operating level of the first amplifying medium at the time of a maximum wavelength count of the optical signal, causing the first optical pumping light source unit to emit such excitation light as to fix the monitor value with respect to the optical signal outputted from the first gain block, recognizing a wavelength count from power of the optical signal to be inputted and for, if there is a change in the wavelength count, setting, as reference excitation power, the excitation power needed to get the same amplifying operating level of the first amplifying medium as at the time of the maximum wavelength count when allocating wavelengths after the change in the wavelength count at an equal interval in a wavelength range, comparing such monitor value fixing excitation power of excitation light as to fix the monitor value with the reference excitation power, and thus estimating a wavelength allocation bias occurred as a concomitant of the change in the wavelength count, obtaining a primary gradient quantity defined as a gain deviation from the wavelength allocation bias, setting, in the second optical pumping light source unit, the excitation power required for canceling the primary gradient quantity and changing a sum of gains of the first gain block and of the second gain block, and disposing a variable optical attenuator between the first gain block and the second gain block, and controlling the variable optical attenuator by obtaining an optical attenuation quantity that should be adjusted from the monitor value fixing excitation power and outputting the attenuation quantity setting signal to fix the gain in a way that compensates an amount of change in the sum of gains.

(9) An optical amplifying device amplifying a WDM optical signal comprises a first gain block constructed of a first amplifying medium doped with an active substance for optical amplification and of a first optical pumping light source unit for emitting excitation light, the first gain block serving to effect the optical amplification, a second gain block constructed of a second amplifying medium doped with an active substance for the optical amplification and of a second optical pumping light source unit for emitting the excitation light, the second gain block serving to effect the optical amplification, a gain equalizer for, in the case of exciting the first optical pumping light source unit by excitation power serving as an amplification operating level of the first amplifying medium at the time of a maximum wavelength count of the optical signal, monotonically increasing or decreasing a gain wavelength characteristic of the optical signal outputted from the first gain block, a first excitation control unit recognizing a wavelength count from power of the optical signal to be inputted and for, if there is a change in the wavelength count, setting the first optical pumping light source unit to emit the excitation power needed to get the same amplifying operating level of the first amplifying medium as at the time of the maximum wavelength count when allocating wavelengths after the change in the wavelength count at an equal interval in a wavelength range, a wavelength allocation bias estimation unit previously storing wavelength equi-allocation power of the optical signal when allocating the wavelengths after the change in the wavelength count at the equal interval in the wavelength range, recognizing the wavelength count based on the wavelength count information, comparing a monitor value of power of the optical signal outputted from the gain equalizer with the wavelength equi-allocation power associated with the recognized wavelength count, and thus estimating a wavelength allocation bias occurred as a concomitant of the change in the wavelength count, an ASE (Amplified Spontaneous Emission) correction quantity determining unit obtaining an ASE correction quantity from the wavelength allocation bias, and a second excitation control unit setting the second optical pumping light source unit to emit the excitation power required for executing the ASE correction based on the ASE correction quantity, and changing a sum of gains of the first gain block and of the second gain block.

(10) In an optical amplifying device according to (9), gain forms of the first gain block and of the second gain block are previously set, and a gain wavelength characteristic at an output stage of the gain equalizer is monotonically increased or decreased.

(11) An optical amplifying device amplifying a WDM optical signal comprises a first gain block constructed of a first amplifying medium doped with an active substance for optical amplification and of a first optical pumping light source unit for emitting excitation light, the first gain block serving to effect the optical amplification, a second gain block constructed of a second amplifying medium doped with an active substance for the optical amplification and of a second optical pumping light source unit for emitting the excitation light, the second gain block serving to effect the optical amplification, a gain equalizer executing a wavelength equalizing process of the optical signal outputted from the first gain block, a filter for, in the case of exciting the first optical pumping light source unit by excitation power serving as an amplification operating level of the first amplifying medium at the time of a maximum wavelength count of the optical signal, monotonically increasing or decreasing a gain wavelength characteristic of the optical signal outputted from the gain equalizer via the first gain block, a first excitation control unit recognizing a wavelength count from power of the optical signal to be inputted and for, if there is a change in the wavelength count, setting the first optical pumping light source unit to emit the excitation power needed to get the same amplifying operating level of the first amplifying medium as at the time of the maximum wavelength count when allocating wavelengths after the change in the wavelength count at an equal interval in a wavelength range, a wavelength allocation bias estimation unit previously storing wavelength equi-allocation power of the optical signal when allocating the wavelengths after the change in the wavelength count at the equal interval in the wavelength range, recognizing the wavelength count based on the wavelength count information, comparing a monitor value of power of the optical signal outputted from the filter with the wavelength equi-allocation power associated with the recognized wavelength count, and thus estimating a wavelength allocation bias occurred as a concomitant of the change in the wavelength count, an ASE correction quantity determining unit obtaining an ASE correction quantity from the wavelength allocation bias, and a second excitation control unit setting the second optical pumping light source unit to emit the excitation power required for executing the ASE correction based on the ASE correction quantity, and changing a sum of gains of the first gain block and of the second gain block.

(12) An optical amplifying device amplifying a WDM optical signal comprises a first gain block constructed of a first amplifying medium doped with an active substance for optical amplification and of a first optical pumping light source unit for emitting excitation light, the first gain block serving to effect the optical amplification, a second gain block constructed of a second amplifying medium doped with an active substance for the optical amplification and of a second optical pumping light source unit for emitting the excitation light, the second gain block serving to effect the optical amplification, a gain equalizer for, in the case of exciting the first optical pumping light source unit by excitation power serving as an amplification operating level of the first amplifying medium at the time of a maximum wavelength count of the optical signal, monotonically increasing or decreasing a gain wavelength characteristic of the optical signal outputted from the first gain block, a first excitation control unit controlling the first optical pumping light source unit to output monitor value fixing excitation power to fix the monitor value with respect to the optical signal outputted from the gain equalizer, a wavelength allocation bias estimation unit recognizing a wavelength count from power of the optical signal to be inputted and for, if there is a change in the wavelength count, setting, as reference excitation power, the excitation power needed to get the same amplifying operating level of the first amplifying medium as at the time of the maximum wavelength count when allocating wavelengths after the change in the wavelength count at an equal interval in a wavelength range, comparing the monitor value fixing power with the reference excitation power, and thus estimating a wavelength allocation bias occurred as a concomitant of the change in the wavelength count, an ASE correction quantity determining unit obtaining an ASE correction quantity from the wavelength allocation bias, and a second excitation control unit setting the second optical pumping light source unit to emit the excitation power required for executing the ASE correction based on the ASE correction quantity, and changing a sum of gains of the first gain block and of the second gain block.

(13) In an optical amplifying device according to (12), gain forms of the first gain block and of the second gain block are previously set, and a gain wavelength characteristic at an output stage of the gain equalizer is monotonically increased or decreased.

(14) An optical amplifying device according to any one of (9) through (13) further comprises a gain fluctuation determining unit previously storing a primary gradient characteristic occurred in an output and obtaining a quantity of the gain fluctuation from the wavelength allocation bias and from the primary gradient characteristic, wherein the second excitation control unit sets the second optical pumping light source unit to emit the excitation power necessary for restraining the gain fluctuation, and changes a sum of gains of the first gain block and of the second gain block.

(15) An optical amplifying device amplifying a WDM optical signal comprises a first gain block constructed of a first amplifying medium doped with an active substance for optical amplification and of a first optical pumping light source unit for emitting excitation light, the first gain block serving to effect the optical amplification, a second gain block constructed of a second amplifying medium doped with an active substance for the optical amplification and of a second optical pumping light source unit for emitting the excitation light, the second gain block serving to effect the optical amplification, a gain equalizer for, in the case of exciting the first optical pumping light source unit by excitation power serving as an amplification operating level of the first amplifying medium at the time of a maximum wavelength count of the optical signal, monotonically increasing or decreasing a gain wavelength characteristic of the optical signal outputted from the first gain block, a first excitation control unit recognizing a wavelength count from power of the optical signal to be inputted and for, if there is a change in the wavelength count, setting the first optical pumping light source unit to emit the excitation power needed to get the same amplifying operating level of the first amplifying medium as at the time of the maximum wavelength count when allocating wavelengths after the change in the wavelength count at an equal interval in a wavelength range, a wavelength allocation bias estimation unit previously storing wavelength equi-allocation power of the optical signal when allocating the wavelengths after the change in the wavelength count at the equal interval in the wavelength range, recognizing the wavelength count based on the wavelength count information, comparing a monitor value of power of the optical signal outputted from the gain equalizer with the wavelength equi-allocation power associated with the recognized wavelength count, and thus estimating a wavelength allocation bias occurred as a concomitant of the change in the wavelength count, a gain fluctuation determining unit previously storing a primary gradient characteristic occurred in an output and obtaining a quantity of the gain fluctuation from the wavelength allocation bias and from the primary gradient characteristic, and a second excitation control unit setting the second optical pumping light source unit to emit the excitation power necessary for restraining the gain fluctuation, and changing a sum of gains of the first gain block and of the second gain block.

(16) In an optical amplifying device according to (15), gain forms of the first gain block and of the second gain block are previously set, and a gain wavelength characteristic at an output stage of the gain equalizer is monotonically increased or decreased.

(17) An optical amplifying device amplifying a WDM optical signal comprises a first gain block constructed of a first amplifying medium doped with an active substance for optical amplification and of a first optical pumping light source unit for emitting excitation light, the first gain block serving to effect the optical amplification, a second gain block constructed of a second amplifying medium doped with an active substance for the optical amplification and of a second optical pumping light source unit for emitting the excitation light, the second gain block serving to effect the optical amplification, a gain equalizer executing a wavelength equalizing process of the optical signal outputted from the first gain block, a filter for, in the case of exciting the first optical pumping light source unit by excitation power serving as an amplification operating level of the first amplifying medium at the time of a maximum wavelength count of the optical signal, monotonically increasing or decreasing a gain wavelength characteristic of the optical signal outputted from the gain equalizer via the first gain block, a first excitation control unit recognizing a wavelength count from power of the optical signal to be inputted and for, if there is a change in the wavelength count, setting the first optical pumping light source unit to emit the excitation power needed to get the same amplifying operating level of the first amplifying medium as at the time of the maximum wavelength count when allocating wavelengths after the change in the wavelength count at an equal interval in a wavelength range, a wavelength allocation bias estimation unit previously storing wavelength equi-allocation power of the optical signal when allocating the wavelengths after the change in the wavelength count at the equal interval in the wavelength range, recognizing the wavelength count based on the wavelength count information, comparing a monitor value of power of the optical signal outputted from the filter with the wavelength equi-allocation power associated with the recognized wavelength count, and thus estimating a wavelength allocation bias occurred as a concomitant of the change in the wavelength count, a gain fluctuation determining unit previously storing a primary gradient characteristic occurred in an output and obtaining a quantity of the gain fluctuation from the wavelength allocation bias and from the primary gradient characteristic, and a second excitation control unit setting the second optical pumping light source unit to emit the excitation power necessary for restraining the gain fluctuation, and changing a sum of gains of the first gain block and of the second gain block.

(18) An optical amplifying device amplifying a WDM optical signal comprises a first gain block constructed of a first amplifying medium doped with an active substance for optical amplification and of a first optical pumping light source unit for emitting excitation light, the first gain block serving to effect the optical amplification, a second gain block constructed of a second amplifying medium doped with an active substance for the optical amplification and of a second optical pumping light source unit for emitting the excitation light, the second gain block serving to effect the optical amplification, a gain equalizer for, in the case of exciting the first optical pumping light source unit by excitation power serving as an amplification operating level of the first amplifying medium at the time of a maximum wavelength count of the optical signal, monotonically increasing or decreasing a gain wavelength characteristic of the optical signal outputted from the first gain block, a first excitation control unit controlling the first optical pumping light source unit to output monitor value fixing excitation power to fix the monitor value with respect to the optical signal outputted from the first gain block, a wavelength allocation bias estimation unit recognizing a wavelength count from power of the optical signal to be inputted and for, if there is a change in the wavelength count, setting, as reference excitation power, the excitation power needed to get the same amplifying operating level of the first amplifying medium as at the time of the maximum wavelength count when allocating wavelengths after the change in the wavelength count at an equal interval in a wavelength range, comparing the monitor value fixing power with the reference excitation power, and thus estimating a wavelength allocation bias occurred as a concomitant of the change in the wavelength count, a gain fluctuation determining unit previously storing a primary gradient characteristic occurred in an output and obtaining a quantity of the gain fluctuation from the wavelength allocation bias and from the primary gradient characteristic, and a second excitation control unit setting the second optical pumping light source unit to emit the excitation power necessary for restraining the gain fluctuation, and changing a sum of gains of the first gain block and of the second gain block.

(19) In an optical amplifying device according to (18), gain forms of the first gain block and of the second gain block are previously set, and a gain wavelength characteristic at an output stage of the gain equalizer is monotonically increased or decreased.

DETAILED DESCRIPTION OF THE PREFERRED EMBODIMENT

<First Embodiment>

Figure 1:
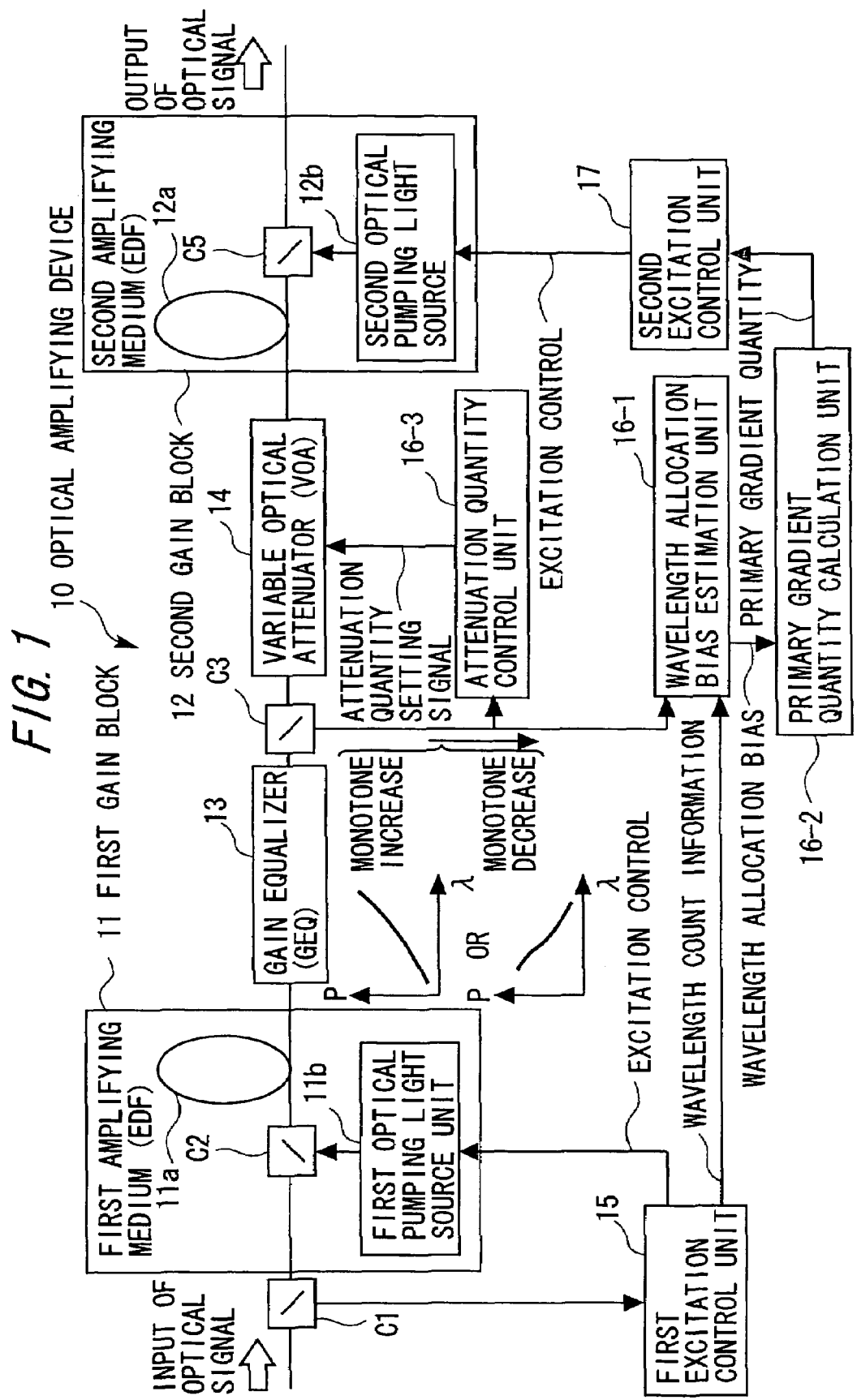
FIG. 1 is a view of a principle of an optical amplifying device of the present invention.

Embodiments of the present invention will hereinafter be described with reference to the drawings. FIG. 1 is a view of a principle of an optical amplifying device according to the present invention. An optical amplifying device 10 is a device for amplifying a WDM optical signal and is applied to an optical repeater in a WDM transmission system.

A first gain block 11 installed on an input side of the optical amplifying device 10 is an EDFA (Erbium-Doped Fiber Amplifier) constructed of a first amplifying medium 11a (which will hereinafter be termed an EDF 11a) in which an active substance such as erbium ($Er^{3+}$), etc. for optical amplification is doped, a first optical pumping source unit 11b for emitting excitation light, and a multiplexer C2. The first optical pumping source unit 11b emits the excitation light via the multiplexer C2 installed on the optical input side of the EDF 11a. The optical signal is thereby amplified.

A second gain block 12 installed on an output side of the optical amplifying device 10 is an EDFA constructed of a second amplifying medium 12a (which will hereinafter be termed an EDF 12a) in which the active substance such as erbium ($Er^{3+}$), etc. for the optical amplification is doped, a second optical pumping source unit 12b for emitting the excitation light, and a multiplexer C5. The second optical pumping source unit 12b emits the excitation light via the multiplexer C5 installed on the optical output side of the EDF 12a. The optical signal is thereby amplified.

Herein, it is known that in the case of exciting the EDF on the optical input side (a front side of the EDF), an NF (Noise Factor) as an amplifier characteristic is improved, and, in the case of exciting the EDF on the optical output side (a rear side of the EDF), an amplifying efficiency as an amplifier characteristic is improved. Normally, in the optical repeater, the improvement of the NF is required of the amplifier installed at the optical input stage, and the improvement of the amplifying efficiency is required of the amplifier installed at the optical output stage. Therefore, the excitation takes place from the front side of the EDF 11a in the first gain block 11, and the excitation takes place from the rear side of the EDF 12a in the second gain block 12.

Figure 16:
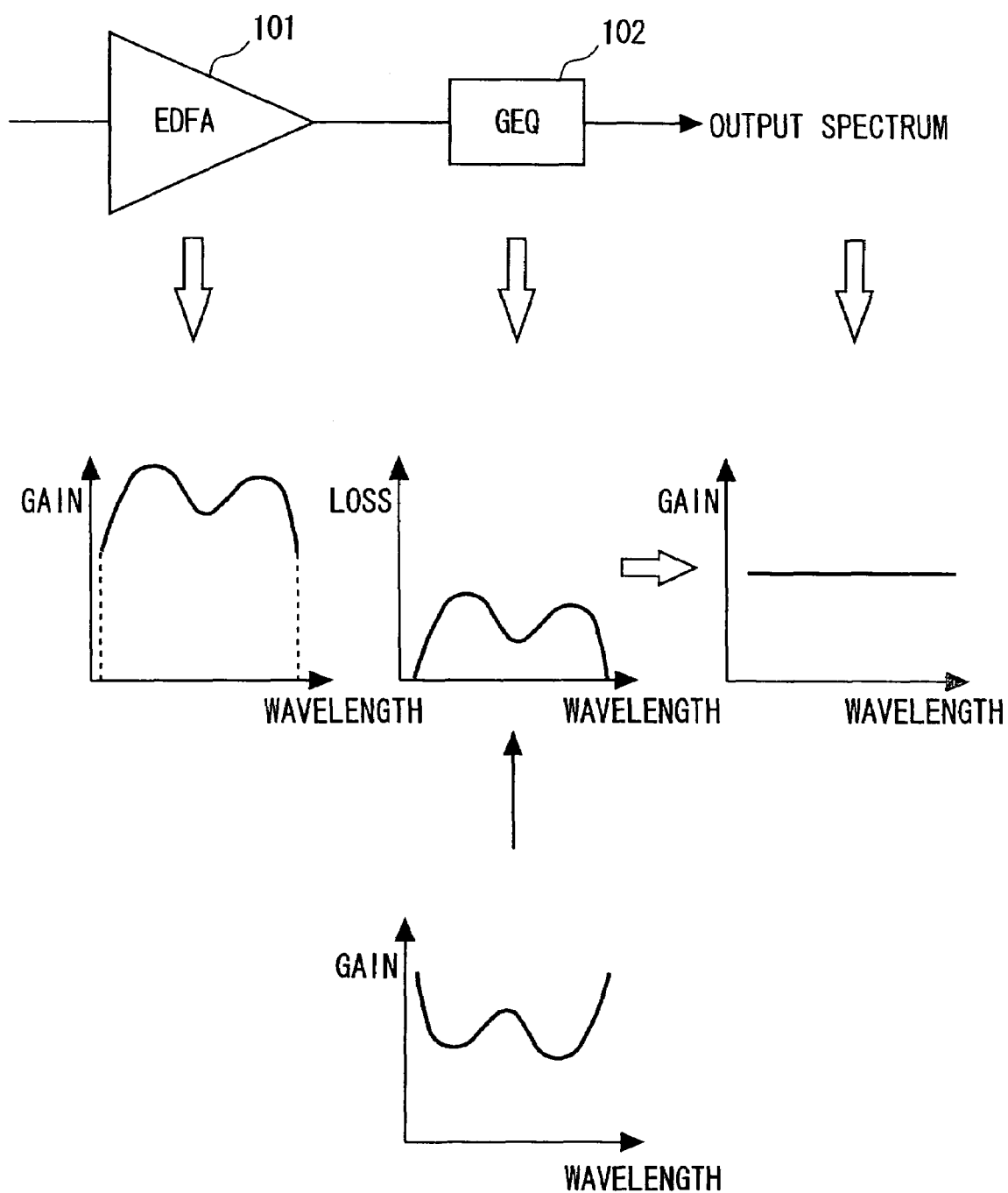
FIG. 16 is a diagram showing a control image of gain equalization.
Figure 17:
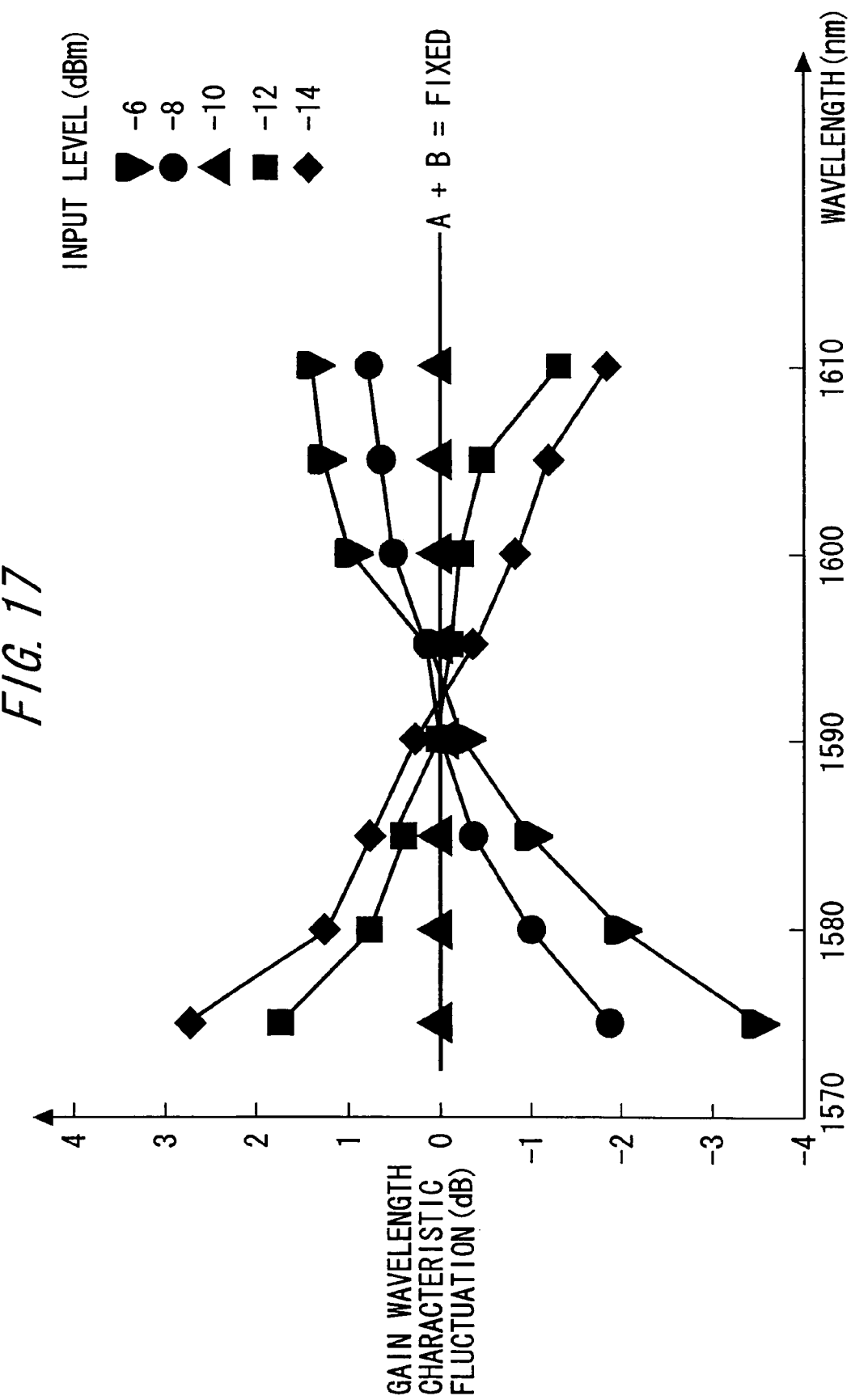
FIG. 17 is a diagram showing a result of measuring a fluctuation of the gain wavelength characteristic.
Figure 18:
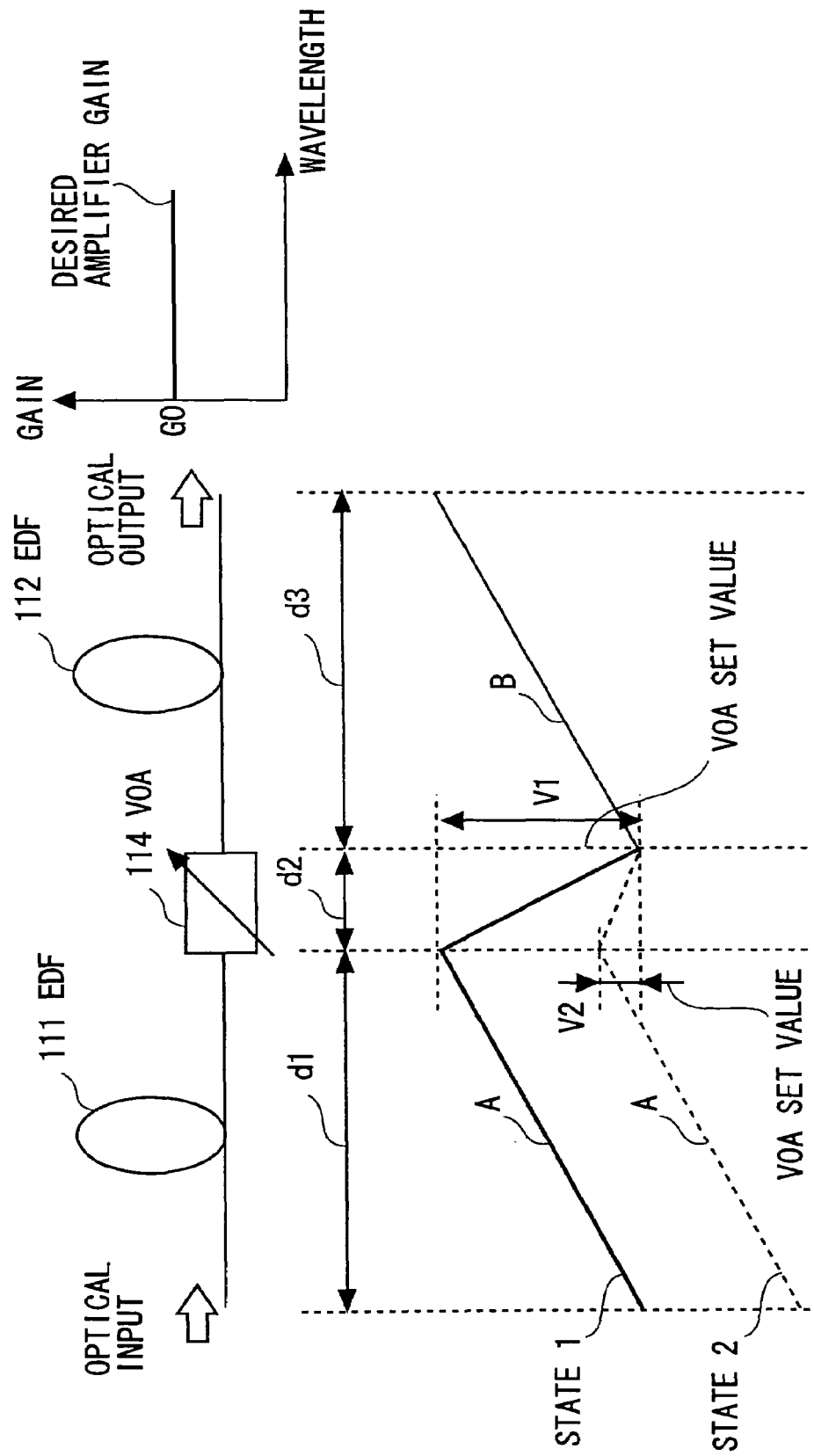
FIG. 18 is a diagram showing level diagrams of the optical amplification.

A wavelength equivalence unit 13 (which is also called a gain equalizer abbreviated hereinafter to the GEQ 13) equalizes wavelengths of the optical signals to be inputted, thereby equalizes gains of waveforms as shown in FIG. 16. Further, according to the present invention, when exciting the first optical pumping source unit 11b by excitation power serving as an amplifying operation level of the EDF 11a with respect to the WDM optical signal in which a maximum number of wavelengths (maximum wavelength count) is multiplexed, the GEQ 13 equalizes the gain so that a gain wavelength characteristic of the optical signal outputted from the first gain block 11 is monotonically increased or monotonically decreased (wherein the gain wavelength characteristic of the optical signal after being branched off at the coupler C3 therefore takes a form of the monotone increase or monotone decrease).

A variable optical attenuator 14 (which will hereinafter abbreviated to the VOA 14) is disposed between the first gain block 11 and the second gain block 12, and fixes the gain by adjusting an optical attenuation quantity on the basis of an attenuation quantity setting signal (i.e., the attenuation quantity is changed so as to acquire a desired amplification gain).

A first excitation control unit 15 receives the input optical signal via a coupler C1, recognizes a wavelength count from the power of the input optical signal and generates a piece of wavelength count information. Then, the first excitation control unit 15, if there is a change in the wavelength count, sets the first optical pumping light source unit 11b so as to emit the excitation power required to reach the amplifying operation level of the EDF 11a that is the same as the maximum wavelength count when allocating the wavelengths after the wavelength count change at an equal interval in a wavelength range (an optical signal band range) at the time of the maximum wavelength count.

A wavelength allocation bias (deviation) estimation unit 16-1 is previously stored with wavelength equi-allocation power of the optical signals when allocating the wavelengths at the equal interval after the change in the wavelength count in the wavelength range, recognizes the wavelength count on the basis of the wavelength count information when receiving the input optical signal via the coupler C3, and compares a present monitor value of the optical power after the outputting of the GEQ 13 with the wavelength equi-allocation power corresponding to the recognized wavelength count, thereby estimating a bias of the wavelength allocation that is caused as a concomitant of the change in the wavelength count.

A primary gradient quantity calculation unit 16-2 obtains a first gradient quantity defined as a gain bias from the bias of the wavelength allocation. A second excitation control unit 17 sets the excitation power needed to cancel the first gradient in the second optical pumping light source unit 12$b$, and changes a sum of the gains of the first gain block 11 and of the second gain block 12.

An attenuation quantity control unit 16-3 controls the VOA 14 by obtaining a should-be-adjusted optical attenuation quantity from the present monitor value (which is the monitor value of the optical power received via the coupler C3) and outputting the attenuation quantity setting signal so as to fix the gain in a way that compensates an amount of variation in the gain sum.

Figure 2:
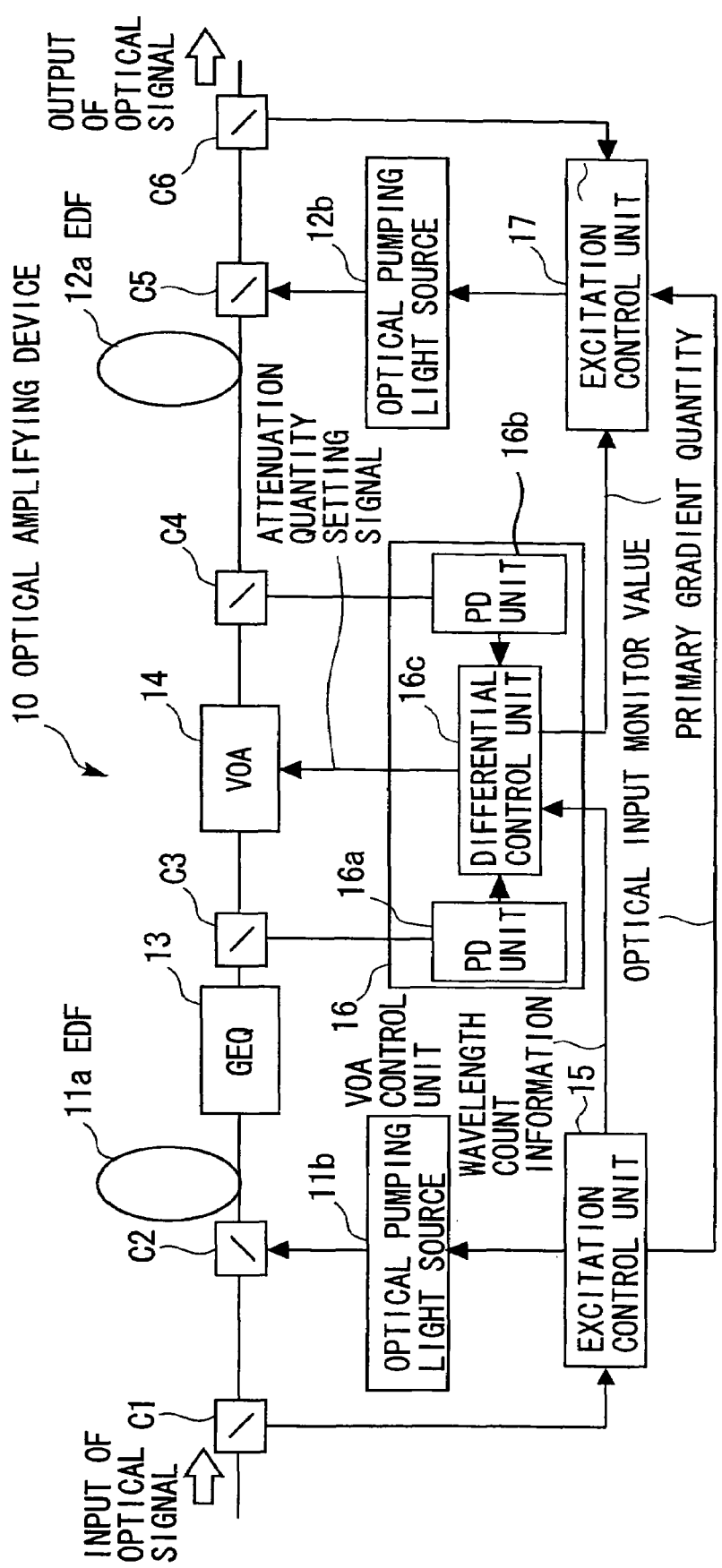
FIG. 2 is a view showing a configuration of the optical amplifying device.

Given next are in-depth explanations about a configuration and an operation of the optical amplifying device. FIG. 2 is a view showing the configuration of the optical amplifying device 10. The same components as those in FIG. 1 are marked with the same numerals and symbols. The optical amplifying device 10 is constructed of the EDF 11$a$, the optical pumping light source 11$b$, the EDF 12$a$, the optical pumping light source 12$b$, the GEQ 13, the VOA 14, the excitation control units 15, 17, the VOA control unit 16, 10-to-1 (10:1) couplers (which will hereinafter simply be called couplers) C1, C3, C4 and the multiplexers C2, C5.

Further, the VOA control unit 16 includes PD (Photo Diode) units 16$a$, 16$b$, and a differential control unit 16$c$, and actualizes functions of the wavelength allocation bias estimation unit 16-1, the primary gradient quantity calculation unit 16-2 and the attenuation quantity control unit 16-3 in FIG. 1, respectively. Moreover, the excitation control units 15, 17 include, though not illustrated, the PD units inside.

As for a flow of the WDM optical signals supplied from an optical transmission path, to begin with, the WDM optical signals are branched off at the coupler C1. One stream of optical signal branched off is supplied to the EDF 11$a$, and the excitation light from the optical pumping light source 11$b$ is supplied to the EDF 11$a$ via the multiplexer C2. Further, the other stream of optical signal branched off is monitored in its optical power by the excitation control unit 15.

The optical signal amplified by the EDF 11$a$ is wavelength-equalized by the GEQ 13 and is branched off at the coupler C3. One optical signal branched off is adjusted in its attenuation quantity of the optical level by the VOA 14, and the other optical signal is monitored in its optical power by the PD unit 16$a$ of the VOA control unit 16.

The optical signals outputted from the VOA 14 are branched off at the coupler C4, wherein one optical signal branched off is supplied to the EDF 12$a$, and the excitation light from the optical pumping light source 12$b$ is supplied via the multiplexer C5 to the EDF 12$a$. Furthermore, the other optical signal branched off is monitored in its optical power by the PD unit 16$b$ of the VOA control unit 16.

The optical signals amplified by the EDF 12$a$ are branched off at the coupler C6, wherein one optical signal branched off is outputted onto the optical transmission path, and the other optical signal branched off is monitored in its optical power by the excitation control unit 17. Note that the following discussion exemplifies a configuration, wherein the wavelength range of the WDM optical signal is set tentatively from 1531.90 nm to 1563.05 nm, and the respective wavelengths have 40 waves at the maximum at the equal interval.

Given herein are descriptions about basic operations of the excitation control units 15, 17 and of the VOA control unit 16 (i.e., the basic operations when there is no change in the WDM signal state, for example, when having 40 waves at the maximum) other than the operations related directly to the content of the present invention.

The excitation control unit 15 monitors the optical power of the input optical signal via the coupler C1, and outputs an optical input monitor value to the excitation control unit 17. The excitation control unit 17 monitors the optical power of the output optical signal via the coupler C6, and obtains an optical output monitor value.

The excitation control unit 17 executes excitation control of the optical pumping light source 12$b$ on the basis of the optical input monitor value and the optical output monitor value so that the device output becomes a specified level even when the input optical signal fluctuates high and low in its optical level.

On the other hand, in the VOA control unit 16, the PD unit 16$a$ monitors the optical power of the optical signal inputted to the VOA 14 via the coupler C3, and outputs a VOA input monitor value to the differential control unit 16$c$. The PD unit 16$b$ monitors the optical power of the optical signal outputted from the VOA 14 via the coupler C4, and outputs a VOA output monitor value to the differential control unit 16$c$.

The differential control unit 16$c$ sends a variable current (the attenuation quantity setting signal) to the VOA 14 so as to fix the gain on the basis of the VOA input monitor value and the VOA output monitor value, thereby controlling the VOA 14.

Next, the operation of the present invention will be explained in greater detail including a design policy. To start with, there is described a case in which the gain wavelength characteristic form of the optical signal after the outputting of the GEQ 13 is monotonically increased or monotonically decreased (either the monotone increase or the monotone decrease may be set, and hence the following discussion deals with the case of the monotone decrease).

If any change occurs in the WDM signal state, both of the change in the wavelength count and the bias in the wavelength allocation that is caused as the concomitant of the change in the wavelength count, must be recognized. The change in the wavelength count can be judged from the high and low power levels of the optical signal inputted to the optical amplifying device 10 (the WDM optical power may be previously measured in a way that arbitrarily changes the wavelength count of the wavelengths to be wavelength-multiplexed (wherein the wavelength interval is the equal interval)). The wavelength allocation bias about which side, a short wavelength side or a long wavelength side, the wavelength count is biased to, can not be, however, judged from only the simple power measurement.

Figure 19:
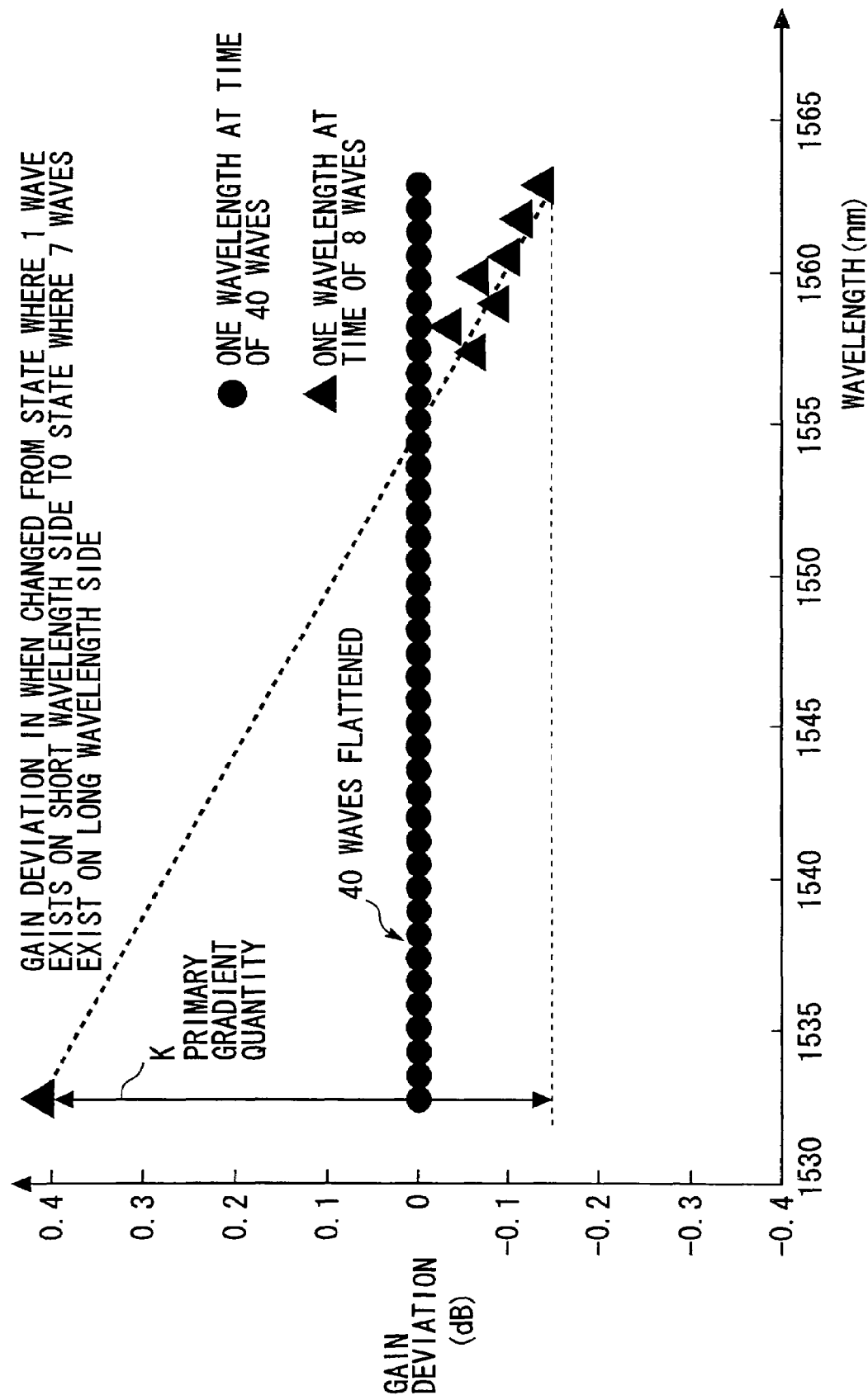
FIG. 19 is a diagram showing a result of measuring a gain deviation occurred due to a non-linear phenomenon.
Figure 20:
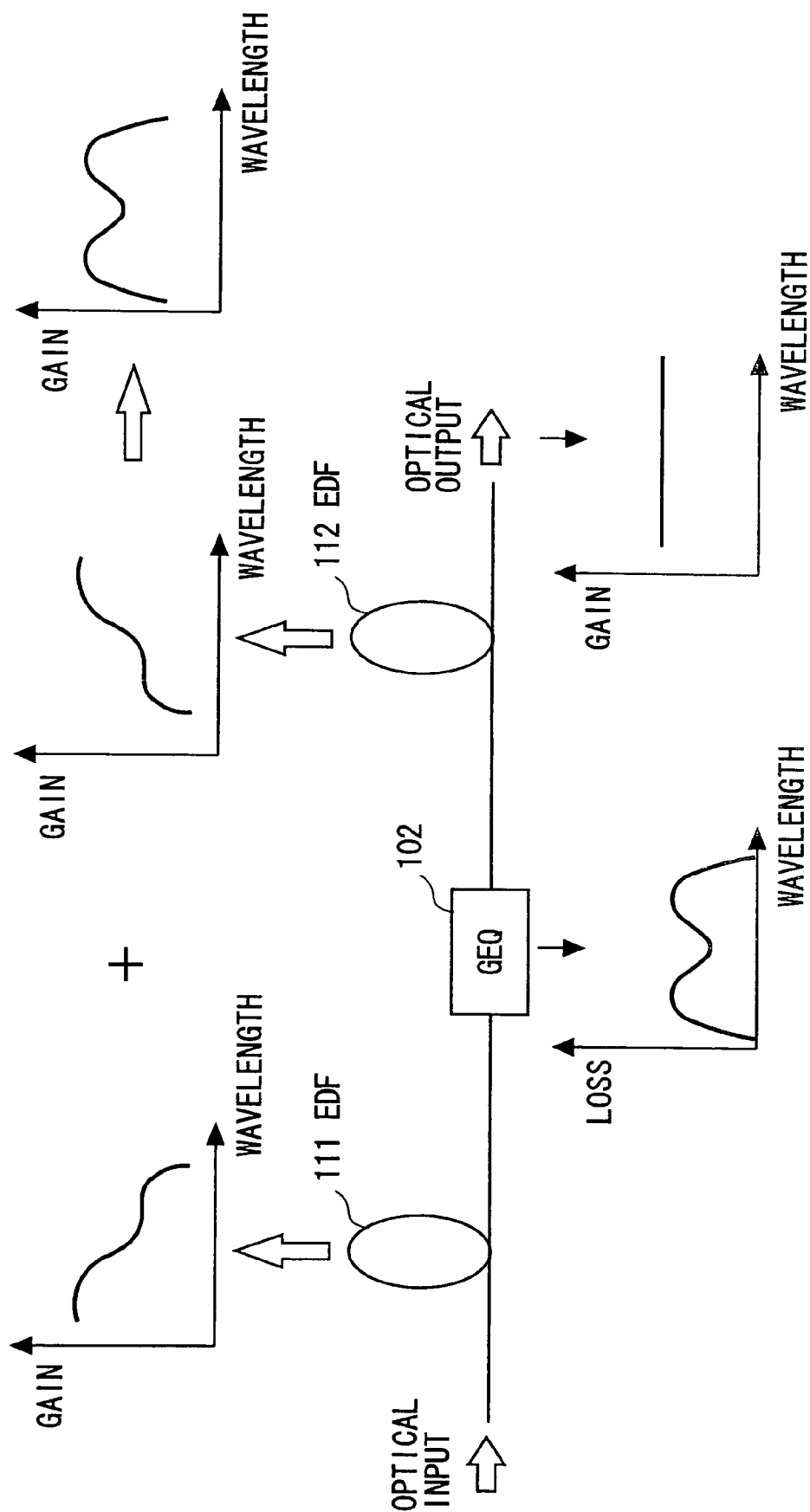
FIG. 20 is an explanatory diagram in the case of controlling the gain equalization by multi-staged EDFAs.
Figure 21:
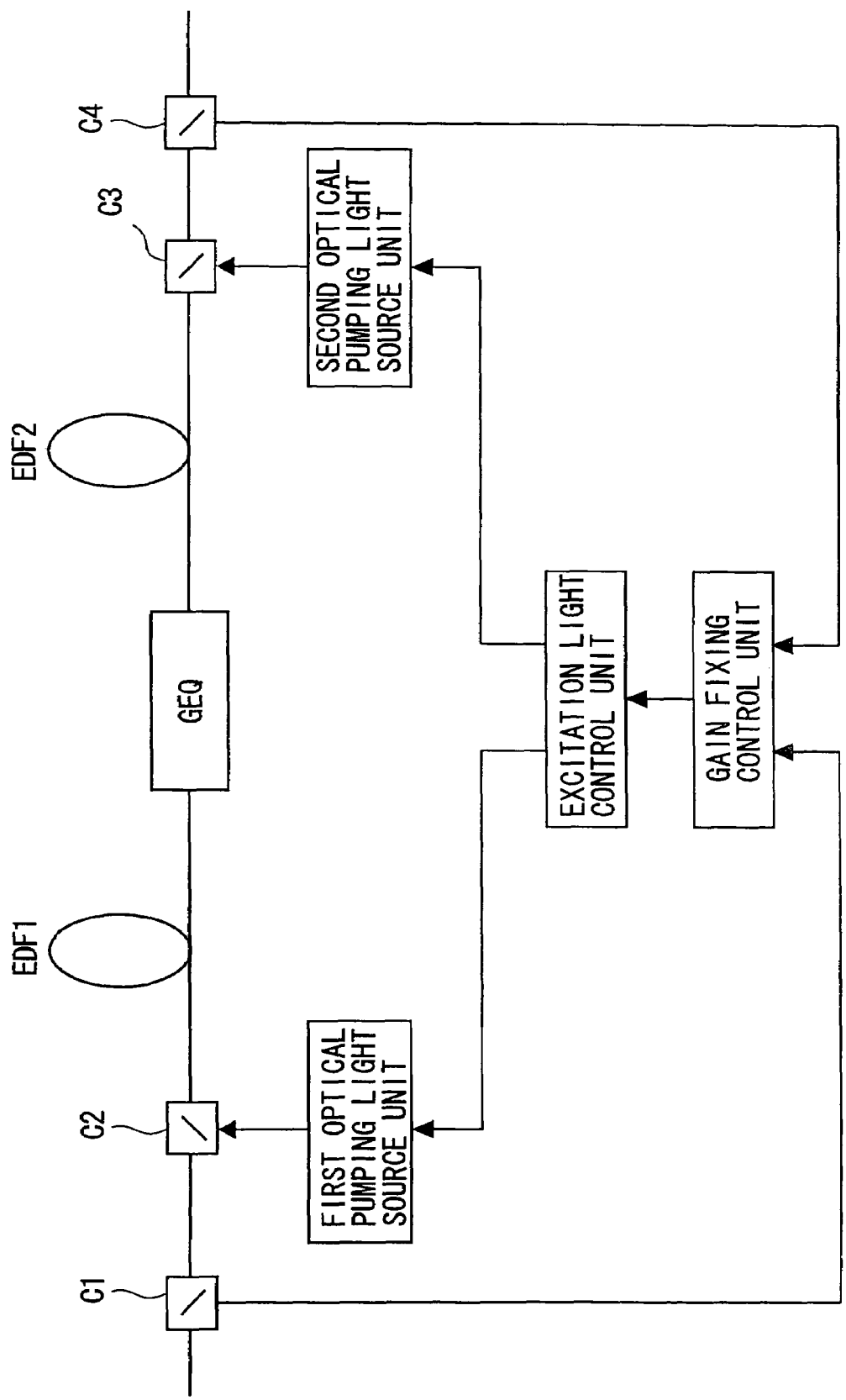
FIG. 21 is an explanatory diagram of gain fixing control.
Figure 22:
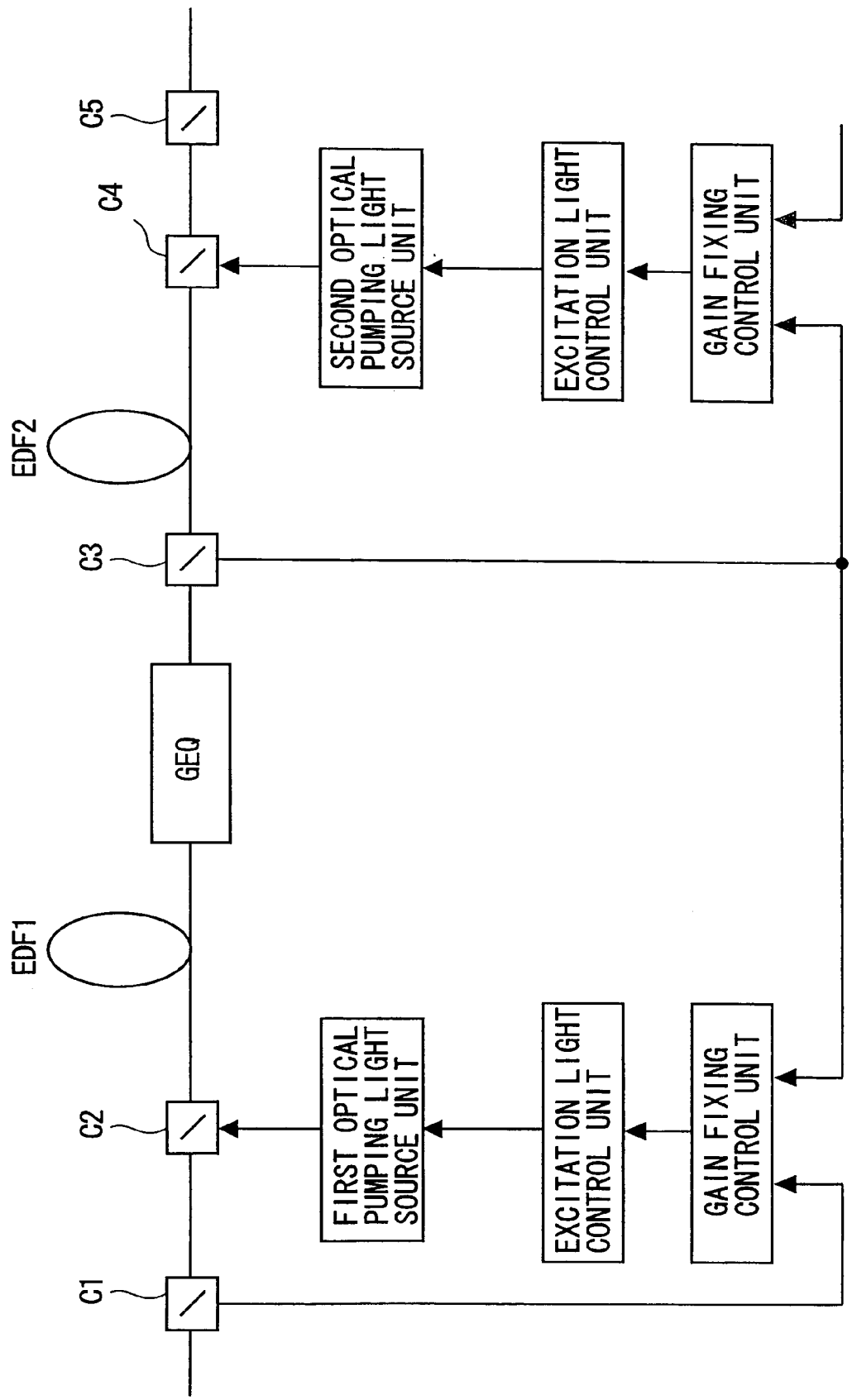
FIGS. 22A, 22B and 22C are explanatory diagrams of the gain fixing control.
Figure 23B:
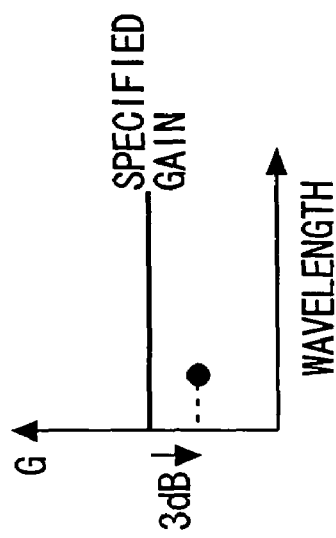
FIG. 23 is an explanatory diagram showing level diagrams when 1 wave is allocated.
Figure 23C:
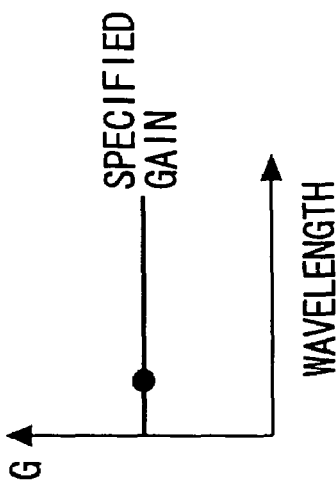
Figure 23A:
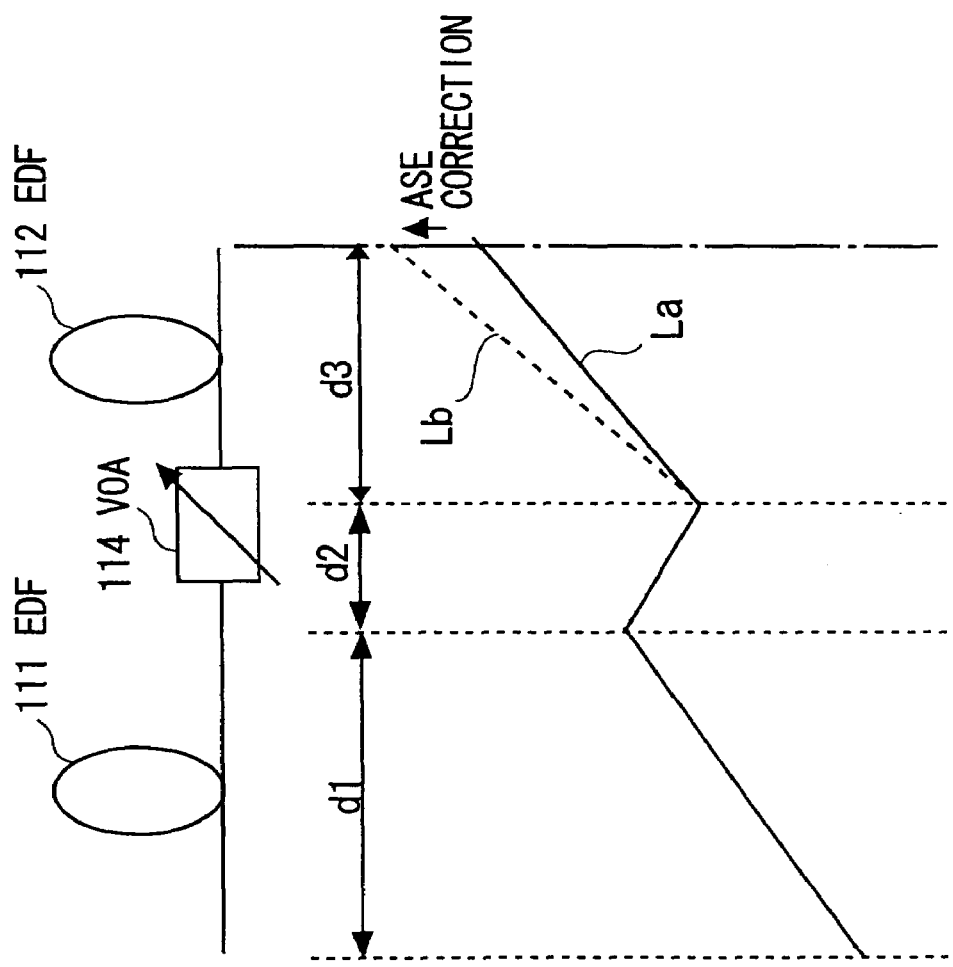
Figure 24:
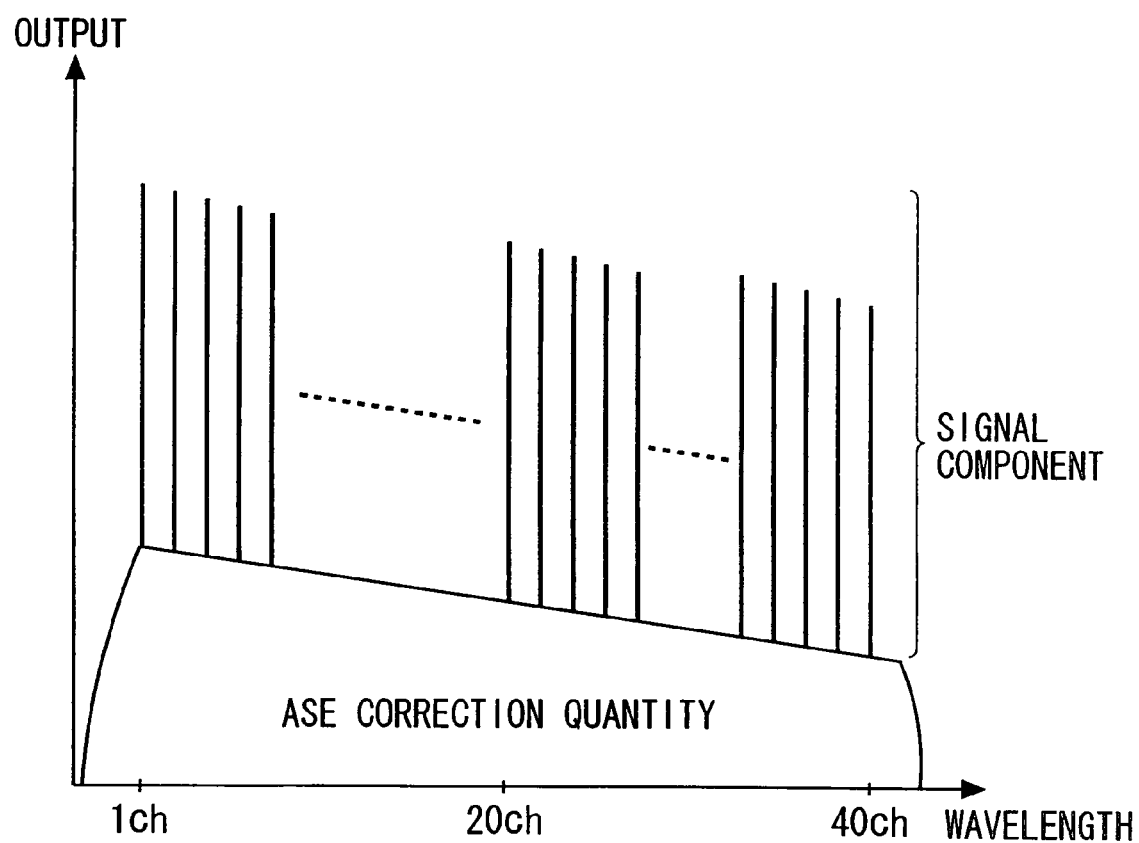
FIG. 24 is an explanatory diagram of an optimum ASE correction quantity.

On the other hand, if the change occurs in the WDM signal state, as shown in FIG. 19, in such a bias state that the short wavelength side has a small wavelength count, while the long wavelength side has a large wavelength count, it was mentioned that especially the primary gradient becomes outstanding (incidentally, the primary gradient quantity is extremely small in a state where the short wavelength side has a large wavelength count, while the long wavelength side has a small wavelength count).

Namely, for instance, the maximum primary gradient quantity is given in such a case that the state changes from the equal interval wavelength allocation of 40 waves at the maximum to a wavelength allocation of which a wavelength count (the number of wavelengths) is 8 waves, wherein one wave is allocated on the short wavelength side, and seven waves are allocated on the long wavelength side, with the result that deterioration in transmission is induced. It is therefore necessary to surely detect such a biased wavelength allocation. Herein, if, with respect to the optical signal from which the wavelength allocation bias is desired to be detected, the gain wavelength characteristic of this optical signal takes the form of the monotone decrease (the monotone increase may also be taken), the power of such an optical signal is measured, and a result of this measurement is compared with the power of the optical signal when the wavelengths (the wavelengths after the wavelength count has changed) are equally allocated, thereby making it possible to estimate which side, the short wavelength side or the long wavelength side, the wavelength allocation is biased to.

Figure 3:
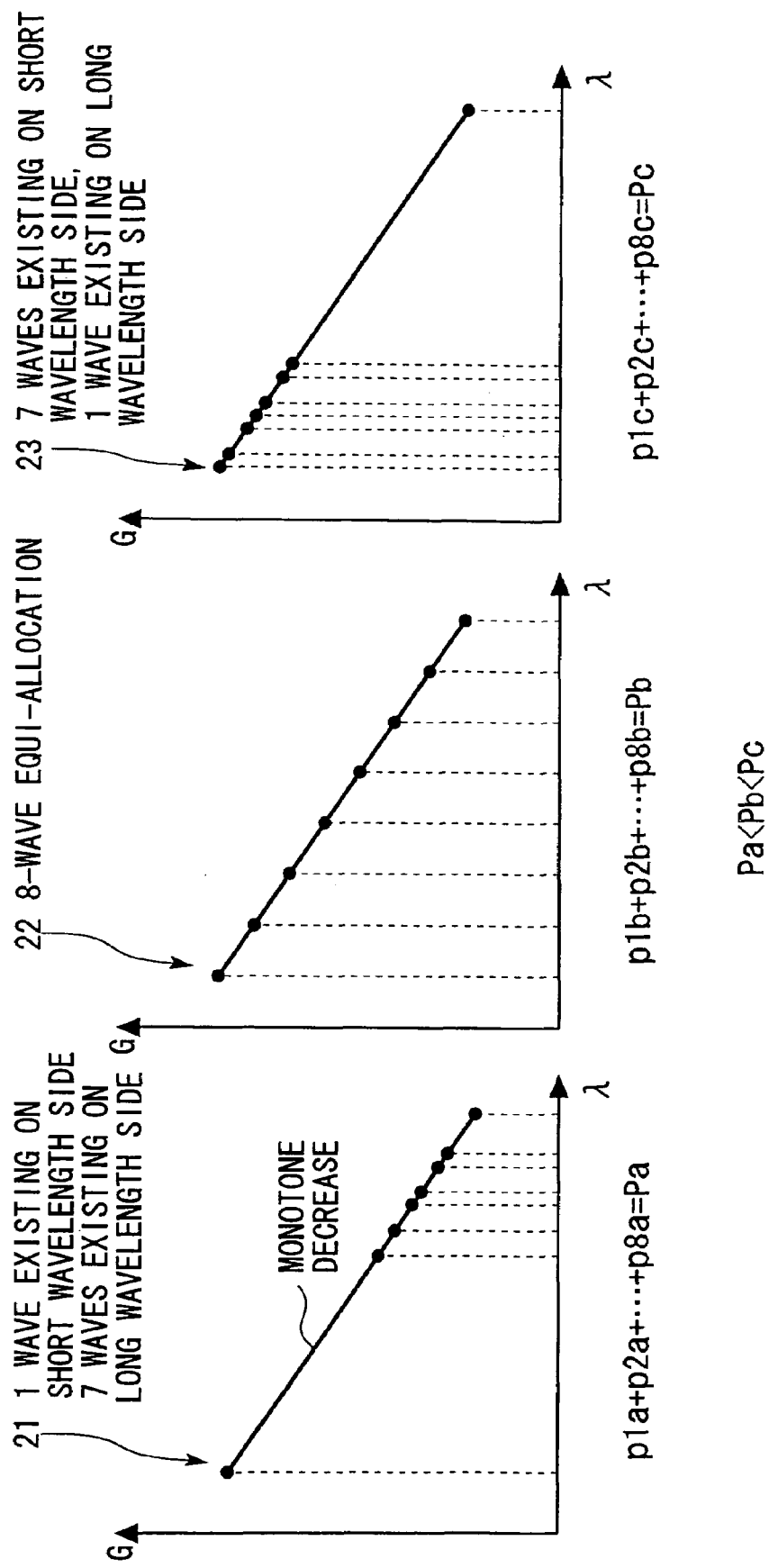
FIG. 3 is a view showing a concept of how a wavelength allocation bias is estimated.

FIG. 3 is a graphic chart showing a concept of how the wavelength allocation bias is estimated. FIG. 3 shows graphs of the optical signals having the wavelength allocation biases different from each other in a case where the optical signal of which the wavelength count is 8 waves is given the gain wavelength characteristic taking the form of the monotone decrease.

A graph 21 shows a case of such a wavelength allocation biased state that one wave is allocated on the short wavelength side, and the seven waves are allocated on the long wavelength side. A graph 22 shows a case of a wavelength allocation state in which the wavelengths of 8 waves are allocated at the equal interval. Further, a graph 23 shows a case of a wavelength allocation biased state in which even waves are allocated on the short wavelength side, and one wave is allocated on the long wavelength side.

Let each of p1a–p8a be power of each of the wavelengths in the graph 21, let each of p1b–p8b be power of each of the wavelengths in the graph 22, and let each of p1c–p8c be power of each of the wavelengths in the graph 23. The power of the optical signal having the wavelength allocation state in the graph 21 is given by p1a+p2a+ . . . +p8a=Pa, the power of the optical signal having the wavelength allocation state in the graph 22 is given by p1b+p2b+ . . . +p8b=Pb, and the power of the optical signal having the wavelength allocation state in the graph 23 is given by p1c+p2c+ . . . +p8c=Pc. Hence, it is understood that there is established a relation such as Pa<Pb<Pc. Thus, if the gain wavelength characteristic is manipulated to show the monotone decrease, the power of the optical signals having the bias in the wavelength allocation can be given the relation in magnitude.

Accordingly, the estimation of the wavelength allocation bias involves, to be gin with, previously recognizing the power Pb (corresponding to wavelength equi-allocation power) of the optical signal when equally allocating 8 waves with respect to the optical signal given the gain wavelength characteristic exhibiting the monotone decrease. Then, when the signal stage changes from 40 waves to 8 waves (the wavelength count is easily recognized from the power of the input optical signal), the power of an optical signal S manipulated so that the presently-inputted optical signal is given the gain wavelength characteristic exhibiting the monotone decrease, is monitored, and this monitor value is compared with the reference power Pb.

If the present monitor value is smaller than the reference power Pb, the wavelength allocation bias of 8 waves of the optical signal S can be recognized to be a biased state wherein the small number of wavelengths are allocated on the short wavelength side, while the large number of wavelengths are allocated on the long wavelength side (namely, the monitor value at this time corresponds to Pa). Alternatively if the monitor value is larger than the reference power Pb, the wavelength allocation bias of 8 waves of this optical signal S can be recognized to be a biased state wherein the large number of wavelengths are allocated on the short wavelength side, while the small number of wavelengths are allocated on the long wavelength side (namely, the monitor value at this time corresponds to Pc).

Figure 4:
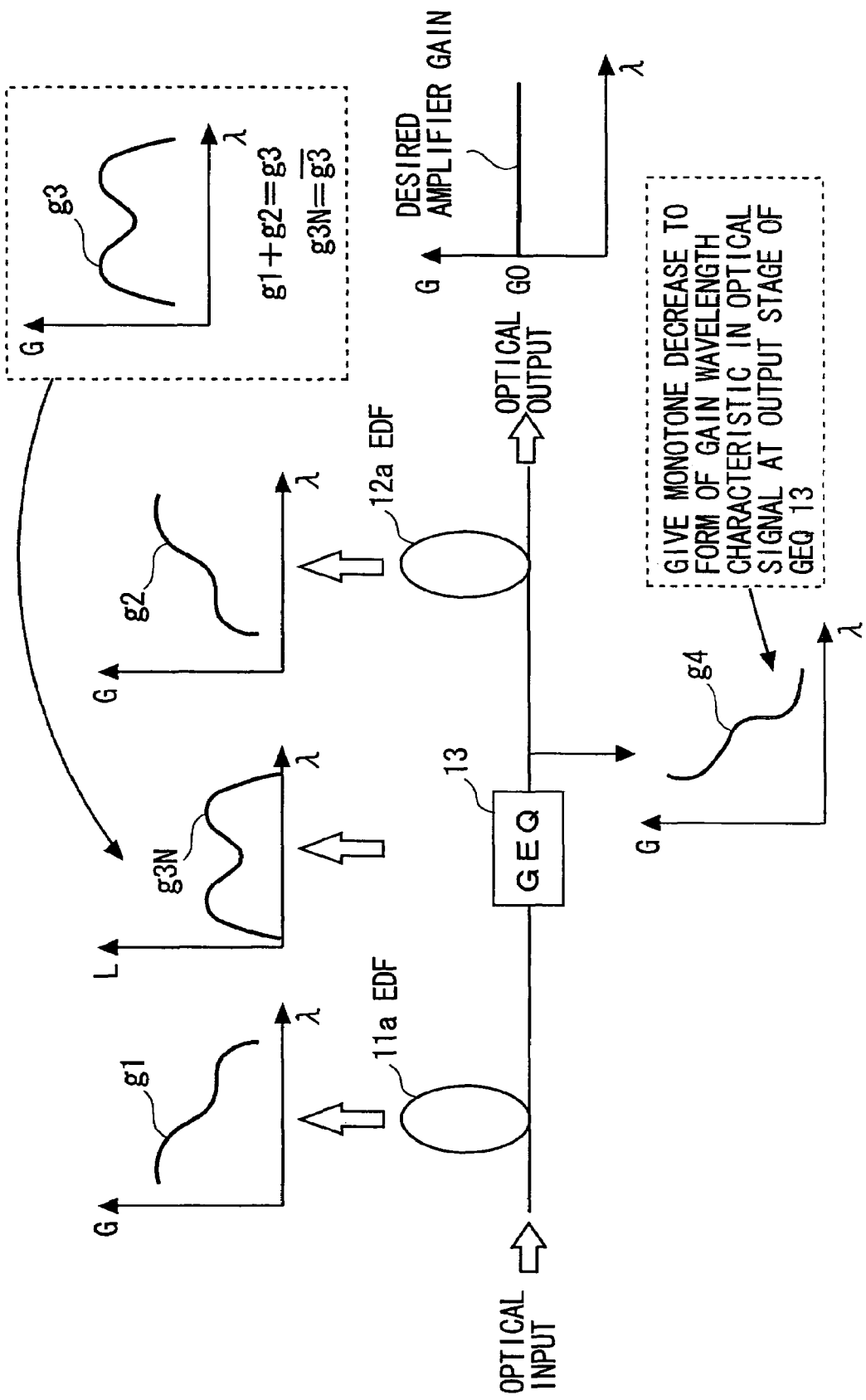
FIG. 4 is an explanatory diagram showing a manipulation of giving a monotone decrease to a gain wavelength characteristic.

Next, a manipulation method of giving the monotone decrease to the gain wavelength characteristic of the optical signal, will be explained. FIG. 4 is an explanatory diagram showing the manipulation of giving the monotone decrease to the gain wavelength characteristic. A contrivance according to the present invention is that the optical signal having the monotone decrease gain wavelength characteristic can be monitored at an output stage of the GEQ 13 with respect to a construction area (the illustrations of the VOA 14, the couplers, etc. are omitted) where the EDF 11a, the GEQ 13 and the EDF 12a are serially connected within the optical amplifying device 10.

For attaining this, at first, a form of the gain wavelength characteristic of the EDF 12a at the rear stage of the device is determined on the premise that a desired amplifier gain G0 at an output time of the optical amplifying device 10 is flat. Herein, a gain form g2 of the EDF 12a is set so that the gain becomes larger as the wavelength gets longer. This can be actualized by decreasing an average gain setting value or elongating an EDF length (the actual design is that the average gain setting value of the EDF 12a is set to 8.4 dB, and the EDF length is set to 8.5 m).

Then, the gain form of the EDF 11a before being wavelength-equalized by the GEQ 13 needs to take such a gain form g1 that the gain becomes smaller as the wavelength becomes longer in order to have a relation opposite to the gain form g2 of the EDF 12a. This can be actualized by increasing the average gain setting value or shortening the EDF length (the actual design is that the average gain setting value of the EDF 11a is set to 22.1 dB, and the EDF length is set to 6.6 m). Then, the GEQ 13 equalizes the waveform of the gain form g3 (=the gain form g1+the gain form g2), and hence it is designed that a loss form as in g3N is provided.

Thus, when designing so that the EDF 11a, the GEQ 13 and the EDF 12a have the gain forms g1, g3N and g2 respectively, as a matter of course, the desired amplifier gain G0 becomes flat, and, at the output stage of the GEQ 13 in a halfway process, it follows that a gain form g4 into which the gain form g3N is cut off from the gain form g1 is obtained. This gain form g4 is namely a gain form when the input optical signal is given the monotone decrease gain wavelength characteristic. The manipulation performed in the way described above enables the acquisition of the optical signal having the gain wavelength characteristic taking the target form at the output stage of the GEQ 13.

Figure 5:
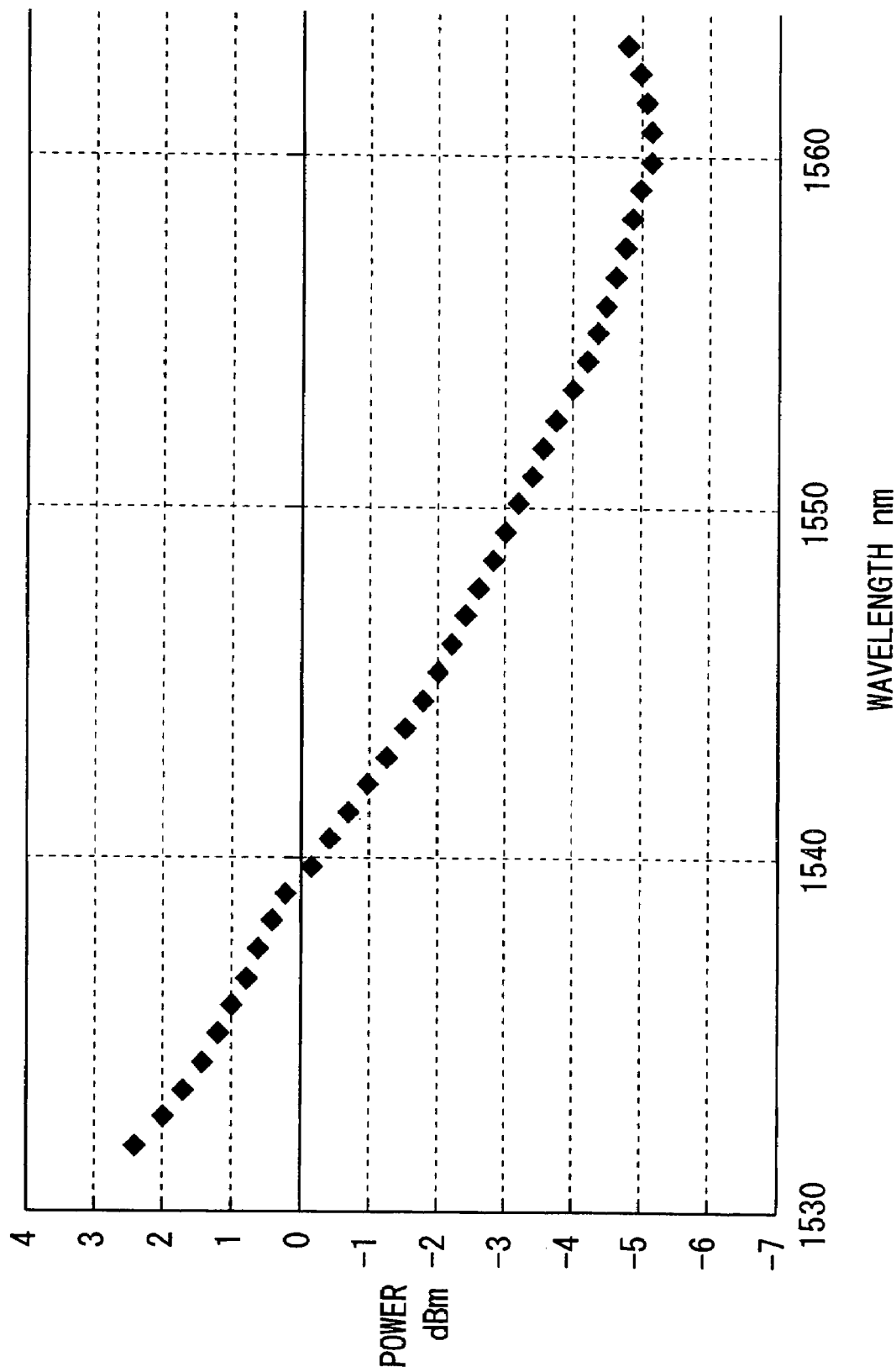
FIG. 5 is a diagram showing the gain wavelength characteristic exhibiting the monotone decrease.

FIG. 5 is a graphic chart showing the gain wavelength characteristic having the monotone decrease. The gain wavelength characteristic to be monitored in the PD unit 16a is shown, wherein the axis of ordinates indicates the monitor value (dBm) in the PD unit 16a, and the axis of abscissa indicates the monitor value in the case of 40 waves.

Next, the following discussion is about an operation till the primary gradient quantity occurred due to the bias in the wavelength allocation is canceled, wherein there is exemplified a case that the wavelength allocation bias concentrates on the short wavelength side with a change from 40 waves to 8 waves (note that the discussion is made on the premise that the monotone decrease gain wavelength characteristic is given at the output stage of the GEQ 13). To start with, there will be made a description about excitation power fixing control, corresponding to the change in the wavelength count, in the optical pumping light source 11b.

The excitation control unit 15 converts the wavelength count of the input optical signal from the input total power and thus reads the wavelength count (the wavelength count is transmitted as the wavelength count information to the differential control unit 16c). Further, the excitation control unit 15 sets the excitation power necessary for getting the same operation level of the EDF 11a as at the time of having the maximum wavelength when 8 waves are allocated at the equal interval including the both side ends of the wavelength range on the occasion of controlling the setting of the excitation power of the optical pumping light source 16b.

Figure 6:
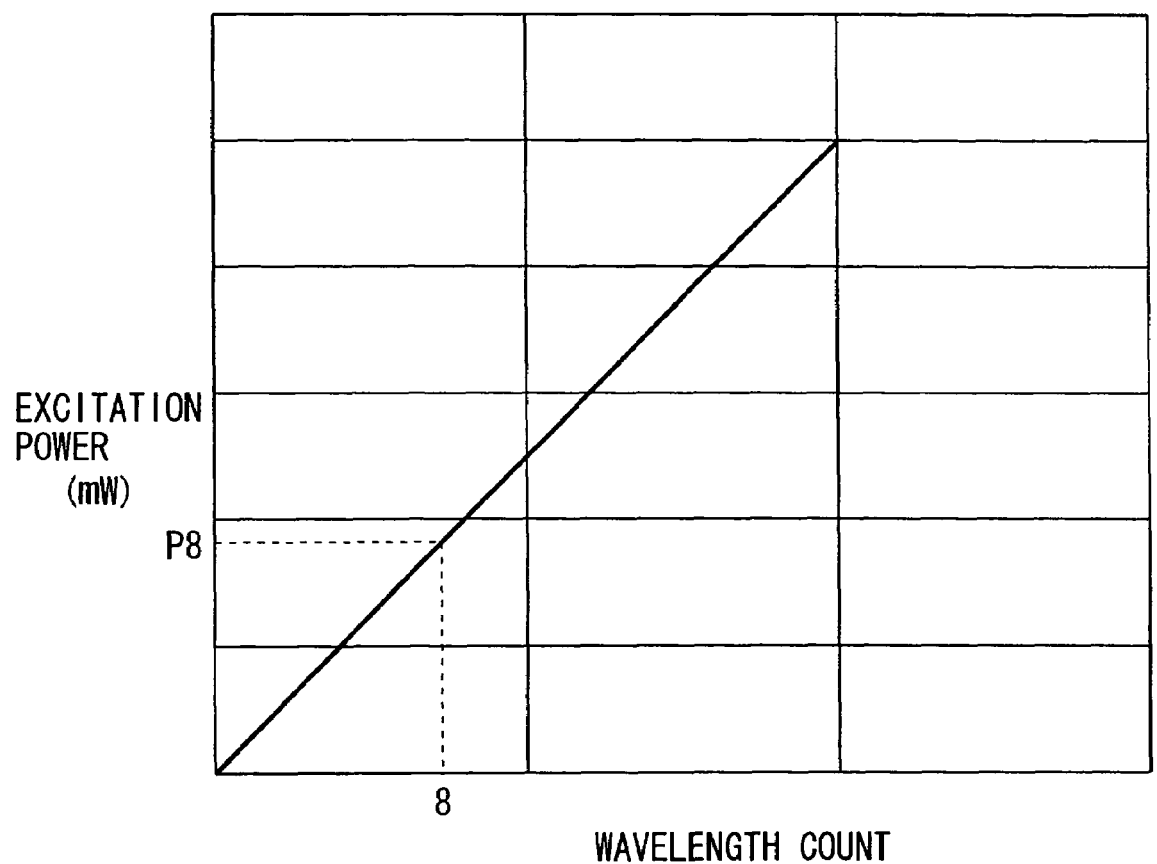
FIG. 6 is a diagram showing a relation between a wavelength count and excitation power of an optical pumping light source.

FIG. 6 is a graphic chart showing a relation between the wavelength count and the excitation power of the optical pumping light source 11b. The axis of ordinates indicates the excitation power (dBm) of the optical pumping light source 11b, and the axis of the abscissa indicates the wavelength count (the number of wavelengths). For example, when the wavelength count of the input optical signal is 8 waves, the optical pumping light source 11b has P8 as the excitation power needed to get the same operation level of the EDF 11a as at the time of the maximum wavelength when 8 waves are allocated at the equal interval including the both side ends of the wavelength range. Therefore it follows that the excitation control unit 15 controls the optical pumping light source 11b to output the excitation power P8. Note that the excitation power of the optical pumping light source 11b for other wavelength counts is also obtained as in this graph.

Figure 7:
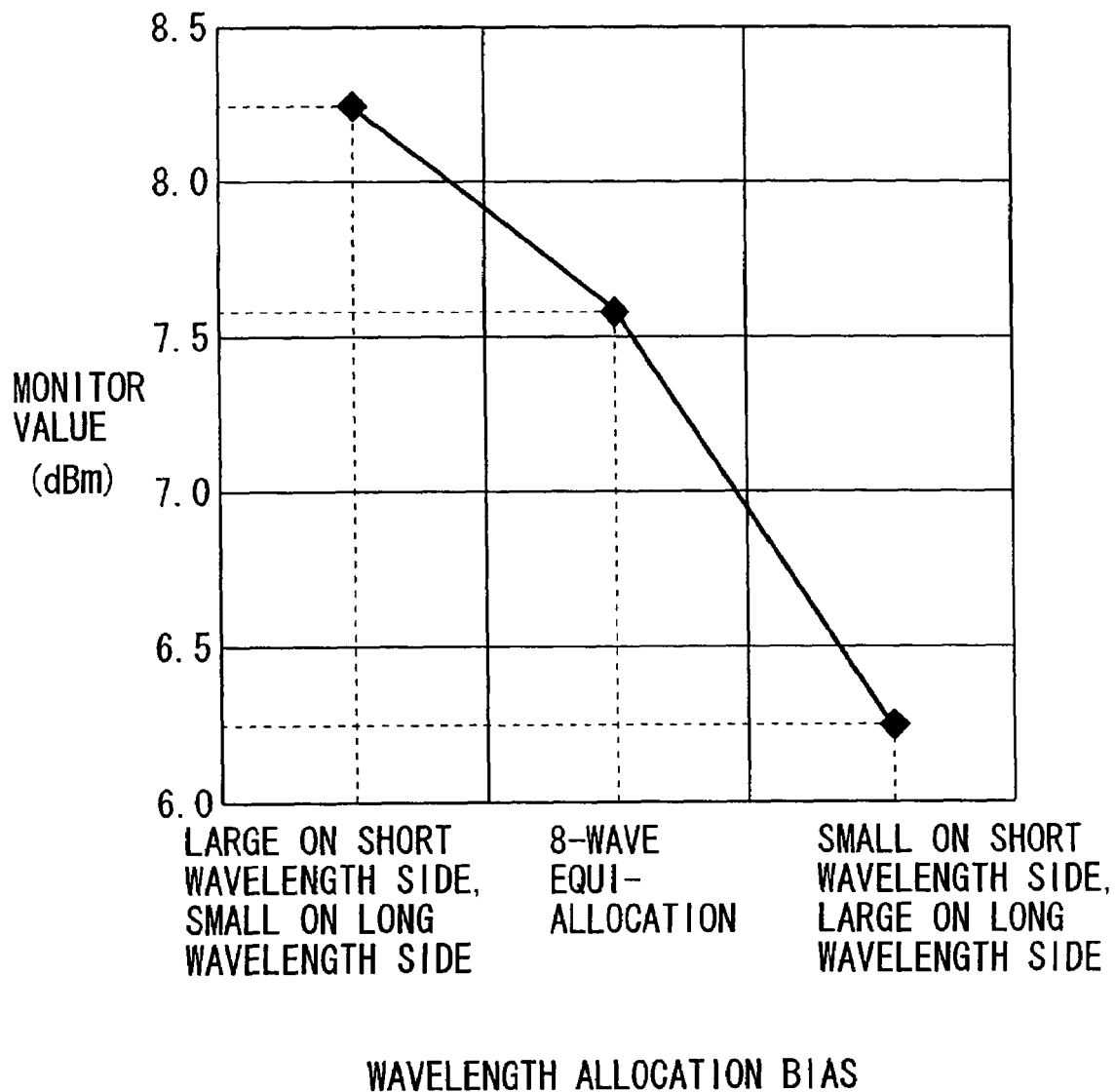
FIG. 7 is a diagram showing a relation between the wavelength allocation bias and a monitor value of a PD unit.

Next, a relation between the wavelength allocation bias and the monitor value of the PD unit 16a will be explained. FIG. 7 is a graphic chart showing the relation between the wavelength allocation bias and the monitor value of the PD unit 16a. The axis of ordinates indicates the monitor value (dBm) of the PD unit 16a, and the axis of abscissa indicates the wavelength allocation bias.

When 8 waves are allocated at the equal interval, the monitor value of the PD unit 16a is 7.6 dBm, and this value is measured beforehand and is stored in the differential control unit 16c. Further, if the value monitored at the present by the PD unit 16a is 6.3 dBm, as 6.3<7.6, the differential control unit 16c can recognize from this relation that the wavelength allocation bias of the optical signal inputted at the present to the optical amplifying device 10 is in a state where the small number of wavelengths are allocated on the short wavelength side, and the large number of wavelengths are allocated on the long wavelength side.

Further, if the value monitored at the present by the PD unit 16a is 8.3 dBm, as 7.6<8.3, the differential control unit 16c can recognize from this relation that the wavelength allocation bias of the optical signal inputted at the present to the optical amplifying device 10 is in a state where the large number of wavelengths are allocated on the short wavelength side, and the small number of wavelengths are allocated on the long wavelength side.

Figure 8:
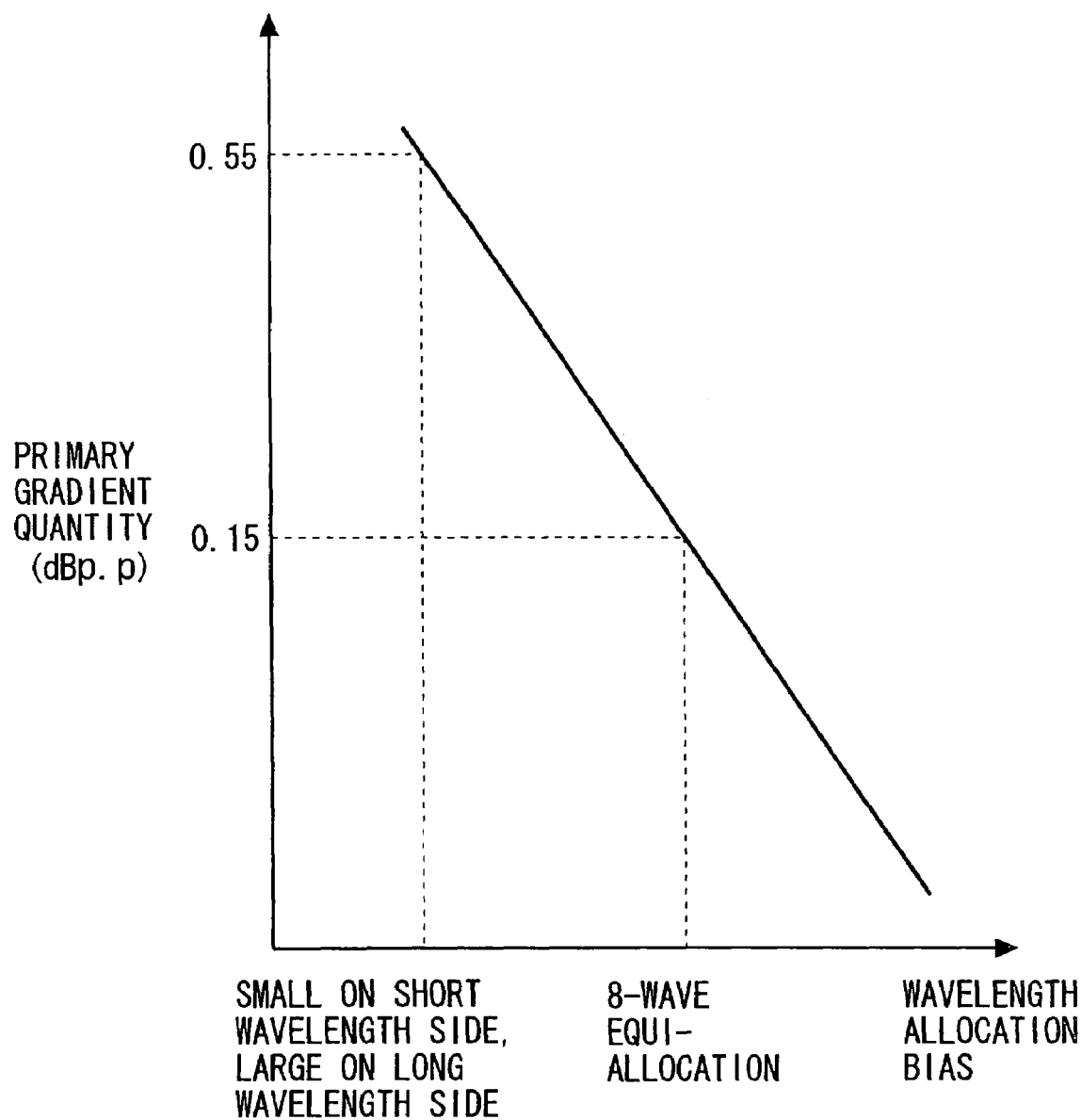
FIG. 8 is a diagram showing a relation between the wavelength allocation bias and a primary gradient quantity.

Next, a relation between the wavelength allocation bias and the primary gradient quantity will be explained. FIG. 8 is a graphic chart showing the relation between the wavelength allocation bias and the primary gradient quantity. The axis of ordinates indicates the primary gradient quantity (dBp.p: dB of peak-to-peak), and the axis of abscissa indicates the wavelength allocation bias.

In the case of allocating the wavelengths at the equal interval, the primary gradient quantity is on the order of 0.15 dBp.p (a primary gradient quantity k shown in FIG. 19 is 0.15). Further, in the state where the small number of wavelengths are allocated on the short wavelength side and the large number of wavelengths are allocated on the long wavelength side, the primary gradient quantity is on the order of 0.55 dBp.p, and it is understood that there is a great bias (the primary gradient quantity k is 0.55).

The differential control unit 16c, however, judges a degree of the wavelength allocation bias from the monitor value of the PD unit 16a, and hence it follows that the primary gradient quantity is actually calculated based on a graph in FIG. 9 that is illustrated as below.

Figure 9:
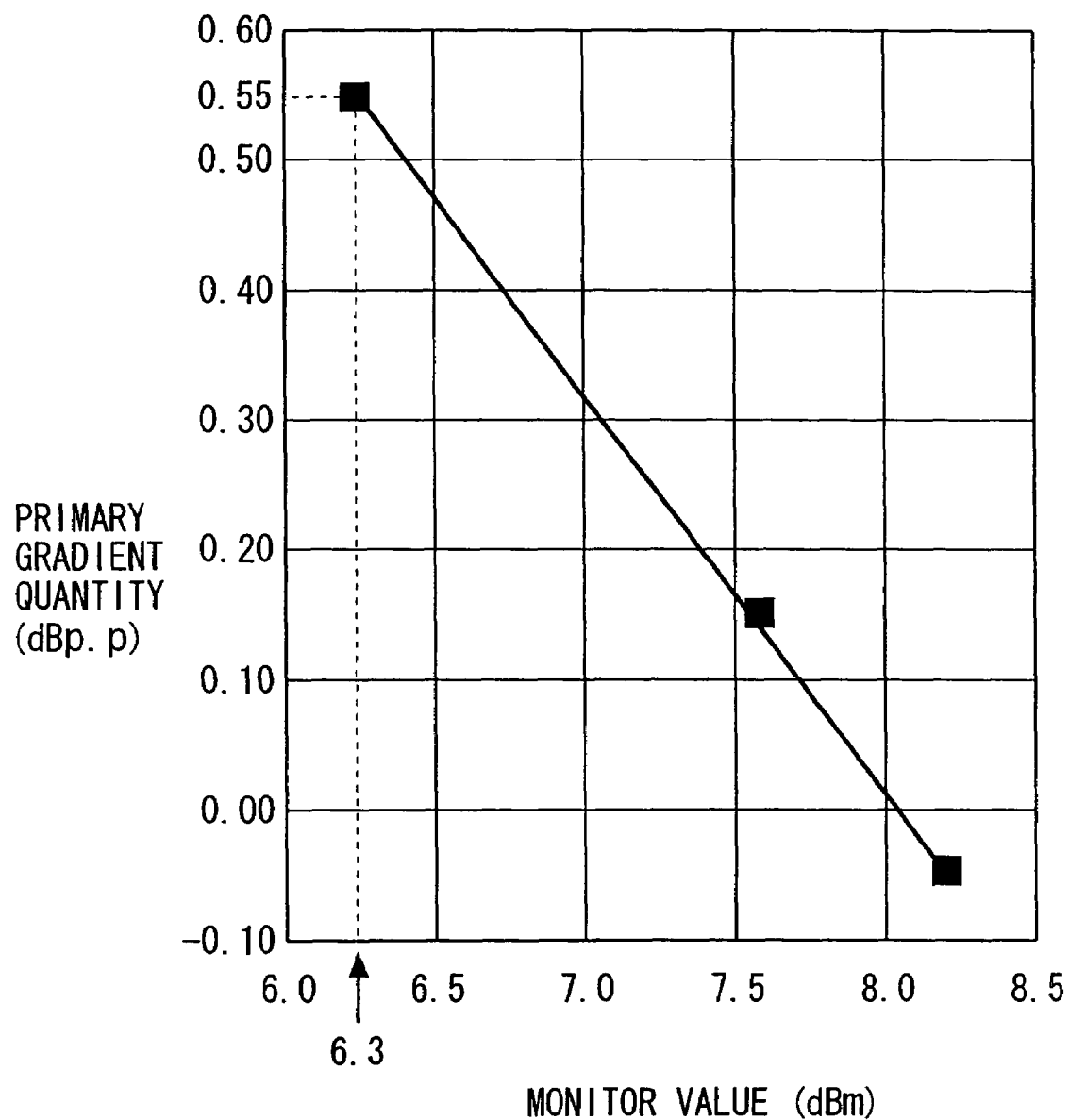
FIG. 9 is a diagram showing a relation between the monitor value of the PD unit and the primary gradient quantity.

FIG. 9 is a graphic chart showing a relation between the monitor value of the PD unit 16a and the primary gradient quantity. The axis of ordinates indicates the primary gradient quantity (dBp.p), and the axis of the abscissa indicates the monitor value (dBm) of the PD unit 16a. The graph in FIG. 9 is a modified version of the graph in FIG. 8, wherein the axis of abscissa shows the monitor value that replaces the wavelength allocation bias in FIG. 8.

When the wavelength allocation is that 8 waves are allocated at the equal interval, the monitor value is 7.6 dBm, and therefore the primary gradient quantity at this time is on the order of 0.15 dBp.p. Further, if the monitor value is 6.3 dBm when the wavelength allocation is biased to the short wavelength side, the primary gradient quantity is 0.55 dBp.p.

Figure 10:
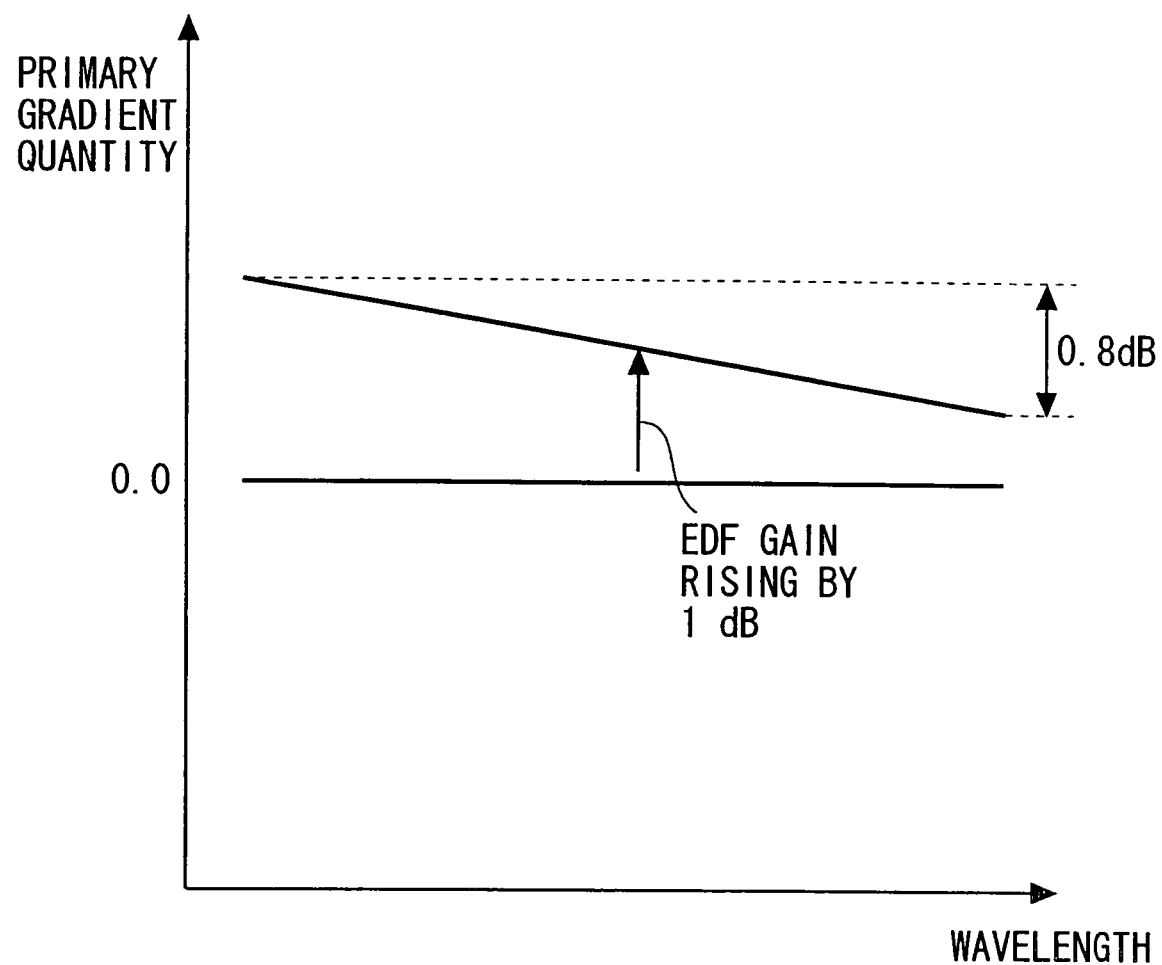
FIG. 10 is a diagram showing a relation between an EDF gain and the primary gradient quantity.

Next, a manipulation of canceling the primary gradient quantity will be described. The primary gradient quantity can be restrained by manipulating a sum of the gains of the EDF 11a and the EDF 12a. FIG. 10 is a graphic chart showing a relation between the EDF gain and the primary gradient quantity. The axis of ordinates indicates the primary gradient quantity, and the axis of abscissa indicates the wavelength.

When the EDF gain rises by 1 dB from a state where the primary gradient quantity is zero, it is known that, for example, approximately 0.8 dBp.p occurs as the primary gradient quantity upward on the short wavelength side (incidentally, the value shown in FIG. 10 is previously measured as design data of the optical amplifying device 10).

Herein, since 0.55 is obtained as the primary gradient quantity from FIG. 9, it follows that an EDF gain x needed to cancel this primary gradient quantity may be gain-adjusted by about 0.69 (=x) dB given by 1:0.8=x:0.55 as a ratio of the EDF gain to the primary gradient quantity.

When making this gain adjustment of 0.69 dB, however, as explained in FIG. 6, the optical pumping light source 11b performs the excitation with the fixed power, and hence the excitation power on the side of the optical pumping light source 12b is to be adjusted. The excitation control unit 17 obtains, based on the primary gradient quantity calculated by the differential control unit 16c, the gain adjusting value (=x), then controls the optical pumping light source 12b by use of the gain adjusting value, and restrains the primary gradient quantity by adjusting the sum of gains of the EDFs 11a and 12a, thereby flattening the gain.

The above-explained gain control of the optical amplifying device 10 according to the present invention enables compensation of the primary gradient quantity occurred due to a non-linear phenomenon such as the SHB and the ESA when the wavelength allocation is biased. If remaining as it is, however, since the sum of gains was adjusted for compensating the primary gradient quantity, it follows that the whole amplifier gain fluctuates. Accordingly, an amount of this fluctuation is adjusted by controlling the VOA 14, thus obtaining a desired amplifier gain (in the example given above, as a result of adjusting the sum of gains in order to compensate the primary gradient quantity, the whole amplifier gain decreases, and therefore the whole level is raised by decreasing the attenuation quantity of the VOA 14).

Next, the control of the attenuation quantity of the VOA 14 will be explained. The differential control unit 16c sets an attenuation quantity of the VOA 14 by transmitting an attenuation quantity setting signal. Herein, an attenuation quantity (an initial value) of the VOA 14 before the WDM signal state changes is, as described above, set in a way that sees the monitor values of the PD units 16a, 16b. In this case, a VOA set value is given such as (VOA Set Value)= (Reference Amplifier Gain)−(Desired Amplifier Gain) (where the reference amplifier gain represents the sum of gains of the EDFs 11a, 12a).

On the other hand, as for setting the attenuation quantity after the WDM signal state has changed, the differential control unit 16c obtains the attenuation quantity to be added to the VOA 14 in a way that judges from the monitor value of the PD unit 16a, and outputs an attenuation quantity setting signal corresponding thereto, thus adjusting the VOA 14.

Figure 11:
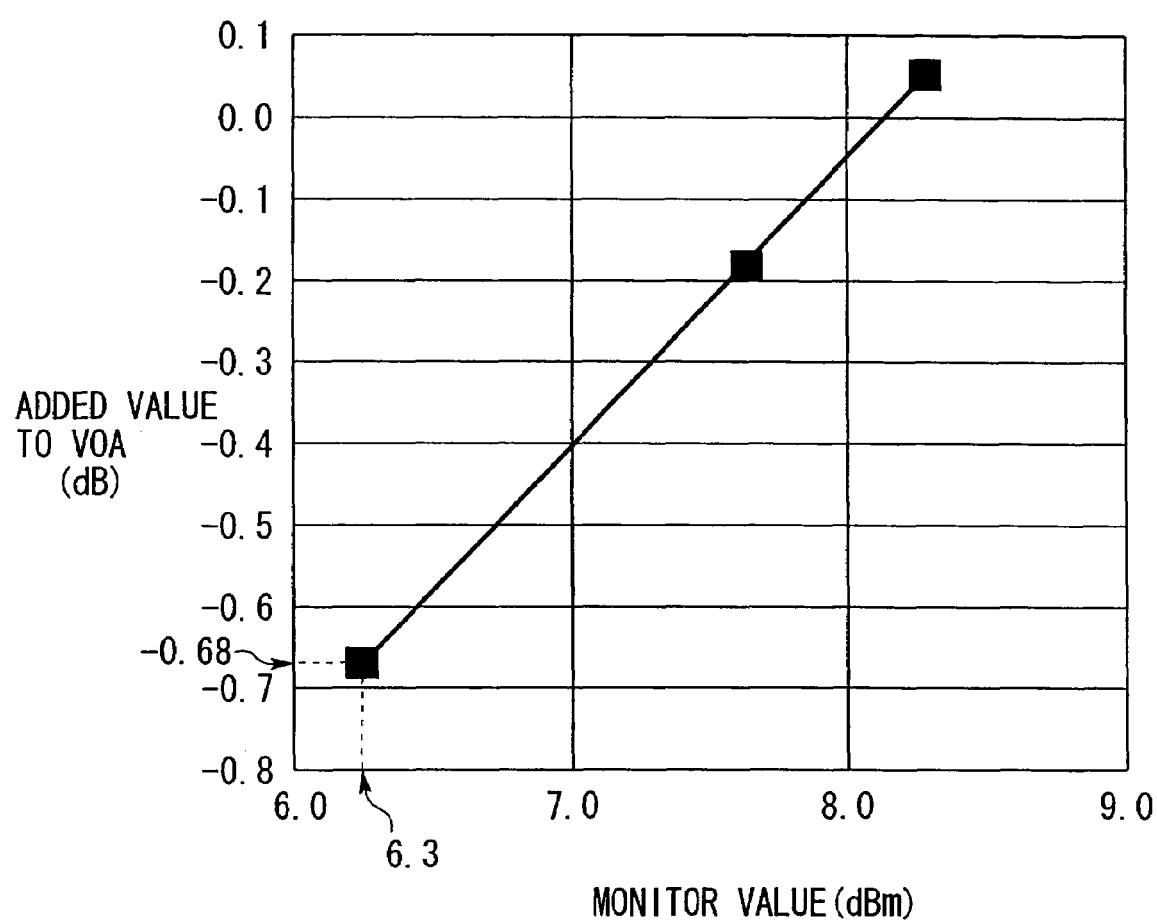
FIG. 11 is a diagram showing a relation between the monitor value of the PD unit and an attenuation quantity added to VOA.

FIG. 11 is a graphic chart showing a relation between the monitor value of the PD unit 16a and the attenuation quantity to be added to the VOA 14. The axis of ordinates indicates the VOA added value (dB), and the axis of abscissa indicates the monitor value (dBm) of the PD unit 16a. As in this graph, the relation between the VOA added value and the monitor value of the PD unit 16a is previously acquired by measuring.

If the value monitored at the present by the PD unit 16a is 6.3 dBm (as obtained from FIG. 7), the attenuation quantity to be added to the VOA 14 becomes approximately −0.68 dB. Accordingly, the attenuation quantity control after canceling the primary gradient quantity is that −0.68 dB is added to the initial value of the VOA 14 (the attenuation quantity is decreased by 0.68 dB). A desired amplifier gain is thereby acquired.

Figure 12:
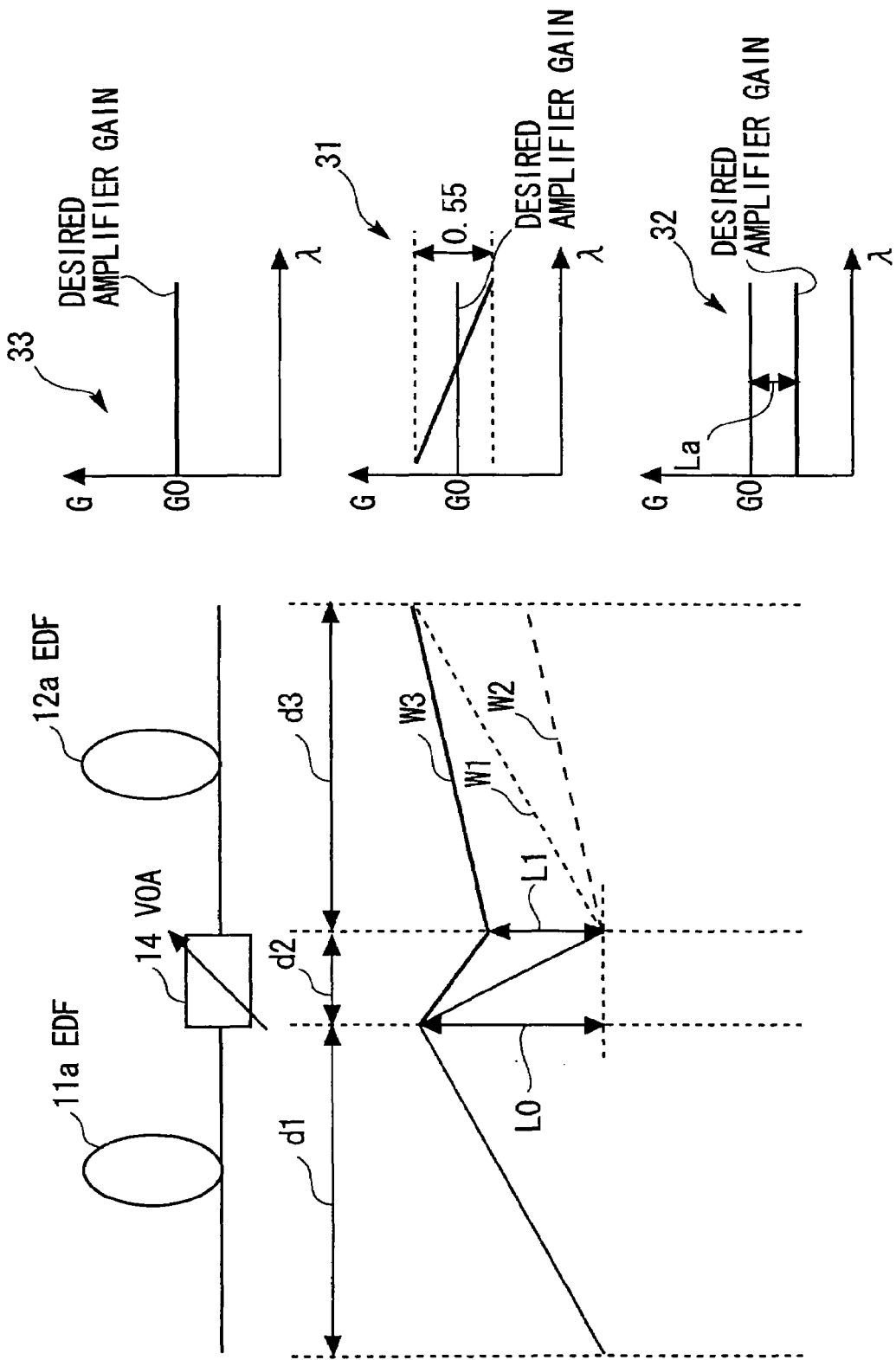
FIG. 12 is a diagram showing level diagrams for explaining how an attenuation quantity is controlled.

FIG. 12 is a diagram showing level diagrams for explaining the attenuation quantity control. A level diagram W1 depicted by a broken line represents a level in the case of being biased to the short wavelength side when 8 waves are allocated (when the WDM signal state changes). A level diagram W2 drawn by a dotted line represents a level after canceling the primary gradient quantity. A level diagram W3 shown by a bold line represents a level after adjusting the attenuation quantity of the VOA 14. Level-overlapped portions among the level diagrams W1 through W3 are depicted by fine solid lines (the level diagrams W1 through W3 are overlapped in a section d1, the level diagrams W1 and W2 are overlapped in a section d2, and hence these portions are depicted by the fine solid lines).

Moreover, a gain wavelength characteristic corresponding to the level diagram W1 is shown in a graph 31, a gain wavelength characteristic corresponding to the level diagram W2 is shown in a graph 32, and a gain wavelength characteristic corresponding to the level diagram W3 is shown in a graph 33. Note that G0 shall be a desired amplifier gain.

L0 is an initial value of the attenuation quantity of the VOA 14 with respect to the level diagram W1, and at this time it is understood from the graph 31 that there occurs the primary gradient quantity of 0.55. From this state, the sum of gains of the EDFs 11a, 12a is adjusted by conducting the compensation of the primary gradient quantity, whereby the level diagram W2 is formed. Looking at the graph 32 at this time, it is comprehended that the amplifier gain decreases, though the primary gradient quantity is canceled, by a level La from the desired amplifier gain G0.

Accordingly, the amplifier gain may be increased by the level La, and therefore the VOA 14 is so adjusted as to attain a level L1 into which the attenuation quantity is decreased by the level L1 from the initial value L0 of the VOA 14. Then, as in the graph 33, it is possible to obtain the desired amplifier gain G0 with the primary gradient quantity restrained as from the case of being biased to the short wavelength side when 8 waves are allocated.

As discussed above, the optical amplifying device 10 of the present invention is constructed to monotonically increase or decrease the gain wavelength characteristic of the optical signal, to compare the present monitor value of the optical power after the outputting of the GEQ 13 with the wavelength equi-allocation power corresponding to the recognized wavelength count, and to estimate the wavelength allocation bias occurred as a concomitant of the change in the wavelength count. Then, the optical amplifying device 10 is constructed to obtain the primary gradient quantity from the wavelength allocation bias, to cancel the primary gradient quantity by changing the sum of gains, and to fix the gain by adjusting the optical attenuation quantity of the VOA 14.

This enables the compensation of the primary gradient quantity due to the non-linear phenomenon such as the SHB and the ESA when the wavelength allocation bias largely changes as the wavelength count changes, and also enables the gain to be fixed. It is therefore possible to configure the WDM system in which the optical transmission quality is improved, and the operability and the reliability are enhanced.

Next, another manipulation method in the case of giving the monotone decrease to the gain wavelength characteristic of the optical signal, will be explained. In the example given above, the monotone decrease is given to the gain wavelength characteristic of the optical signal at the output stage of the GEQ 13 by determining the gain form of the EDF 12a so that the gain becomes larger as the wavelength gets longer (the condition is that the desired amplifier gain be flat, and hence, if the gain form of the EDF 12a is determined, the gain forms of the EDF 11a and of the GEQ 13 are inevitably determined). A method herein is actualized by providing the output stage of the GEQ 13 with a filter.

Figure 13:
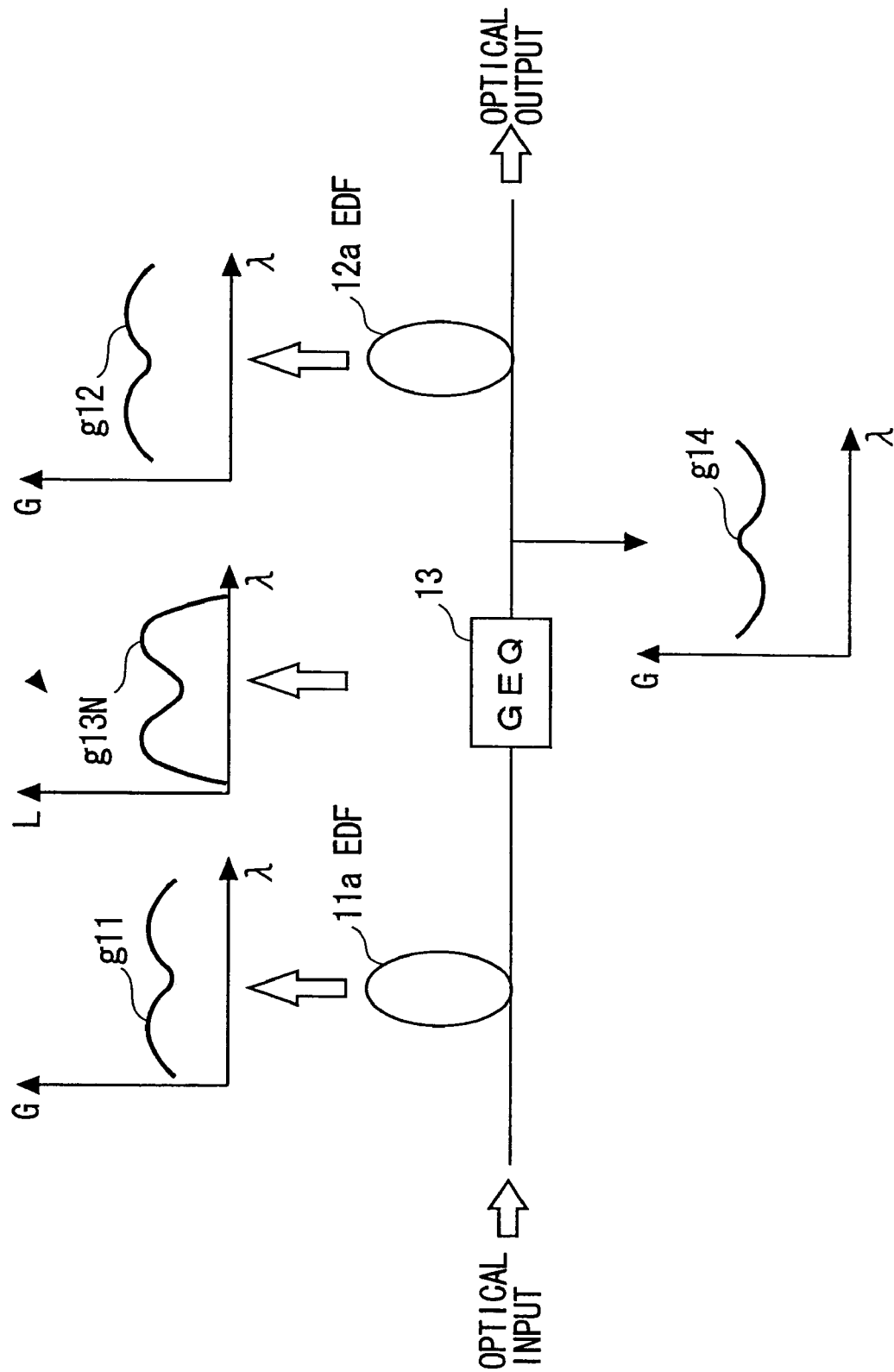
FIG. 13 is an explanatory diagram showing a state in a case where a filter needs disposing.

FIG. 13 is an explanatory diagram showing a state in such a case that the filter is required to be disposed. It is not necessarily possible to design the EDF 12 to have the gain form g2 as shown in FIG. 4. At this time, supposing that the gain form of the EDF 12 is g12, the gain forms of the EDF 11a and of the GEQ 13 respectively become g11, g13N. Therefore, the gain wavelength characteristic of the optical signal at the output stage of the GEQ 13 takes a form such as g14, wherein the monotone decrease does not occur. Accordingly, if unable to design the EDF gain form into a target (desired) form, a useful scheme is that the filter is provided at the output stage of the GEQ 13 and the gain form is changed by the filter.

Figure 14:
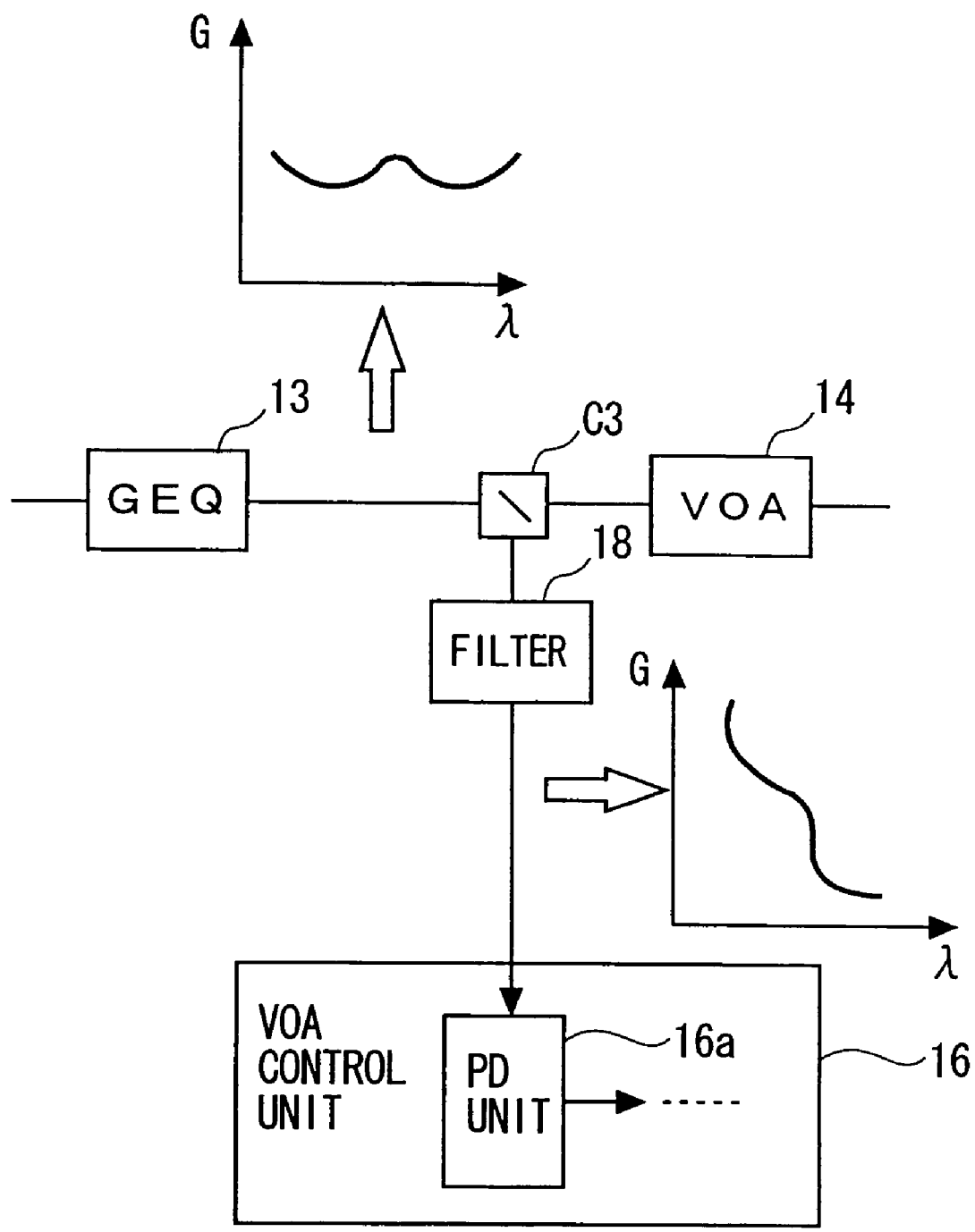
FIG. 14 is a diagram showing a configuration in the periphery of the filter.

FIG. 14 is a diagram showing a configuration in the periphery of the filter. The optical signals outputted from the GEQ 13 are branched off at the coupler C3, wherein one optical signal branched off is transmitted to the VOA 14, while the other optical signal branched off is transmitted to a filter 18. Further, the optical signal outputted from the filter 18 is transmitted to the PD unit 16a within the VOA control unit 16 (illustrations of other components are omitted).

As in this configuration, the filter 18 having a large gain loss characteristic on the long wavelength side is installed in the branch output position of the coupler C3, whereby the PD unit 16a can monitor the optical signal having the monotone decrease gain wavelength characteristic.

Figure 15:
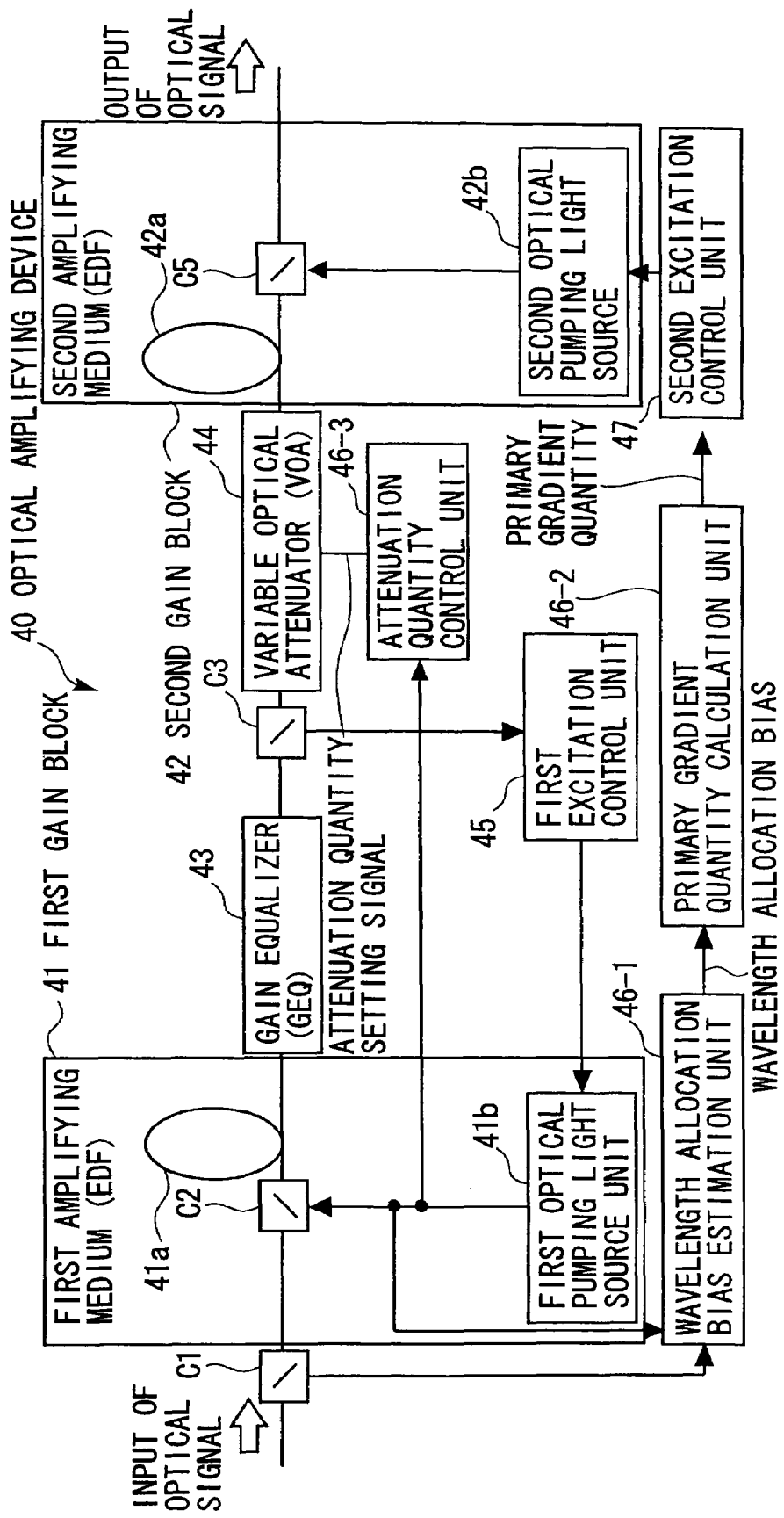
FIG. 15 is a diagram showing a block configuration of a modified example of the optical amplifying device.

Next, a modified example of the optical amplifying device 10 will be described. FIG. 15 is a diagram showing a block configuration of the modified example of the optical amplifying device. An optical amplifying device 40 in the modified example includes a first gain block 41, a second gain block 42, a GEQ 43 and a VOA 44. The first gain block 41 is constructed of an EDF 41a, a first optical pumping light source unit 41b and a multiplexer C2. The second gain block 42 is constructed of an EDF 42a, a second optical pumping light source unit 42b and a multiplexer C5.

A first excitation control unit 45 controls the setting of the first optical pumping light source unit 41b so that the first optical pumping light source unit 41b emits such a beam of excitation light as to invariably fix the monitor value (which is the monitor value of the optical signal received via the coupler C3) with respect to the optical signal outputted from the first gain block 41.

A wavelength allocation bias estimation unit 46-1 recognizes the wavelength count from the power of the optical signal inputted via the coupler C1. Further, the excitation power needed to get the same amplifying operation level of the amplifying medium of the EDF 41a as at the time of the maximum wavelength count when allocating the wavelengths after the change in the wavelength count at the equal interval in the wavelength range, is set as reference excitation power. Then, if there is a change in the wavelength count, a wavelength allocation bias occurred as a concomitant of the change in the wavelength count is estimated by comparing monitor value fixing excitation power for the excitation light of the first optical pumping light source unit 41b which is controlled so that the monitor value gets fixed, with the reference excitation light.

A primary gradient quantity calculation unit 46-2 obtains a primary gradient quantity defined as a gain deviation from the wavelength allocation bias. A second excitation control unit 47 sets the excitation power needed to cancel the primary gradient quantity in the second optical pumping light source unit 42b, and changes a sum of gains of the first gain block 41 and of the second gain block 42.

An attenuation quantity control unit 46-3 obtains an optical attenuation quantity that should be adjusted from the monitor value fixing excitation power to fix the gain by compensating the change in the sum of gains, and outputs an attenuation quantity setting signal, thus controlling the VOA 44.

Herein, in the optical amplifying device 10 in FIG. 1, if changed from 40 waves to 8 waves, for knowing the wavelength allocation bias, at first, when allocating the wavelengths of 8 waves at the equal interval in the wavelength range, the first optical pumping light source unit 12b is made to emit the excitation power necessary for getting the same amplifying operation level of the EDF 11a as at the time of 40 waves at the maximum. Then, the wavelength allocation bias is judged based on the monitor value with respect to the optical signal branched off at the coupler C3.

On the other hand, in the case of the optical amplifying device 40 in FIG. 15, the excitation light emitted from the first optical pumping light source unit 12b is controlled so as to fix the monitor value with respect to the optical signal branched off at the coupler C3, and the wavelength bias is judged from a magnitude relation between the monitor value fixing excitation power of this beam of excitation light and the reference power (which the excitation power needed to get the same amplifying operation level of the EDF 11a as at the time of 40 waves at the maximum when allocating the wavelengths of 8 waves at the equal interval in the wavelength range). Thus, the wavelength allocation bias can be also estimated from the magnitude relation of the excitation optical power by effecting the control so that the monitor value gets fixed. Other control is the same as the optical amplifying device 10 does.

The optical amplifying device in the present embodiment is constructed to monotonically increase or decrease the gain wavelength characteristic of the optical signal by use of the wavelength equivalence unit (the gain equalizer), to estimate the wavelength allocation bias occurred as a concomitant of the change in the wavelength count by comparing the present monitor value of the optical power after the outputting of the gain equalizer with the wavelength equi-allocation power corresponding to the recognized wavelength count, to obtain the primary gradient quantity from the wavelength allocation bias, to cancel the primary gradient quantity by changing the sum of gains, and to fix the gain by adjusting the optical attenuation quantity of the variable optical attenuator. With this construction, the gain flatness can be compensated corresponding to the fluctuation in the wavelength allocation bias occurred as a concomitant of the change in the WDM wavelength count, thereby enabling a scheme of improvement of the optical transmission quality.

<Second Embodiment>

Judgement from Magnitude of Out. 1 with PP Corresponding to Wavelength Count

Figure 26:
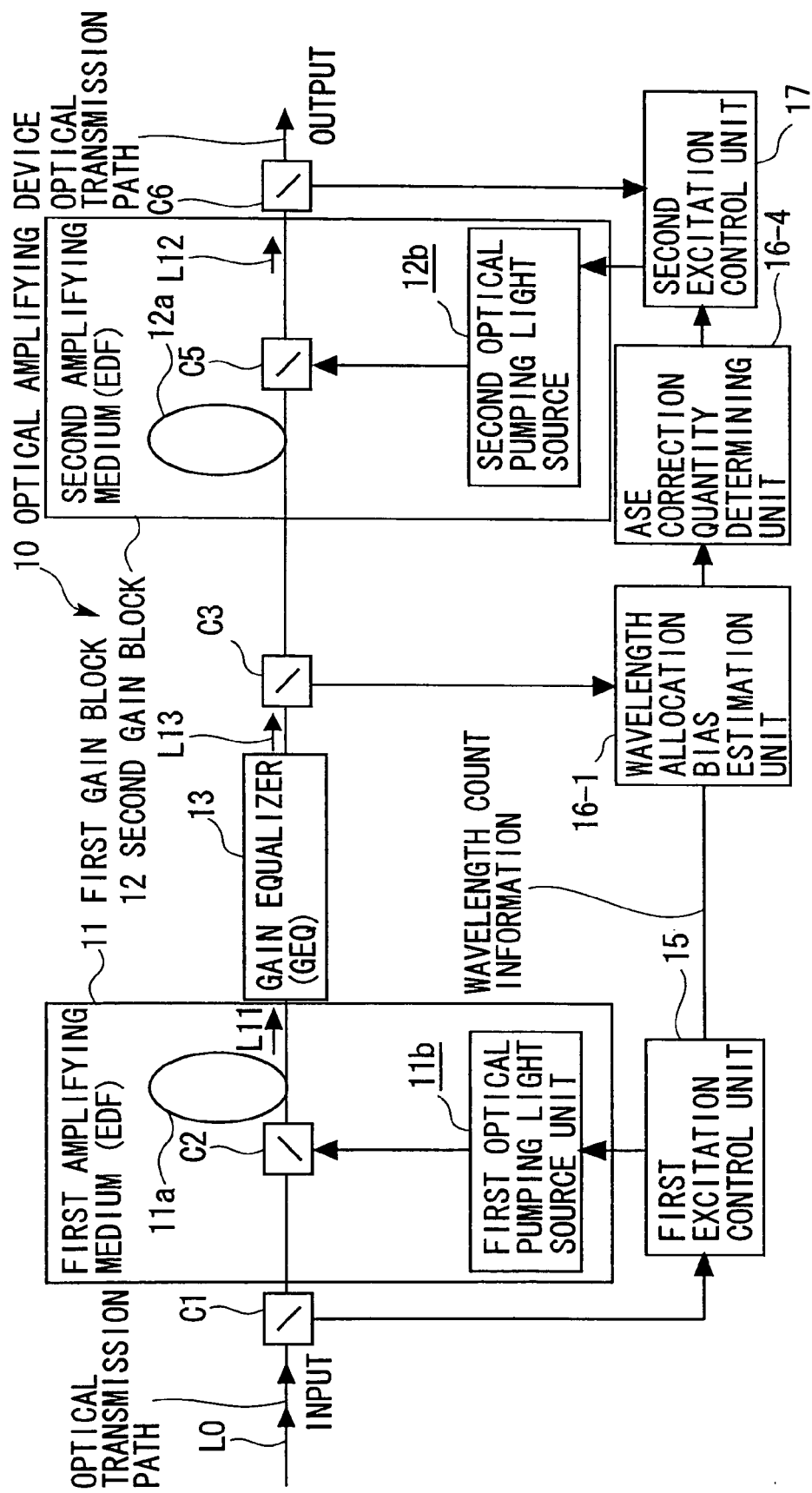
FIG. 26 is a view schematically showing a configuration of an optical amplifying device 10 in a second embodiment.

FIG. 26 is a view schematically showing a construction of the optical amplifier according to a second embodiment of the present invention. The optical amplifying device 10 is a device for amplifying the WDM optical signal and is applied to the optical repeater in the WDM transmission system.

The first gain block 11 installed on the input side of the optical amplifying device 10 is the EDFA (Erbium-Doped Fiber Amplifier) constructed of the first amplifying medium 11a (which will hereinafter be termed the EDF 11a) in which the active substance such as erbium ($Er^{3+}$), etc. for optical amplification is doped, the first optical pumping source unit 11b for emitting the excitation light, and the multiplexer C2.

The first optical pumping source unit 11b emits the excitation light via the multiplexer C2 installed on the optical input side of the EDF 11a. With this operation, the first gain block 11 amplifies (optical amplification) an input optical signal L0.

The second gain block 12 installed on the output side of the optical amplifying device 10 is the EDFA constructed of the second amplifying medium 12a (which will hereinafter be termed the EDF 12a) in which the active substance such as erbium ($Er^{3+}$), etc. for the optical amplification is doped, the second optical pumping source unit 12b for emitting the excitation light, and the multiplexer C5.

The second optical pumping source unit 12b emits the excitation light via the multiplexer C5 installed on the optical output side of the EDF 12a. With this operation, the second gain block 12 amplifies (optical amplification) an optical signal L13 from the wavelength equivalence unit (the gain equalizer) 13.

Herein, it is known that in the case of exciting the EDF on the optical input side (the front side of the EDE), then NF (Noise Factor) as the amplifier characteristic is improved, and, in the case of exciting the EDF on the optical output side (the rear side of the EDF), the amplifying efficiency as the amplifier characteristic is improved. Normally, in the optical repeater, the improvement of the NF is required of the amplifier installed at the optical input stage, and the improvement of the amplifying efficiency is required of the amplifier installed at the optical output stage. Therefore, the excitation takes place from the front side of the EDF 11a in the first gain block 11, and the excitation takes place from the rear side of the EDF 12a in the second gain block 12.

The wavelength equivalence unit 13 (which is also called the gain equalizer abbreviated hereinafter to the GEQ 13) equalizes wavelengths of the optical signals to be inputted, thereby equalizes gains of waveforms. Namely, the gain forms of the first gain block 11 and of the second gain block 12 are preset, and the gain wavelength characteristic of the optical signal from the first gain block 11 is adjusted to flatten the gain wavelength characteristic of the output signal from the second gain block 12.

Especially in the second embodiment, in the case of exciting the first optical pumping light source unit 11b by the excitation power serving as the amplifying operation level of the EDF 11a with respect to the WDM optical signal with the maximum wavelength count multiplexed, the GEQ 13 equalizes the gains so that the gain wavelength characteristic of the optical signal outputted from the first gain block 11 is monotonically increased or decreased (accordingly, the gain wavelength characteristic of the optical signal after being branched off at the coupler C3 takes the form of the monotone increase or the monotone decrease).

Figure 27:
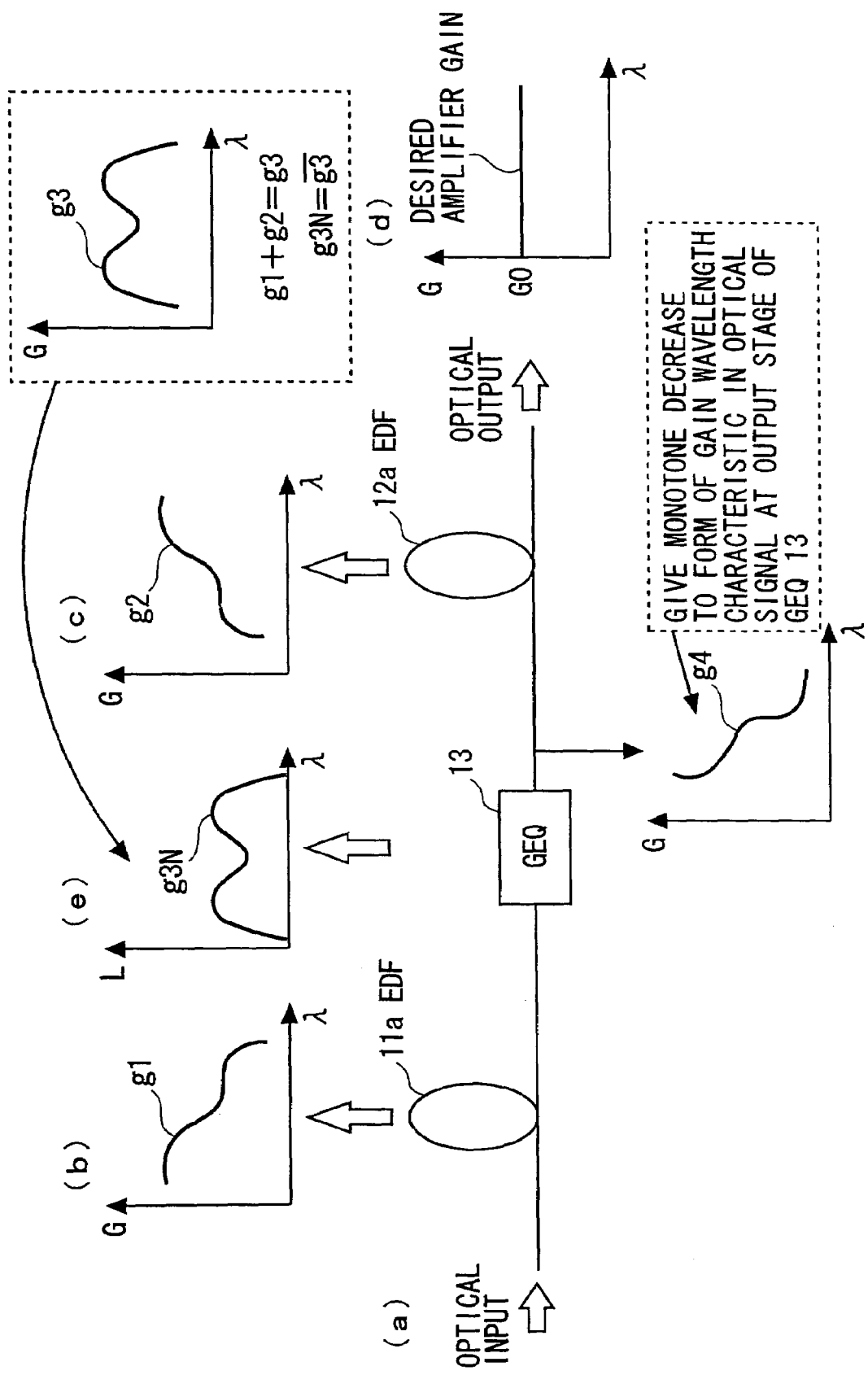
FIG. 27 is an explanatory diagram of a GEQ (Gain Equalizer) that monotonically decreases wavelength dependency of the gain.

FIG. 27 is an explanatory diagram showing gain equalization for monotonically decrease the gain wavelength characteristic. As described above, in the second embodiment, the EDF 11a, the GEQ 13 and the EDF 12a are serially connected within the optical amplifying device 10 as shown in FIG. 27(a) (the optical pumping light source unit, etc. is omitted), and the gain forms of the EDF 11a and the EDF 12a are preset as in FIGS. 27(b) and 27(c). Then, the GEQ 13 equalizes the gains by attenuating the optical signal as in FIG. 27(e) to obtain the flat gain form as in FIG. 27(d) at the output stage. The gain wavelength characteristic of the optical signal L13 at the output stage of the GEQ 13 is thereby monotonically decreased.

Thus, at first, a form of the gain wavelength characteristic of the EDF 12a at the rear stage of the device is determined on the premise that the desired amplifier gain G0 at an output time of the optical amplifying device 10 is flat. Herein, a gain form g2 of the EDF 12a is set so that the gain becomes larger as the wavelength gets longer (the actual design is that an average gain setting value of the EDF 12a is 8.4 dB, and an EDF length is 6.6 m). Then, the gain form of the EDF 11a before being wavelength-equalized by the GEQ 13 needs to take such a gain form g1 that the gain becomes smaller as the wavelength becomes longer in order to have a relation opposite to the gain form g2 of the EDF 12a (the actual design is that the average gain setting value of the EDF 11a is set to 22.1 dB, and the EDF length is set to 8.5 m). Then, the GEQ 13 makes a design to equalize a waveform of a gain form g3N opposed to the gain form g3 (=the gain form g1+the gain form g2).

Thus, when designing so that the EDF 11a, the GEQ 13 and the EDF 12a have the gain forms g1, g3N and g2 respectively, as a matter of course, the desired amplifier gain G0 becomes flat, and, at the output stage of the GEQ 13 in a halfway process, it follows that a gain form g4 into which the gain form g3N is disappeared (cut off) from the gain form g1 is obtained. This gain form g4 is namely a gain form when the input optical signal is given the monotone decrease gain wavelength characteristic. The manipulation performed in the way described above enables the acquisition of the optical signal having the gain wavelength characteristic taking the target form at the output stage of the GEQ 13.

FIG. 6 is a graphic chart showing a relation between the wavelength count and the excitation power of the optical pumping light source 11b. The axis of ordinates indicates the excitation power (dBm) of the optical pumping light source 11b, and the axis of the abscissa indicates the wavelength count (the number of wavelengths). For example, when the wavelength count of the input optical signal is 8 waves, the optical pumping light source 11b has P8 as the excitation power needed to get the same operation level of the EDF 11a as at the time of the maximum wavelength when 8 waves are allocated at the equal interval including the both side ends of the wavelength range. Therefore it follows that the excitation control unit 15 controls the optical pumping light source 11b to output the excitation power P8. Note that the excitation power of the optical pumping light source 11b for other wavelength counts is also obtained as in this graph.

Figure 28:
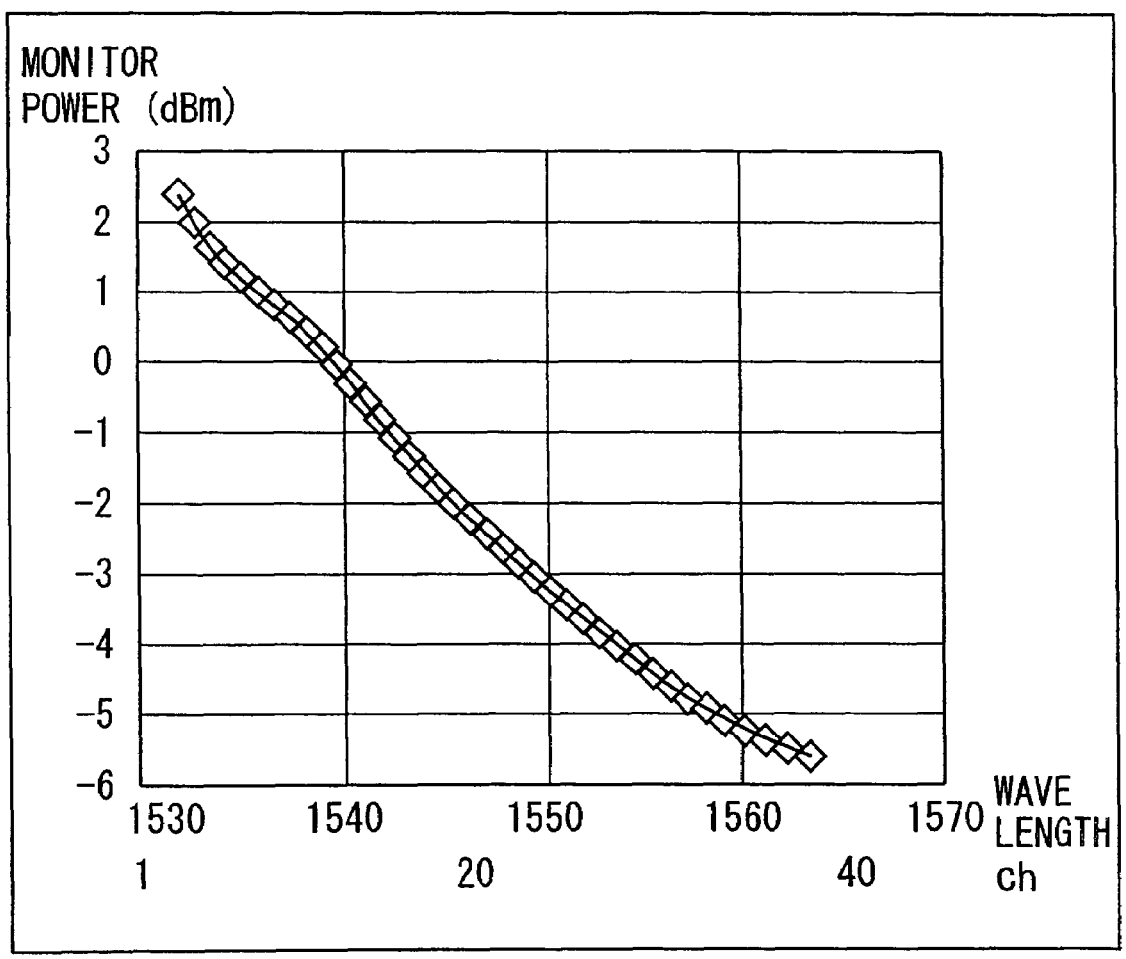
FIG. 28 is a diagram showing the wavelength dependency of signal optical power after equalization by the GEQ.

FIG. 28 is a graphic chart showing the gain wavelength characteristic of the optical signal L13 of which the wavelength count is 40 waves.

The wavelength allocation bias estimation unit 16-1 is previously stored with the power (the wavelength equi-allocation power) of the optical signals when allocating the wavelengths at the equal interval after the change in the wavelength count in the wavelength range, monitors the power of the optical signal after the outputting of the GEQ 13 via the coupler C3, and compares this present monitor value with the wavelength equi-allocation power corresponding to the recognized wavelength count, thereby estimating a wavelength allocation bias caused as a concomitant of the change in the wavelength count.

An ASE (Amplified Spontaneous Emission) correction quantity determining unit 16-4 is previously stored with an optimum ASE correction quantity in the case of the occurrence of the wavelength allocation bias, and obtains the ASE correction quantity from the wavelength allocation bias estimated by the wavelength allocation bias estimation unit 16-1.

The second excitation control unit 17 sets the second optical pumping light source unit 12b to emit the excitation power necessary for executing the ASE correction of the ASE correction quantity, and changes the sum of gains of the first gain block and of the second gain block.

Next, the construction and the operation of the optical amplifying device 10 will be described more specifically.

The optical amplifying device 10 in the second embodiment is, as shown in FIG. 26, constructed of the EDF 11a, the optical pumping light source 11b, the EDF 12a, the optical pumping light source 12b, the GEQ 13, the excitation control units 15, 17, 10-to-1 (10:1) couplers (which will hereinafter simply be called couplers) C1, C3, C4, C6 and the multiplexers C2, C5.

Further, the excitation control units 15, 17 include, though not illustrated, the PD units inside.

Input optical signals (WDM optical signals) L0 supplied from the optical transmission path are, at first, branched off at the coupler C1. One optical signal branched off is supplied to the EDF 11a. Simultaneously with this, the excitation light is supplied from the optical pumping light source 11b to the EDF 11a via the multiplexer C2.

Further, the other optical signal branched off at the coupler C1 is converted into an electric signal by the PD unit of the excitation control unit 15, wherein the power (the optical power) thereof is monitored.

An optical signal L13 outputted from the GEQ 13 is supplied to the EDF 12a. Moreover, the excitation light is supplied from the optical pumping light source 12b to the EDF 12a via the multiplexer C5.

Optical signals L12 amplified by the EDF 12a are branched off at the coupler C6, wherein one optical signal branched off is outputted onto the optical transmission path. Further, the other optical signal branched off is converted into the electric signal by the PD unit of the excitation control unit 17, and its power is monitored. Note that the following discussion exemplifies a configuration, wherein the wavelength range of the WDM optical signal is set tentatively from 1531.90 nm to 1563.05 nm, and the respective wavelengths have 40 waves at the maximum at the equal interval (i.e., a configuration of amplifying the optical signals of 40 waves of which the wavelengths are differentiated at the equal intervals within the wavelength range).

Given herein are descriptions of the excitation control units 15, 17 and the GEQ 13 about an operation in a steady state (i.e., there is no change in the WDM signal state, e.g., an operation when allocating 40 waves at the maximum).

The excitation control unit 15 sets the optical pumping light source 11b to emit the excitation power needed to get a predetermined amplifying operation level of the EDF 11a.

A gain wavelength characteristic of the optical signal L11 outputted from the first gain block 11 is monotonically increased or decreased by the GEQ 13.

Then, the second gain block 12 monitors the optical power of the output optical signal via the coupler C6 and performs, based on this monitor value, the excitation control of the optical pumping light source 12b so that a sum of gains of the first gain block 11 and of the second gain block 12 comes to a predetermined value. At this time, the second gain block 12 amplifies the optical signal of each wavelength in a gain form opposed to the gain wavelength characteristic that has been monotonically increased or decreased by the GEQ 13, thereby flattening the gain wavelength characteristic of the output optical signal.

Given next is an in-depth explanation about an operation including a design policy if a change occurs in the wavelength count (i.e., when setting an increase or a decrease). Note that the object of the second embodiment is similarly accomplished also in the case of setting the GEQ 13 to adjust the optical signal gain wavelength characteristic in any one of the monotone increase and the monotone decrease, and therefore the following discussion will deal with the case of monotonically decreasing the gain wavelength characteristic.

If a change occurs in the WDM signal state, both of the change in the wavelength count and the wavelength allocation bias caused as a concomitant of the change in the wavelength count, must be recognized.

The change in the wavelength count can be judged from the high and low power levels of the optical signal L0 inputted to the optical amplifying device 10. According to the second embodiment, a storage unit of the first excitation unit 15 retains a wavelength count table stored previously with the wavelength count associated with the WDM optical power measured for each wavelength count in a way that changes the wavelength count of the optical signal (WDM optical signal) L0 inputted to the amplifying device from "1" to "40" set as the maximum wavelength count (wherein the wavelengths are allocated at the equal interval). With this scheme, the first excitation control unit monitors the power of the optical signal branched off at the coupler C1, simultaneously refers to the wavelength count table, and obtains the power corresponding to this monitor value from the wavelength count table, thus acquiring the wavelength count associated with this power as a wavelength count of the input optical signal.

In connection with this, it can not be judged by the simple power measurement which side, the short wavelength side or the long wavelength side, the wavelength allocation bias including the bias of the wavelength count is biased to.

This being the case, the wavelength allocation bias is estimated from the power and the wavelength count of the output optical signal from the GEQ 13.

In the second embodiment, the control is conducted to fix the gain of the first gain block 11, and hence the power of the optical signal outputted from the first gain block 11 comes to have a predetermined value corresponding to the wavelength count. On the other hand, the GEQ 13 makes the adjustment to monotonically decrease the gain wavelength characteristic of the output optical signal L13, with the result that the output of the optical signal having a short wavelength is high, while the output of the optical signal having a long wavelength is low. Accordingly, it follows that the output of the optical signal L13 changes depending on the case where the wavelengths of the input optical signal L0 are equally allocated in the wavelength range and on the case where a bias occurs in the wavelength allocation of the input optical signal L0. Then, the wavelength allocation bias estimation unit 16-1 estimates the bias of the wavelength from a change quantity of this optical signal L13.

For estimating this wavelength bias, according to the second embodiment, the wavelength count is changed from "1" to the maximum wavelength count (40 waves) so that the wavelengths of the input optical signal L0 are equally allocated in the wavelength range, the power (the wavelength equi-allocation power) of the optical signal L13 in the case of setting each wavelength count is measured beforehand, and the storage unit (illustrated) of the first excitation control unit 15 retains an equi-allocation table stored with the wavelength count associated with the wavelength equi-allocation power in the case of setting this wavelength count.

Then, the wavelength allocation bias estimation unit 16-1 recognizes the wavelength count based on the power of the input optical signal L0 or the wavelength count information generated by the first excitation control unit 15 and, if there is the change in the wavelength count, obtains the wavelength equi-allocation power associated with this post-change wavelength count from the equi-allocation table. Further, the optical signals L13 from the GEQ 13 are branched off at the coupler C3, the power of the optical signal L13 is converted into the electric signal and then monitored by the PD unit 16a, and this present monitor value is compared with the wavelength equi-allocation power, thereby obtaining, as a bias, a difference of the power from the monitor value.

For instance, when the wavelength count changes to 1 wave, the power of the optical signal L13 of ch1 becomes large for the wavelength equi-allocation power, the power of the optical signal L13 of ch20 is substantially at the same level of the wavelength equi-allocation power, and the power of the optical signal L13 of ch40 becomes small for the wavelength equi-allocation power.

Figure 29:
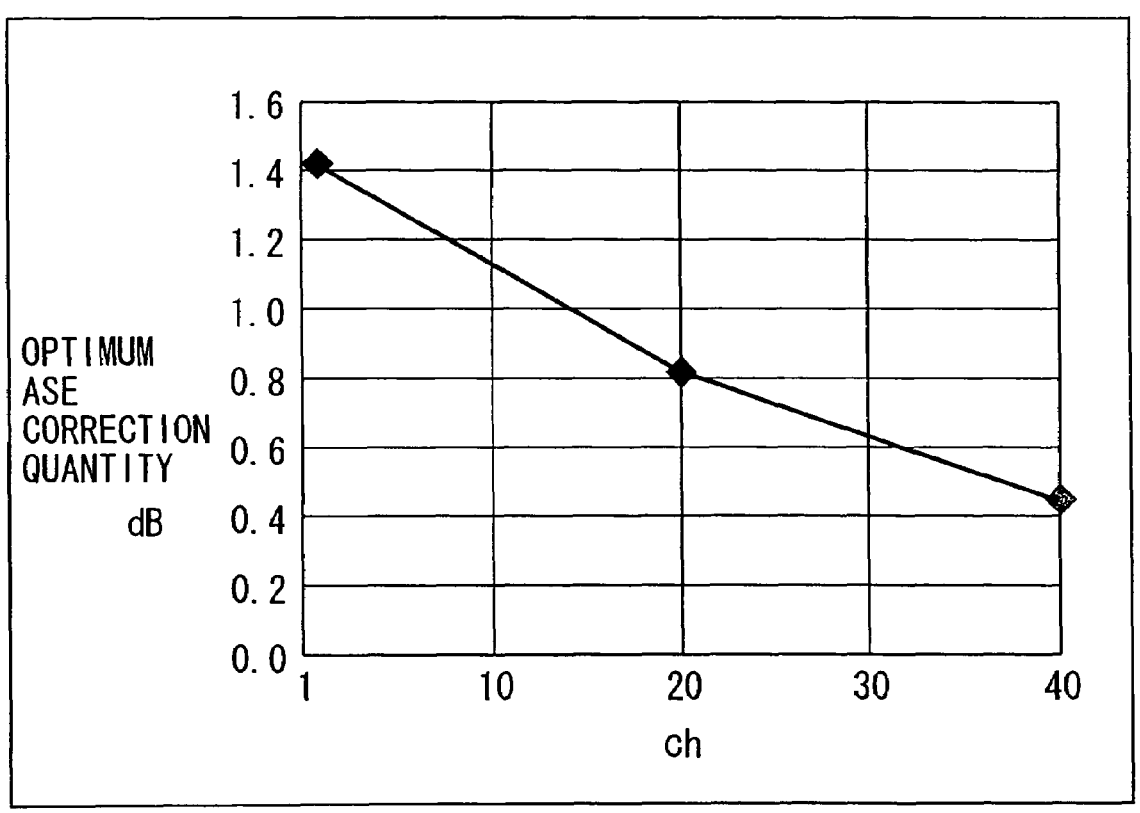
FIG. 29 is a diagram showing the optimum ASE correction quantity per ch.

Moreover, the ASE correction quantity determining unit 16-4 determines an optimum ASE correction quantity based on this bias. This optimum ASE correction quantity takes, as shown in FIG. 29, the highest value (1.4 dB) at ch1 and the smallest value (approximately 0.4 dB) at ch40.

For obtaining this optimum ASE correction quantity, according to the second embodiment, the optimum ASE correction quantity per ch is previously measured, and the storage unit of the ASE correction quantity determining unit 16-4 retains a correction quantity table stored with ch associated with the optical ASE correction quantity at each ch. Further, the wavelength count of the input optical signal L0 is set to 1 wave, and a bias is measured beforehand when changing its wavelength (ch) from ch1 up to ch40 in sequence. Then, the storage unit of the ASE correction quantity determining unit 16-4 retains a wavelength bias table stored with ch associated with the bias occurred per ch.

Then, the wavelength count changes as described above, and, when the wavelength allocation bias estimation unit 16-1 estimates the bias, the ASE correction quantity determining unit 16-4 obtains ch associated with the bias from the bias table and obtains the optimum ASE correction quantity associated with ch from the correction quantity table.

At this time, the wavelength count of the input optical signal is 1 wave, and ch is ch1. In this case, the ASE correction quantity determining unit 16-4 obtains ch1 associated therewith from the bias table on the basis of the bias acquired by the wavelength allocation bias estimation unit 16-1, and obtains 1.4 dB as the optimum ASE correction quantity associated with ch1 by referring to the correction quantity table. Further, the wavelength count of the input optical signal is 2 waves, and ch is ch10 and ch30. In this case, a bias serving as an intermediate value (average) of these wavelengths ch is obtained by the wavelength allocation bias estimation unit, and hence the ASE correction quantity determining unit 16-4 acquires ch20 associated therewith from the bias table on the basis of this bias, and obtains 0.8 dB as the optimum ASE correction quantity associated with ch20 in a way that refers to the correction quantity table.

Next, the ASE correction is executed based on this optimum ASE correction quantity. The ASE correction can be restrained by manipulating a sum of gains of the EDF 11a and of the EDF 12a. For example, when 1.4 dB is obtained as the optimum ASE correction quantity, it follows that the value monitored by the PD unit, i.e., the gain controlled to be fixed including the ASE (Amplified Spontaneous Emission), may be increased by 1.4 dB.

When adjusting the gain for 1.4 dB, however, the optical pumping light source 11b effects the excitation so that the gain of the first gain block is controlled to be fixed to a specified gain, and it therefore follows that the excitation power on the side of the second optical pumping light source 12b is to be adjusted. The second excitation control unit 17 obtains a gain adjustment value based on the optimum ASE correction quantity determined by the differential control unit 16c, controls the optical pumping light source 12b by use of the gain adjustment value, and performs the ASE correction in a way that adjusts the sum of gains of the EDFs 11a, 12a, thereby acquiring a predetermined signal gain.

With this manipulation, it is possible to compensate wavelength bias dependency of the optimum ASE correction quantity when the wavelength allocation bias largely changes as the wavelength count varies and, besides, to fix the gain. Hence, it is feasible to configure the WDM system capable of restraining the gain fluctuation when increasing and decreasing the wavelengths, improving the optical transmission quality and enhancing the operability and the reliability.

<Third Embodiment>

Identification Using Power of LD1 when Effecting AGC at Stage of GEQ

In the second embodiment discussed above, the wavelength equi-allocation power is compared with the power of the optical signal L13, thus recognizing the wavelength bias.

According to the third embodiment, however, first excitation light power when controlling the power of the optical signal L13 to be fixed is compared with first excitation light power (reference excitation light power) when the wavelengths are equally allocated, thus recognizing a wavelength bias. Note that the configuration other than this wavelength bias recognizing method in the third embodiment is the same as the second embodiment discussed above has, and hence their repetitive explanations are omitted by marking the same components with the same numerals and symbols.

Figure 30:
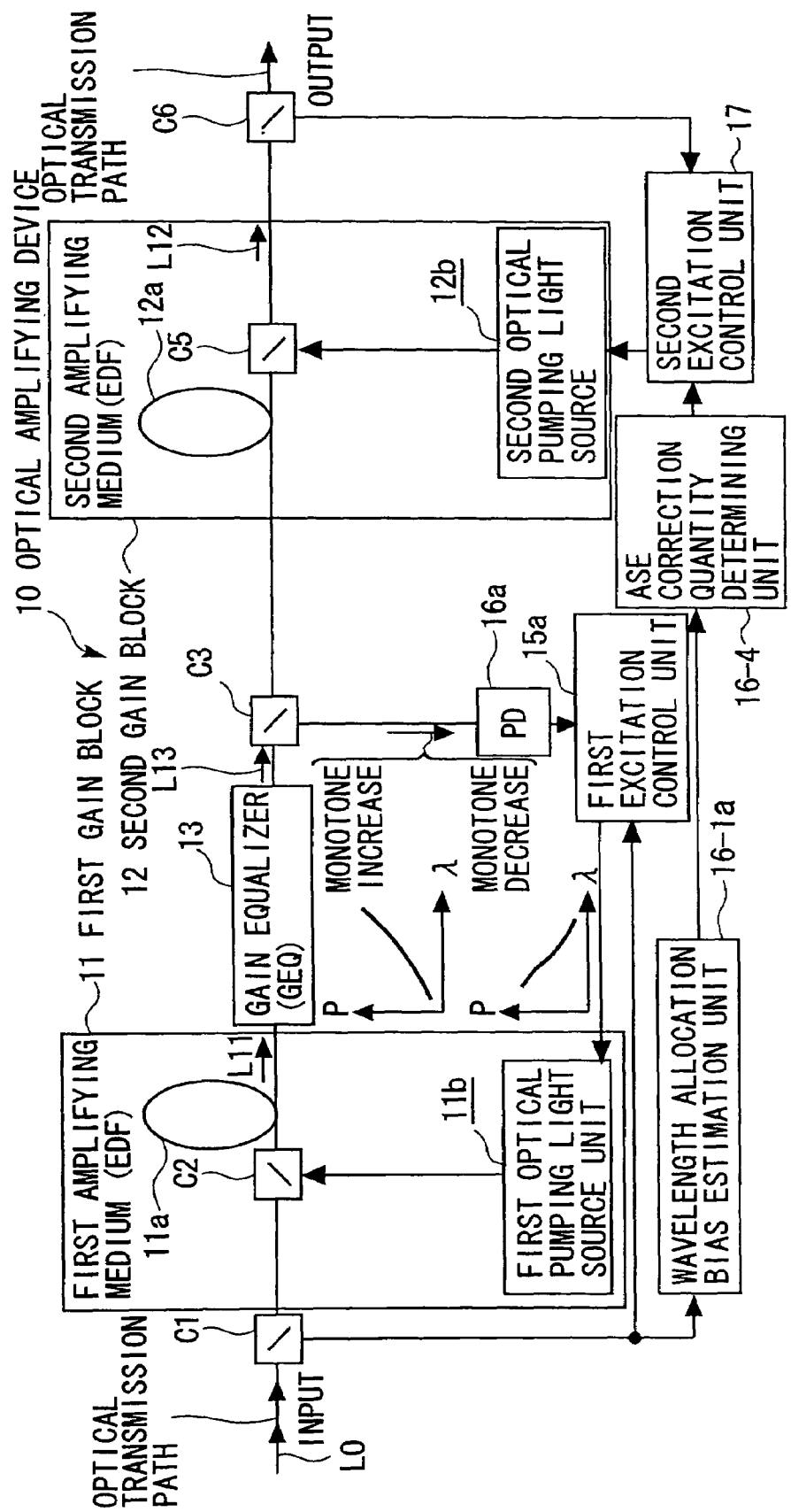
FIG. 30 is a view schematically showing a configuration of the optical amplifying device 10 in a third embodiment.

FIG. 30 is a view schematically showing a configuration of the optical amplifying device 10 in the third embodiment.

In the third embodiment, a first excitation control unit 15a controls the first optical pumping light source unit to output the monitor value fixing excitation power so that a monitor value with respect to the optical signal L13 outputted from the GEQ 13, i.e., a gain between the couplers C1–C3 in FIG. 30, becomes fixed without depending on the change in the wavelength of the input optical signal L0.

Further, a wavelength allocation bias estimation unit 16-1a recognizes the wavelength count from the power of the optical signal to be inputted and sets, if there is a change in the wavelength count, the excitation power, as reference excitation power, which is needed to get the same amplifying level of the first amplifying medium as at the time of the maximum wavelength count when allocating the wavelengths after the wavelength count has changed at the equal interval in the wavelength range, and compares the monitor value fixing power with the reference excitation power, thereby estimating the wavelength allocation bias occurred as a concomitant of the change in the wavelength count.

The GEQ 13 makes an adjustment to monotonically decrease the optical signal gain wavelength characteristic. Accordingly, when the first excitation control unit 15a controls the first optical pumping light source unit to fix the monitor value of the output optical signal L13 from the GEQ13, it follows that the excitation light power (the monitor value fixing power) changes corresponding to the wavelength of the input signal. Such being the case, the wavelengths of the input signal are allocated at the equal interval in the wavelength range, the excitation power required to get the same amplifying level of the first amplifying medium as at the time of the maximum wavelength count, i.e., the excitation power when the monitor value (the power) of the output signal L13 given from the GEQ 13 is controlled to be fixed, is previously stored as the reference excitation power, and the wavelength allocation bias occurred as a concomitant of the change in the wavelength count is estimated by comparing the monitor value fixing power with the reference excitation power.

Figure 31:
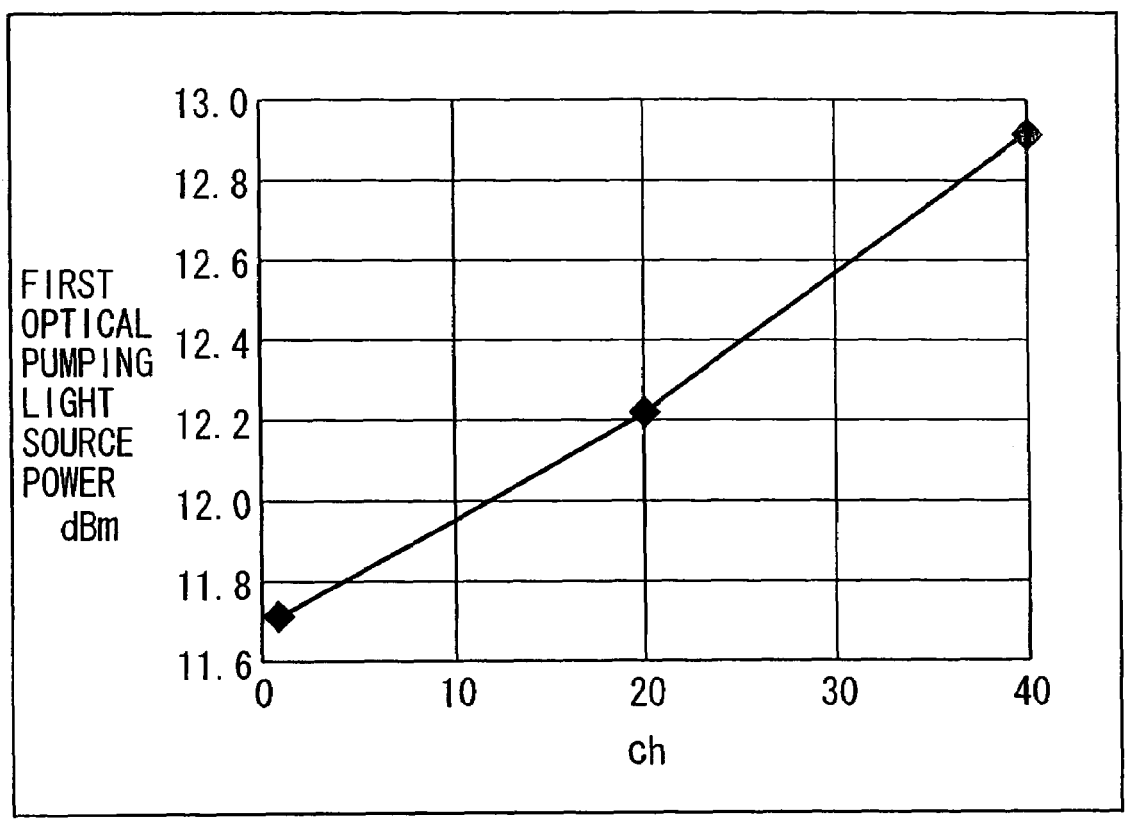
FIG. 31 is a diagram showing excitation light power of a front-staged EDF in each ch when the wavelength count of the input optical signal is set to 1 wave.

FIG. 31 shows the excitation light power of the EDF provided at the front stage in each ch when the wavelength count of the input optical signal is set to, for instance, 1 wave. In FIG. 31, the axis of abscissa indicates ch, and the axis of ordinates indicates the excitation power of the first optical pumping light source 11b.

As shown in FIG. 31, when setting the signal in ch1, the EDF operates at a lower operating level than at the time of 40 waves, and, when setting the signal in ch40, the EDF operates at a higher operating level than at the time of 40 waves. It is understood therefrom that the excitation light power increases toward ch40 from ch1.

Thus, when manipulating to monotonically decrease the gain wavelength characteristic, the excitation light power having the wavelength allocation bias can be given the relation in magnitude, and the wavelength bias can be estimated.

For estimating this wavelength bias, according to the third embodiment, the wavelength count changes from "1" to the maximum wavelength count (40 waves) so that the wavelengths of the input optical signal L0 are equally allocated at the equal interval in the wavelength range, there is previously measured the excitation power (the reference excitation power) of the first optical pumping light source unit 11b when the first excitation control unit 15a controls the power of the optical signal L13 to fix the gain between the couplers C1–C3 in FIG. 30, and the storage unit (unillustrated) of the first excitation control unit 15a retains a reference power table stored with the wavelength count associated with the reference excitation power when setting each wavelength count.

Then, the wavelength allocation bias estimating unit 16-1a recognizes the wavelength count based on the power of the input optical signal L0 or the wavelength count information generated by the first excitation control unit 15 and, if there is the change in the wavelength count, obtains the reference excitation power associated with this post-change wavelength count from the reference power table. Further, there is monitored the excitation power of the first optical pumping light source unit 11b when the power of the optical signal L13 from the GEQ is controlled to be fixed (to the predetermined value), and this present monitor value is compared with the reference excitation power, thereby obtaining this power difference as a bias.

For example, when the wavelength count of the input optical signal is 1 wave, and, if the present monitor value is smaller than the reference excitation power (Pb), it can be recognized that the wavelength allocation bias of this optical signal is in a state where the signal exists on the short wavelength side. Alternatively if the monitor value is larger than the reference excitation power Pb, it can be recognized that the wavelength allocation bias of this optical signal is in a state where the signal exists on the long wavelength side.

Next, a relation between the wavelength allocation bias and the excitation light power will be explained. FIG. 10 is a graphic chart showing the relation between the wavelength allocation bias and the excitation light power. The axis of ordinates indicates the excitation light power (dBm) of the first optical pumping light source unit, and the axis of abscissa indicates the wavelength allocation bias.

Given next is a description of how the wavelength allocation bias is estimated at the time of 1 wave with large influence of the ASE. When the wavelength count is 1 wave and the wavelength is ch20, the excitation light power of the first optical pumping light source unit is on the order of 12.2 dBm, and this value is previously measured and stored as the reference excitation light power. Then, if the present monitor value of the excitation light power is 11.7 dBm, a relation such as 11.7<12.2 is established. Hence, the wavelength allocation bias estimation unit 16-1a can recognize therefrom that the wavelength allocation bias of the optical signal inputted at the present to the optical amplifying device 10 is in the sate where the signal exists on the short wavelength side.

Further, the wavelength allocation estimation unit 16-1a, if the presently-monitored value is 12.9 dBm, the relation being such as 12.2<12.9, can recognize that the wavelength allocation bias of the optical signal inputted at the present to the optical amplifying device 10 is in the state where the signal exists the long wavelength side.

Then, the wavelength count of the input optical signal L0 is set to 1 wave, and a bias is measured beforehand when changing its wavelength (ch) from ch1 up to ch40 in sequence. The storage unit of the ASE correction quantity determining unit 16-4 retains a wavelength bias table stored with ch associated with the bias occurred per ch.

Then, as described above, the wavelength count changes, and the wavelength allocation bias estimation unit 16-1 estimates the bias. In this case, the ASE correction quantity determining unit 16-4 obtains ch associated with the bias from the bias table, and acquires the optimum ASE correction quantity associated with ch from the correction quantity table.

Further, the ASE correction based on the optimum ASE correction quantity is the same as in the second embodiment.

As discussed above, according to the third embodiment, as in the second embodiment, it is possible to compensate the wavelength bias dependency of the optimum ASE correction quantity when the wavelength allocation bias largely changes as the wavelength count varies and, besides, to fix the gain. Hence, it is feasible to configure the WDM system capable of restraining the gain fluctuation when increasing and decreasing the wavelengths, improving the optical transmission quality and enhancing the operability and the reliability.

<Fourth Embodiment>

In the second embodiment, the GEQ 13 monotonically increases or decreases the gain wavelength characteristic of the optical signal, however, according to a fourth embodiment, as a substitute for the GEQ 13, a filter 13b is inserted in a line branching from the coupler C3 and monotonically increases or decreases the gain wavelength characteristic of the optical signal. In the fourth embodiment, other configurations are the same as those in the second embodiment discussed above, and hence the repetitive explanations are omitted by marking the same components with the same numerals and symbols.

Figure 32:
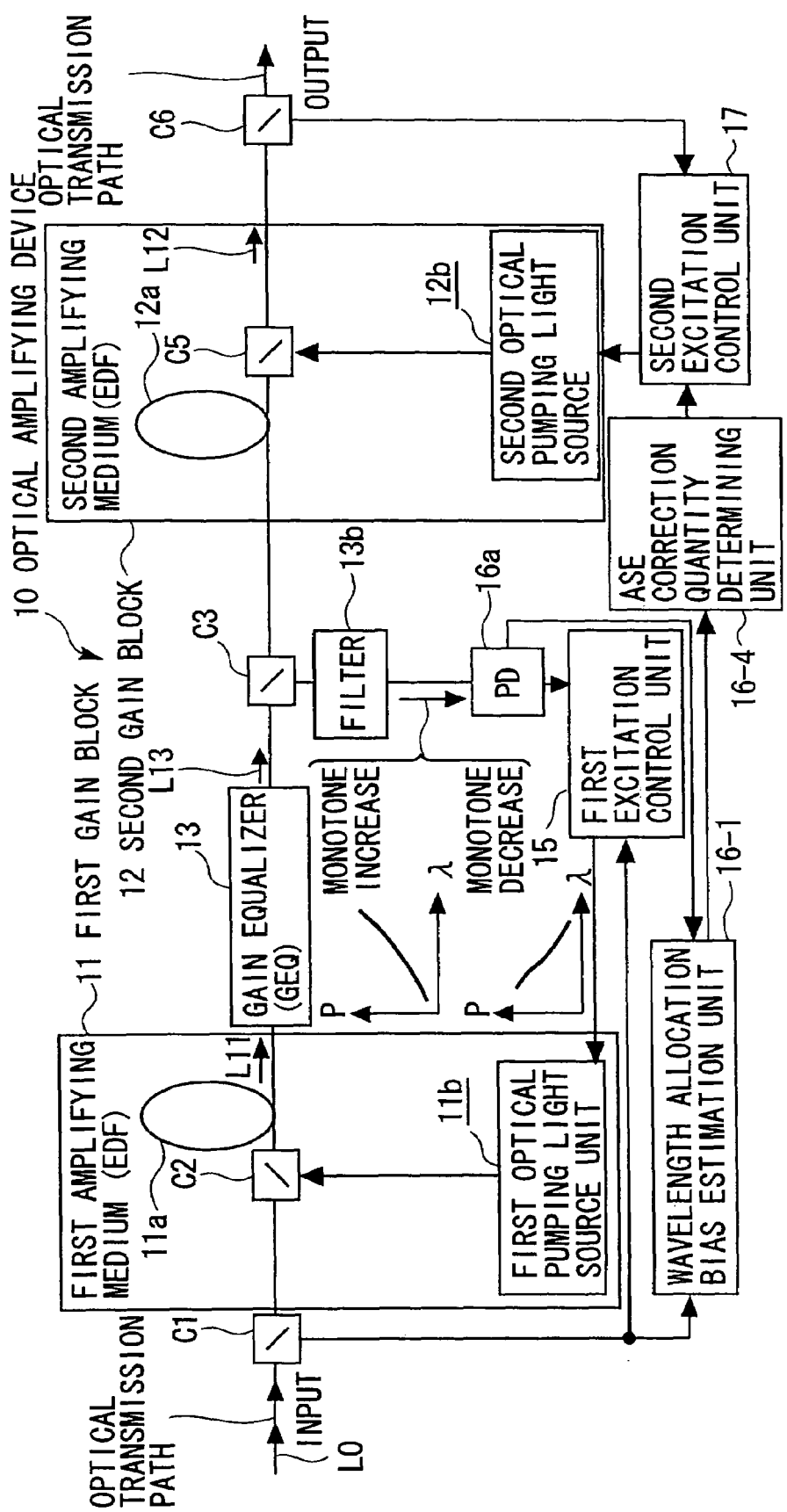
FIG. 32 is a view schematically showing a configuration of the optical amplifying device 10 in a fourth embodiment.

FIG. 32 is a view schematically showing a configuration of the optical amplifying device 10 in the fourth embodiment.

A wavelength equivalence unit (gain equalizer (GEQ)) 13a according to the fourth embodiment executes the wavelength equalizing process of the optical signal outputted from the first gain block 11.

Further, the filter 13b, if the first optical pumping light source unit is excited by the excitation power serving as the amplifying operation level of the first amplifying medium when the wavelength count of the optical signal comes to the maximum, attenuates the optical signal outputted from the gain equalizer via the first gain block according to the wavelength, and monotonically increases or decreases the gain wavelength characteristic of the optical signal.

Based on the power of the optical signal of which the gain wavelength characteristic is monotonically increased or decreased by this filter 13b, the wavelength allocation bias estimation unit 16-1 estimates the wavelength allocation bias, and the ASE correction quantity determining unit 16-4 cooperating with the second excitation control unit 17 obtains the optimum ASE correction quantity and executes the ASE correction. These processes are the same as those in the second embodiment discussed above.

Through these processes, the fourth embodiment acquires the same effects as those in the second embodiment. Moreover, the fourth embodiment is effective in such a case that the GEQ 13 can not be so design as to monotonically decrease or increase the gain wavelength characteristic in terms of the relation with the gain forms of the first gain block 11 and of the second gain block 12 as shown in FIG. 13.

<Fifth Embodiment>

Figure 33:
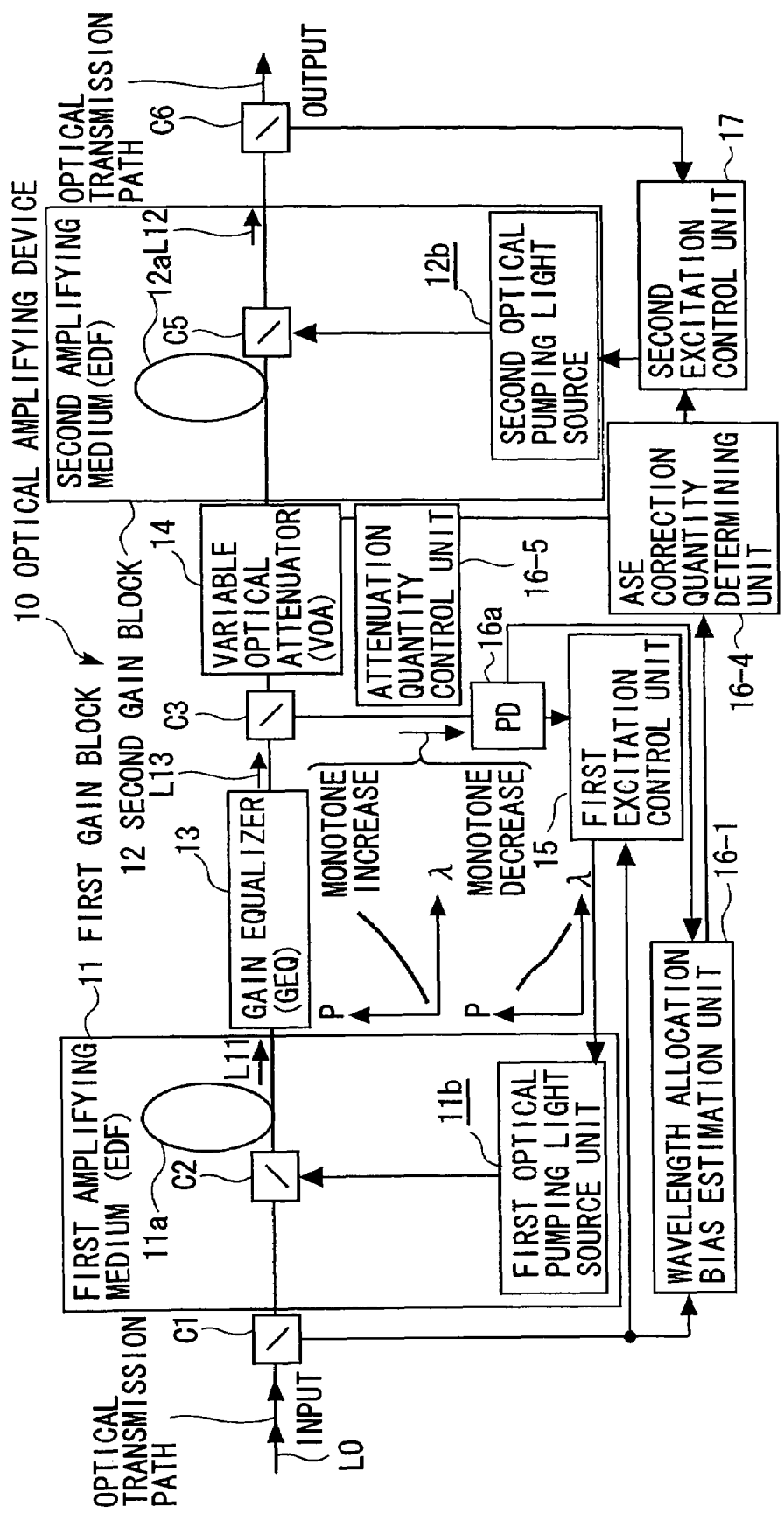
FIG. 33 is a view schematically showing a configuration of the optical amplifying device 10 in a fifth embodiment.

FIG. 33 is a view schematically showing a configuration of the optical amplifying device 10 in a fifth embodiment.

The second, third and fourth embodiments discussed above have involved using the method of changing the gain of the second EDF in the case of making the ASE correction. The present invention is not, however, limited to this method, wherein an amplifier having a built-in VOA may adjust the amplifier gain by fluctuating a VOA loss.

The fifth embodiment, as compared with the second embodiment described above, has a different configuration for fluctuating the VOA loss in the case of making the ASE correction, but other configurations are the same. Therefore, the repetitive explanations are omitted by marking the same components as those in the second embodiment discussed above with the same numerals and symbols.

A variable optical attenuator 14 (which will hereinafter be abbreviated to a VOA 14) is disposed between the first gain block 11 and the second gain block 12, and adjusts an optical attenuation quantity based on an attenuation quantity setting signal (namely, the VOA 14 changes the attenuation quantity to obtain a desired amplifier gain).

An attenuation quantity control unit 16-5 obtains an optical attenuation quantity that should be adjusted based on the optimum ASE correction quantity, and outputs the attenuation quantity setting signal, thereby controlling the VOA 14.

When the ASE correction quantity obtained by the ASE correction quantity determining unit 16-4 is, e.g., 1.4 dB, the attenuation quantity control unit 16-5 controls the VOA 14 by outputting the attenuation quantity setting signal so that the optical attenuation quantity becomes 1.4 dB. The ASE correction is thereby conducted.

Thus, according to the fifth embodiment, the same effects as those in the embodiments discussed above are acquired.

<Sixth Embodiment>

Figure 25:
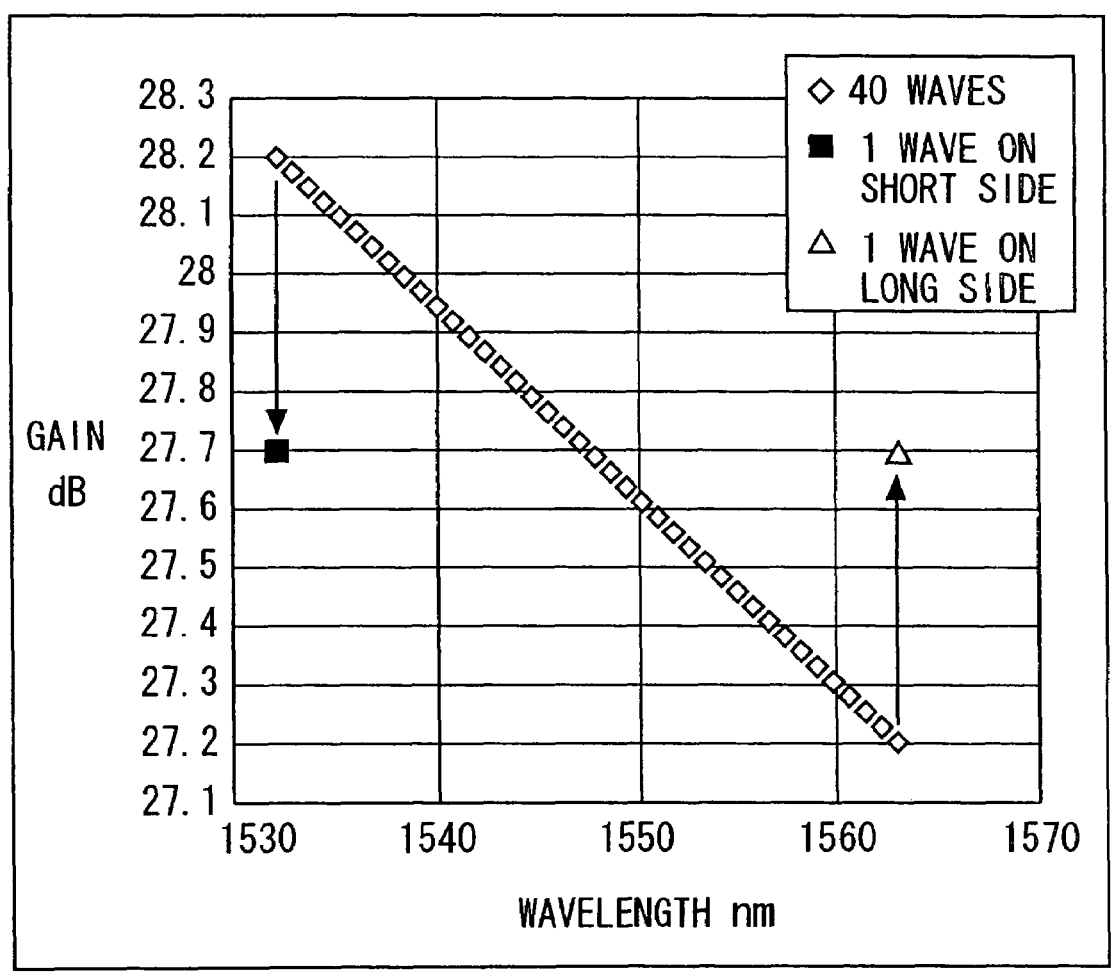
FIG. 25 is a diagram showing a gain fluctuation derived from a primary gradient of the gain.

In the EDFA exemplified in the first embodiment, if a loss of the optical component in the route of the optical signal or an EDF length deviates from the design, as shown in FIG. 25, a primary gradient gain wavelength characteristic occurs. A direction of the primary gradient is a direction occurred if the loss of the optical component is large or if the EDF length is short. Conversely to this, if the loss of the optical component is small, or if the EDF length is long, there occurs a gradient opposite to what is shown in FIG. 25.

In the EDFA where the primary gradient occurs when the wavelength count is 40 waves, as shown in FIG. 25, the signal gain fluctuates when the wavelength count changes to 1 wave. This occurs because of the EDFA having a mechanism of controlling the average gain and becomes conspicuous when biased to the short wavelength side or the long wavelength side. Further, the gain fluctuation comes to have the worst degree when the wavelength count changes to 40 waves from 1 wave, and this case will be exemplified. A relation between a ch allocation and the gain fluctuation quantity from the gain at the time of 40 waves becomes as illustrated in FIG. 34.

Figure 35:
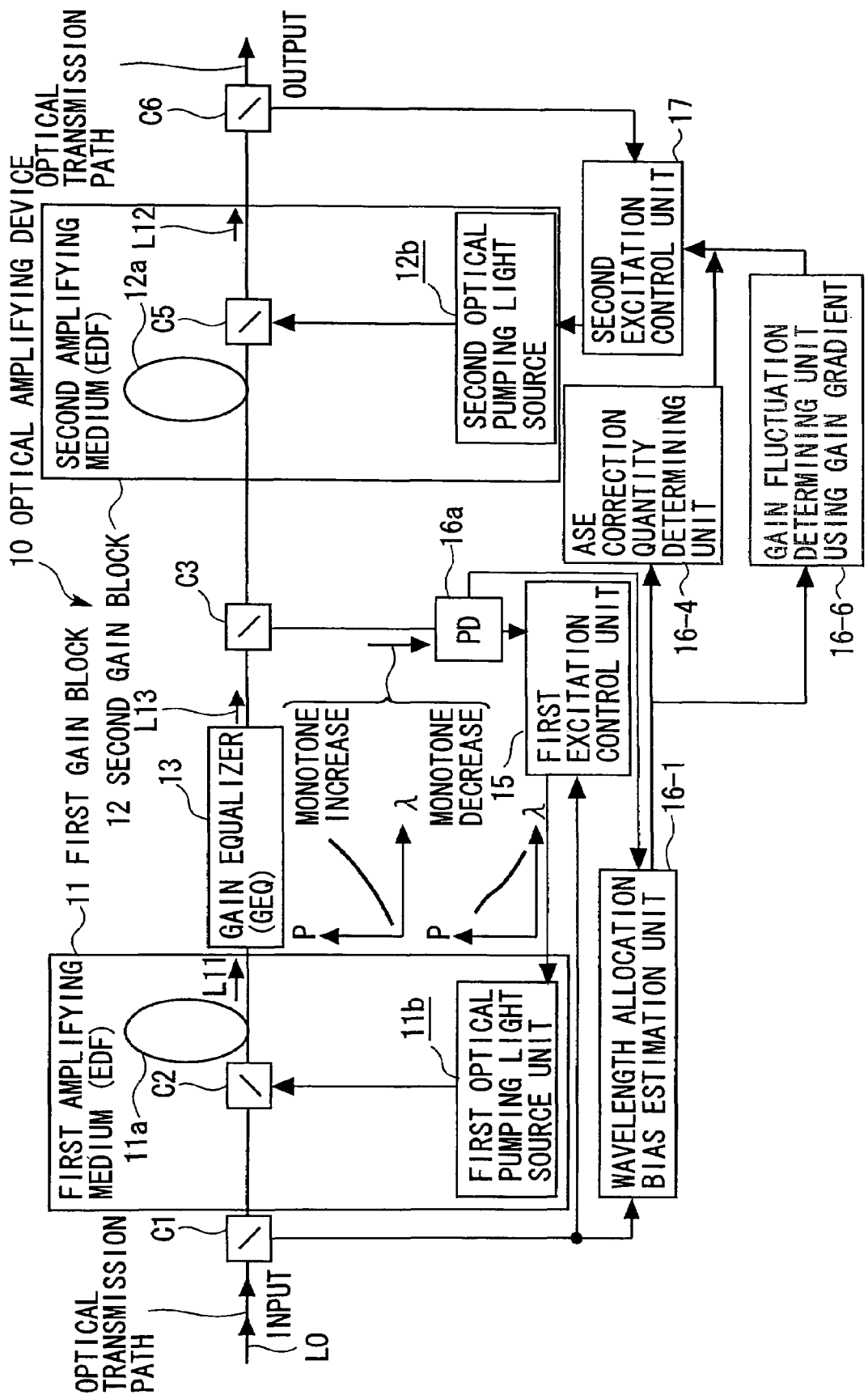
FIG. 35 is a view schematically showing a configuration of the optical amplifying device 10 in a sixth embodiment.

FIG. 35 is a view schematically showing a configuration of the optical amplifying device 10 in the sixth embodiment. The sixth embodiment has, as compared with the second embodiment discussed above, a different configuration of including a gain fluctuation determining unit 16-6 and correcting the primary gradient occurred in the output signal, and other configurations are the same. Therefore, the repetitive explanations are omitted by marking the same components as those in the second embodiment discussed above with the same numerals and symbols.

Figure 34:
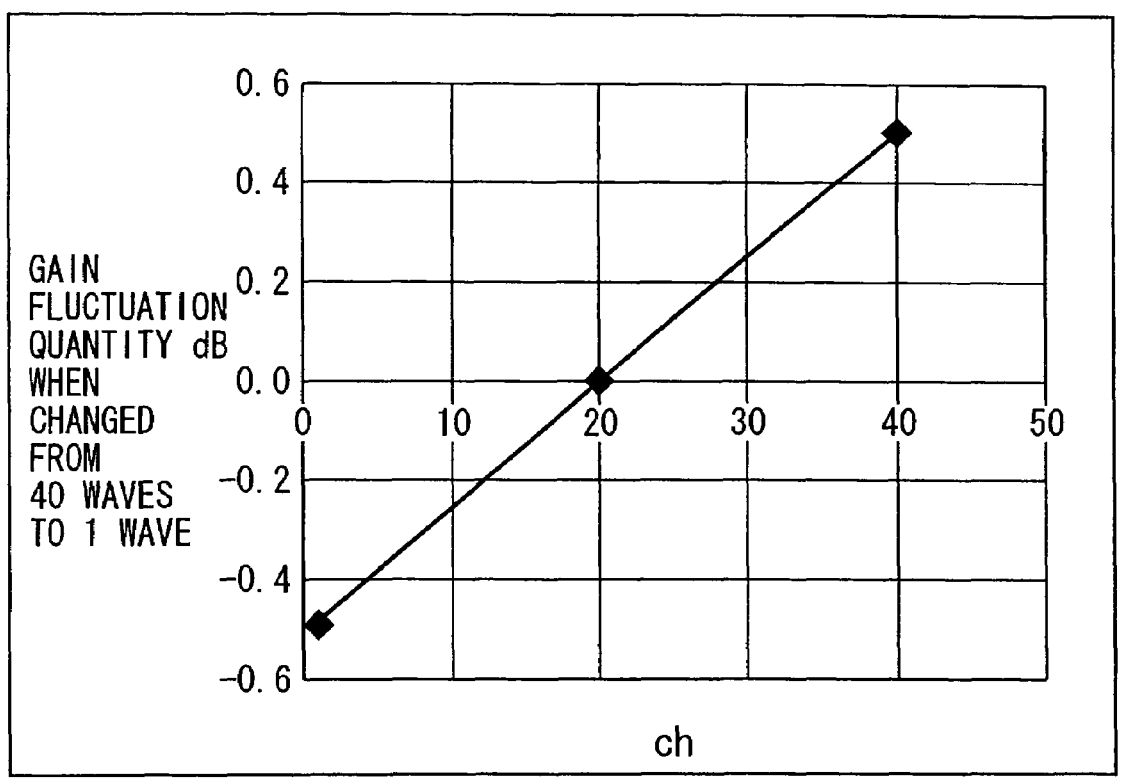
FIG. 34 is a diagram showing a gain fluctuation quantity when changing the wavelength count from 40 waves to 1 wave.

In the sixth embodiment, a gain fluctuation quantity when changing the wavelength count from 40 waves to 1 wave as shown in FIG. 34 is measured per ch, and the storage unit (unillustrated) of the gain fluctuation determining unit 16-6 retains a fluctuation quantity table stored with ch associated a value (which is obtained by multiplying the gain fluctuation quantity by −1, and is called a primary gradient correction value) for correcting the gain fluctuation quantity for each ch. Further, the wavelength count of the input optical signal L0 is set to 1 wave, and a bias when changing the wavelength (ch) from ch1 to ch40 in sequence is measured beforehand. Then, the storage unit of the ASE correction quantity determining unit 16-4 retains a wavelength bias table stored with ch associated with the bias per ch.

Then, as in the embodiments discussed above, when the wavelength allocation bias estimation unit 16-6 estimates the wavelength allocation bias, the gain fluctuation determining unit 16-6 obtains ch associated with this bias from the wavelength bias table and acquires a primary gradient correction value associated with ch from the fluctuation quantity table. The second excitation control unit 17 adjusts a target value for the gain control on the basis of the primary gradient correction value. Namely, as shown in FIG. 25, when changing the wavelength ch from 40 waves to 1 wave (1ch), according to the configuration in the second embodiment, the gain of ch1 fluctuates down to 27.7 dB from 28.2 dB. According to the sixth embodiment, however, the gain fluctuation determining unit 16-6 obtains 0.5 dB as the primary gradient correction value associated with ch1, and the second excitation control unit 17 controls to obtain 28.5 dB in a way that adds the primary gradient correction quantity of 0.5 dB to the target value 27.7 dB for the gain control at the time of 40 waves. Through this manipulation, the gain fluctuation caused when setting the increase or decrease is restrained.

According to the sixth embodiment, in addition to the effects in the second embodiment, it is possible to restrain the gain fluctuation due to the primary gradient of the output optical signal.

Note that the sixth embodiment takes the configuration, wherein the optimum ASE correction quantity is obtained from the wavelength allocation bias, and the ASE correction based on the optimum ASE correction quantity and the adjustment of the target value for the gain control based on the primary gradient correction value, are simultaneously executed, however, without being limited to this configuration, there may be taken a configuration of only adjusting the target value for the gain control based on the primary gradient correction value in a way that omits the ASE correction quantity determining unit 16-4.

As explained above, according to the present invention, it is feasible to provide the optical amplifying device contrived to improve the optical transmission quality by compensating the gain flatness even for the fluctuation in the WDM signal state.

What is claimed is:

1. An optical amplifying device amplifying a WDM optical signal, comprising:

a first gain block constructed of a first amplifying medium doped with an active substance for optical amplification and of a first optical pumping light source unit for emitting excitation light, said first gain block serving to effect the optical amplification;

a second gain block constructed of a second amplifying medium doped with an active substance for the optical amplification and of a second optical pumping light source unit for emitting the excitation light, said second gain block serving to effect the optical amplification;

a gain equalizer for, in the case of exciting said first optical pumping light source unit by excitation power serving as an amplification operating level of said first amplifying medium at the time of a maximum wavelength count of the optical signal, monotonically increasing or decreasing a gain wavelength characteristic of the optical signal outputted from said first gain block;

a variable optical attenuator, disposed between said first gain block and said second gain block, fixing a gain by adjusting an optical attenuation quantity based on an attenuation quantity setting signal;

a first excitation control unit generating a piece of wavelength count information by recognizing a wavelength count from power of the optical signal to be inputted and for, if there is a change in the wavelength count, setting said first optical pumping light source unit to emit the excitation power needed to get the same amplifying operating level of said first amplifying medium as at the time of the maximum wavelength count when allocating wavelengths after the change in the wavelength count at an equal interval in a wavelength range;

a wavelength allocation bias estimation unit previously storing wavelength equi-allocation power of the optical signal when allocating the wavelengths after the change in the wavelength count at the equal interval in the wavelength range, recognizing the wavelength count based on the wavelength count information, comparing a present monitor value of the optical power after outputting of said gain equalizer with the wavelength equi-allocation power associated with the recognized wavelength count, and thus estimating a wavelength allocation bias occurred as a concomitant of the change in the wavelength count;

a primary gradient quantity calculation unit obtaining a primary gradient quantity defined as a gain deviation from the wavelength allocation bias;

a second excitation control unit setting, in said second optical pumping light source unit, the excitation power required canceling the primary gradient quantity, and changing a sum of gains of said first gain block and of said second gain block; and an attenuation quantity control unit controlling said variable optical attenuator by obtaining an optical attenuation quantity that should be adjusted from the present monitor value and outputting the attenuation quantity setting signal to fix the gain in a way that compensates an amount of change in the sum of gains.

2. An optical amplifying device according to claim 1, wherein gain forms of said first gain block and of said second gain block are previously set, and a gain wavelength characteristic at an output stage of said gain equalizer is monotonically increased or decreased.

3. An optical amplifying device amplifying a WDM optical signal, comprising:

a first gain block constructed of a first amplifying medium doped with an active substance for optical amplification and of a first optical pumping light source unit for emitting excitation light, said first gain block serving to effect the optical amplification;

a second gain block constructed of a second amplifying medium doped with an active substance for the optical amplification and of a second optical pumping light source unit for emitting the excitation light, said second gain block serving to effect the optical amplification;

a gain equalizer executing a wavelength equalizing process of an optical signal outputted from said first gain block;

a filter for, in the case of exciting said first optical pumping light source unit by excitation power serving as an amplification operating level of said first amplifying medium at the time of a maximum wavelength count of the optical signal, monotonically increasing or decreasing a gain wavelength characteristic of the optical signal outputted from said gain equalizer via said first gain block;

a variable optical attenuator, disposed between said first gain block and said second gain block, fixing a gain by adjusting an optical attenuation quantity based on an attenuation quantity setting signal;

a first excitation control unit generating a piece of wavelength count information by recognizing a wavelength count from power of the optical signal to be inputted and for, if there is a change in the wavelength count, setting said first optical pumping light source unit to emit the excitation power needed to get the same amplifying operating level of said first amplifying medium as at the time of the maximum wavelength count when allocating wavelengths after the change in the wavelength count at an equal interval in a wavelength range;

a wavelength allocation bias estimation unit previously storing wavelength equi-allocation power of the optical signal when allocating the wavelengths after the change in the wavelength count at the equal interval in the wavelength range, recognizing the wavelength count based on the wavelength count information, comparing a present monitor value of the optical power after outputting of said filter with the wavelength equi-allocation power associated with the recognized wavelength count, and thus estimating a wavelength allocation bias occurred as a concomitant of the change in the wavelength count;

a primary gradient quantity calculation unit obtaining a primary gradient quantity defined as a gain deviation from the wavelength allocation bias;

a second excitation control unit setting, in said second optical pumping light source unit, the excitation power required for canceling the primary gradient quantity, and changing a sum of gains of said first gain block and of said second gain block; and an attenuation quantity control unit controlling said variable optical attenuator by obtaining an optical attenuation quantity that should be adjusted from the present monitor value and outputting the attenuation quantity setting signal to fix the gain in a way that compensates an amount of change in the sum of gains.

4. An optical amplifying device amplifying a WDM optical signal, comprising:

a first gain block constructed of a first amplifying medium doped with an active substance for optical amplification and of a first optical pumping light source unit for emitting excitation light, said first gain block serving to effect the optical amplification;

a second gain block constructed of a second amplifying medium doped with an active substance for the optical amplification and of a second optical pumping light source unit for emitting the excitation light, said second gain block serving to effect the optical amplification;

a gain equalizer for, in the case of exciting said first optical pumping light source unit by excitation power serving as an amplification operating level of said first amplifying medium at the time of a maximum wavelength count of the optical signal, monotonically increasing or decreasing a gain wavelength characteristic of the optical signal outputted from said first gain block;

a variable optical attenuator, disposed between said first gain block and said second gain block, fixing a gain by adjusting an optical attenuation quantity based on an attenuation quantity setting signal;

a first excitation control unit causing said first optical pumping light source unit to emit such excitation power as to fix a monitor value with respect to the optical signal outputted from said first gain block;

a wavelength allocation bias estimation unit recognizing a wavelength count from power of the optical signal to be inputted and for, if there is a change in the wavelength count, setting, as reference excitation power, the excitation power needed to get the same amplifying operating level of said first amplifying medium as at the time of the maximum wavelength count when allocating wavelengths after the change in the wavelength count at an equal interval in a wavelength range, comparing such monitor value fixing excitation power of excitation light as to fix the monitor value with the reference excitation power, and thus estimating a wavelength allocation bias occurred as a concomitant of the change in the wavelength count;

a primary gradient quantity calculation unit obtaining a primary gradient quantity defined as a gain deviation from the wavelength allocation bias;

a second excitation control unit setting, in said second optical pumping light source unit, the excitation power required for canceling the primary gradient quantity, and changing a sum of gains of said first gain block and of said second gain block; and an attenuation quantity control unit controlling said variable optical attenuator by obtaining an optical attenuation quantity that should be adjusted from the monitor value fixing excitation power and outputting the attenuation quantity setting signal to fix the gain in a way that compensates an amount of change in the sum of gains.

5. An optical amplifying device according to claim 4, wherein gain forms of said first gain block and of said second gain block are previously set, and a gain wavelength characteristic at an output stage of said gain equalizer is monotonically increased or decreased.

6. An optical amplifying device amplifying a WDM optical signal, comprising:

a first gain block constructed of a first amplifying medium doped with an active substance for optical amplification and of a first optical pumping light source unit for emitting excitation light, said first gain block serving to effect the optical amplification;

a second gain block constructed of a second amplifying medium doped with an active substance for the optical amplification and of a second optical pumping light source unit for emitting the excitation light, said second gain block serving to effect the optical amplification;

a gain equalizer executing a wavelength equalizing process of an optical signal outputted from said first gain block;

a filter for, in the case of exciting said first optical pumping light source unit by excitation power serving as an amplification operating level of said first amplifying medium at the time of a maximum wavelength count of the optical signal, monotonically increasing or decreasing a gain wavelength characteristic of the optical signal outputted from said gain equalizer via said first gain block;

a variable optical attenuator, disposed between said first gain block and said second gain block, fixing a gain by adjusting an optical attenuation quantity based on an attenuation quantity setting signal;

a first excitation control unit causing said first optical pumping light source unit to emit such excitation light as to fix a monitor value with respect to the optical signal outputted from said first gain block;

a wavelength allocation bias estimation unit recognizing a wavelength count from power of the optical signal to be inputted and for, if there is a change in the wavelength count, setting, as reference excitation power, the excitation power needed to get the same amplifying operating level of said first amplifying medium as at the time of the maximum wavelength count when allocating wavelengths after the change in the wavelength count at an equal interval in a wavelength range, comparing such monitor value fixing excitation power of excitation light as to fix the monitor value with the reference excitation power, and thus estimating a wavelength allocation bias occurred as a concomitant of the change in the wavelength count;

a primary gradient quantity calculation unit obtaining a primary gradient quantity defined as a gain deviation from the wavelength allocation bias;

a second excitation control unit setting, in said second optical pumping light source unit, the excitation power required canceling the primary gradient quantity, and changing a sum of gains of said first gain block and of said second gain block; and an attenuation quantity control unit controlling said variable optical attenuator by obtaining an optical attenuation quantity that should be adjusted from the monitor value fixing excitation power and outputting the attenuation quantity setting signal to fix the gain in a way that compensates an amount of change in the sum of gains.

7. A gain control method of controlling a gain of an optical signal when in WDM transmission, with respect to a first gain block constructed of a first amplifying medium doped with an active substance for optical amplification and of a first optical pumping light source unit emitting excitation light and serving to effect the optical amplification, and with respect to a second gain block constructed of a second amplifying medium doped with an active substance for the optical amplification and of a second optical pumping light source unit for emitting the excitation light and serving to effect the optical amplification, said method comprising:

monotonically increasing or decreasing a gain wavelength characteristic of the optical signal outputted from said first gain block by use a gain equalizer in the case of exciting said first optical pumping light source unit by excitation power serving as an amplification operating level of said first amplifying medium at the time of a maximum wavelength count of the optical signal;

generating a piece of wavelength count information by recognizing a wavelength count from power of the optical signal to be inputted and, if there is a change in the wavelength count, setting said first optical pumping light source unit to emit the excitation power needed to get the same amplifying operating level of said first amplifying medium as at the time of the maximum wavelength count when allocating wavelengths after the change in the wavelength count at an equal interval in a wavelength range;

previously storing wavelength equi-allocation power of the optical signal when allocating the wavelengths after the change in the wavelength count at the equal interval in the wavelength range, recognizing the wavelength count based on the wavelength count information, comparing a present monitor value of the optical power after outputting of said gain equalizer with the wavelength equi-allocation power associated with the recognized wavelength count, and thus estimating a wavelength allocation bias occurred as a concomitant of the change in the wavelength count;

obtaining a primary gradient quantity defined as a gain deviation from the wavelength allocation bias;

setting, in said second optical pumping light source unit, the excitation power required for canceling the primary gradient quantity and changing a sum of gains of said first gain block and of said second gain block; and disposing a variable optical attenuator between said first gain block and said second gain block, and controlling said variable optical attenuator by obtaining an optical attenuation quantity that should be adjusted from the present monitor value to fix the gain in a way that compensates an amount of change in the sum of gains.

8. A gain control method of controlling a gain of an optical signal when in WDM transmission, with respect to a first gain block constructed of a first amplifying medium doped with an active substance for optical amplification and of a first optical pumping light source unit for emitting excitation light and serving to effect the optical amplification, and with respect to a second gain block constructed of a second amplifying medium doped with an active substance for the optical amplification and of a second optical pumping light source unit for emitting the excitation light and serving to effect the optical amplification, said method comprising:

monotonically increasing or decreasing a gain wavelength characteristic of the optical signal outputted from said first gain block by use a gain equalizer in the case of exciting said first optical pumping light source unit by excitation power serving as an amplification operating level of said first amplifying medium at the time of a maximum wavelength count of the optical signal;

causing said first optical pumping light source unit to emit such excitation light as to fix the monitor value with respect to the optical signal outputted from said first gain block;

recognizing a wavelength count from power of the optical signal to be inputted and for, if there is a change in the wavelength count, setting, as reference excitation power, the excitation power needed to get the same amplifying operating level of said first amplifying medium as at the time of the maximum wavelength count when allocating wavelengths after the change in the wavelength count at an equal interval in a wavelength range, comparing such monitor value fixing excitation power of excitation light as to fix the monitor value with the reference excitation power, and thus estimating a wavelength allocation bias occurred as a concomitant of the change in the wavelength count;

obtaining a primary gradient quantity defined as a gain deviation from the wavelength allocation bias;

setting, in said second optical pumping light source unit, the excitation power required for canceling the primary gradient quantity and changing a sum of gains of said first gain block and of said second gain block; and disposing a variable optical attenuator between said first gain block and said second gain block, and controlling said variable optical attenuator by obtaining an optical attenuation quantity that should be adjusted from the monitor value fixing excitation power and outputting the attenuation quantity setting signal to fix the gain in a way that compensates an amount of change in the sum of gains.

9. An optical amplifying device amplifying a WDM optical signal, comprising:

a first gain block constructed of a first amplifying medium doped with an active substance for optical amplification and of a first optical pumping light source unit for emitting excitation light, said first gain block serving to effect the optical amplification;

a second gain block constructed of a second amplifying medium doped with an active substance for the optical amplification and of a second optical pumping light source unit for emitting the excitation light, said second gain block serving to effect the optical amplification;

a gain equalizer for, in the case of exciting said first optical pumping light source unit by excitation power serving as an amplification operating level of said first amplifying medium at the time of a maximum wavelength count of the optical signal, monotonically increasing or decreasing a gain wavelength characteristic of the optical signal outputted from said first gain block;

a first excitation control unit recognizing a wavelength count from power of the optical signal to be inputted and for, if there is a change in the wavelength count, setting said first optical pumping light source unit to emit the excitation power needed to get the same amplifying operating level of said first amplifying medium as at the time of the maximum wavelength count when allocating wavelengths after the change in the wavelength count at an equal interval in a wavelength range;

a wavelength allocation bias estimation unit previously storing wavelength equi-allocation power of the optical signal when allocating the wavelengths after the change in the wavelength count at the equal interval in the wavelength range, recognizing the wavelength count based on the wavelength count information, comparing a monitor value of power of the optical signal outputted from said gain equalizer with the wavelength equi-allocation power associated with the recognized wavelength count, and thus estimating a wavelength allocation bias occurred as a concomitant of the change in the wavelength count;

an ASE (Amplified Spontaneous Emission) correction quantity determining unit obtaining an ASE correction quantity from the wavelength allocation bias; and a second excitation control unit setting said second optical pumping light source unit to emit the excitation power required for executing the ASE correction based on the ASE correction quantity, and changing a sum of gains of said first gain block and of said second gain block.

10. An optical amplifying device according to claim 9, wherein gain forms of said first gain block and of said second gain block are previously set, and a gain wavelength characteristic at an output stage of said gain equalizer is monotonically increased or decreased.

11. An optical amplifying device amplifying a WDM optical signal, comprising:
- a first gain block constructed of a first amplifying medium doped with an active substance for optical amplification and of a first optical pumping light source unit for emitting excitation light, said first gain block serving to effect the optical amplification;
- a second gain block constructed of a second amplifying medium doped with an active substance for the optical amplification and of a second optical pumping light source unit for emitting the excitation light, said second gain block serving to effect the optical amplification;
- a gain equalizer executing a wavelength equalizing process of the optical signal outputted from said first gain block;
- a filter for, in the case of exciting said first optical pumping light source unit by excitation power serving as an amplification operating level of said first amplifying medium at the time of a maximum wavelength count of the optical signal, monotonically increasing or decreasing a gain wavelength characteristic of the optical signal outputted from said gain equalizer via said first gain block;
- a first excitation control unit recognizing a wavelength count from power of the optical signal to be inputted and for, if there is a change in the wavelength count, setting said first optical pumping light source unit to emit the excitation power needed to get the same amplifying operating level of said first amplifying medium as at the time of the maximum wavelength count when allocating wavelengths after the change in the wavelength count at an equal interval in a wavelength range;
- a wavelength allocation bias estimation unit previously storing wavelength equi-allocation power of the optical signal when allocating the wavelengths after the change in the wavelength count at the equal interval in the wavelength range, recognizing the wavelength count based on the wavelength count information, comparing a monitor value of power of the optical signal outputted from said filter with the wavelength equi-allocation power associated with the recognized wavelength count, and thus estimating a wavelength allocation bias occurred as a concomitant of the change in the wavelength count;
- an ASE correction quantity determining unit obtaining an ASE correction quantity from the wavelength allocation bias; and
- a second excitation control unit setting said second optical pumping light source unit to emit the excitation power required for executing the ASE correction based on the ASE correction quantity, and changing a sum of gains of said first gain block and of said second gain block.

12. An optical amplifying device amplifying a WDM optical signal, comprising:
- a first gain block constructed of a first amplifying medium doped with an active substance for optical amplification and of a first optical pumping light source unit for emitting excitation light, said first gain block serving to effect the optical amplification;
- a second gain block constructed of a second amplifying medium doped with an active substance for the optical amplification and of a second optical pumping light source unit for emitting the excitation light, said second gain block serving to effect the optical amplification;
- a gain equalizer for, in the case of exciting said first optical pumping light source unit by excitation power serving as an amplification operating level of said first amplifying medium at the time of a maximum wavelength count of the optical signal, monotonically increasing or decreasing a gain wavelength characteristic of the optical signal outputted from said first gain block;
- a first excitation control unit controlling said first optical pumping light source unit to output monitor value fixing excitation power to fix the monitor value with respect to the optical signal outputted from said gain equalizer;
- a wavelength allocation bias estimation unit recognizing a wavelength count from power of the optical signal to be inputted and for, if there is a change in the wavelength count, setting, as reference excitation power, the excitation power needed to get the same amplifying operating level of said first amplifying medium as at the time of the maximum wavelength count when allocating wavelengths after the change in the wavelength count at an equal interval in a wavelength range, comparing the monitor value fixing power with the reference excitation power, and thus estimating a wavelength allocation bias occurred as a concomitant of the change in the wavelength count;
- an ASE correction quantity determining unit obtaining an ASE correction quantity from the wavelength allocation bias; and
- a second excitation control unit setting said second optical pumping light source unit to emit the excitation power required for executing the ASE correction based on the ASE correction quantity, and changing a sum of gains of said first gain block and of said second gain block.

13. An optical amplifying device according to claim 12, wherein gain forms of said first gain block and of said second gain block are previously set, and a gain wavelength characteristic at an output stage of said gain equalizer is monotonically increased or decreased.

14. An optical amplifying device according to any one of claims 9 through 13, further comprising a gain fluctuation determining unit previously storing a primary gradient characteristic occurred in an output and obtaining a quantity of the gain fluctuation from the wavelength allocation bias and from the primary gradient characteristic,
- wherein said second excitation control unit sets said second optical pumping light source unit to emit the excitation power necessary for restraining the gain fluctuation, and changes a sum of gains of said first gain block and of said second gain block.

15. An optical amplifying device amplifying a WDM optical signal, comprising:
- a first gain block constructed of a first amplifying medium doped with an active substance for optical amplification and of a first optical pumping light source unit for emitting excitation light, said first gain block serving to effect the optical amplification;
- a second gain block constructed of a second amplifying medium doped with an active substance for the optical amplification and of a second optical pumping light source unit for emitting the excitation light, said second gain block serving to effect the optical amplification;
- a gain equalizer for, in the case of exciting said first optical pumping light source unit by excitation power serving as an amplification operating level of said first amplifying medium at the time of a maximum wavelength count of the optical signal, monotonically increasing or decreasing a gain wavelength characteristic of the optical signal outputted from said first gain block;

a first excitation control unit recognizing a wavelength count from power of the optical signal to be inputted and for, if there is a change in the wavelength count, setting said first optical pumping light source unit to emit the excitation power needed to get the same amplifying operating level of said first amplifying medium as at the time of the maximum wavelength count when allocating wavelengths after the change in the wavelength count at an equal interval in a wavelength range;

a wavelength allocation bias estimation unit previously storing wavelength equi-allocation power of the optical signal when allocating the wavelengths after the change in the wavelength count at the equal interval in the wavelength range, recognizing the wavelength count based on the wavelength count information, comparing a monitor value of power of the optical signal outputted from said gain equalizer with the wavelength equi-allocation power associated with the recognized wavelength count, and thus estimating a wavelength allocation bias occurred as a concomitant of the change in the wavelength count;

a gain fluctuation determining unit previously storing a primary gradient characteristic occurred in an output and obtaining a quantity of the gain fluctuation from the wavelength allocation bias and from the primary gradient characteristic; and a second excitation control unit setting said second optical pumping light source-unit to emit the excitation power necessary for restraining the gain fluctuation, and changing a sum of gains of said first gain block and of said second gain block.

16. An optical amplifying device according to claim 15, wherein gain forms of said first gain block and of said second gain block are previously set, and a gain wavelength characteristic at an output stage of said gain equalizer is monotonically increased or decreased.

17. An optical amplifying device amplifying a WDM optical signal, comprising:

a first gain block constructed of a first amplifying medium doped with an active substance optical amplification and of a first optical pumping light source unit for emitting excitation light, said first gain block serving to effect the optical amplification;

a second gain block constructed of a second amplifying medium doped with an active substance for the optical amplification and of a second optical pumping light source unit for emitting the excitation light, said second gain block serving to effect the optical amplification;

a gain equalizer executing a wavelength equalizing process of the optical signal outputted from said first gain block;

a filter for, in the case of exciting said first optical pumping light source unit by excitation power serving as an amplification operating level of said first amplifying medium at the time of a maximum wavelength count of the optical signal, monotonically increasing or decreasing a gain wavelength characteristic of the optical signal outputted from said gain equalizer via said first gain block;

a first excitation control unit recognizing a wavelength count from power of the optical signal to be inputted and for, if there is a change in the wavelength count, setting said first optical pumping light source unit to emit the excitation power needed to get the same amplifying operating level of said first amplifying medium as at the time of the maximum wavelength count when allocating wavelengths after the change in the wavelength count at an equal interval in a wavelength range;

a wavelength allocation bias estimation unit previously storing wavelength equi-allocation power of the optical signal when allocating the wavelengths after the change in the wavelength count at the equal interval in the wavelength range, recognizing the wavelength count based on the wavelength count information, comparing a monitor value of power of the optical signal outputted from said filter with the wavelength equi-allocation power associated with the recognized wavelength count, and thus estimating a wavelength allocation bias occurred as a concomitant of the change in the wavelength count;

a gain fluctuation determining unit previously storing a primary gradient characteristic occurred in an output and obtaining a quantity of the gain fluctuation from the wavelength allocation bias and from the primary gradient characteristic; and a second excitation control unit setting said second optical pumping light source unit to emit the excitation power necessary for restraining the gain fluctuation, and changing a sum of gains of said first gain block and of said second gain block.

18. An optical amplifying device amplifying a WDM optical signal, comprising:

a first gain block constructed of a first amplifying medium doped with an active substance for optical amplification and of a first optical pumping light source unit for emitting excitation light, said first gain block serving to effect the optical amplification;

a second gain block constructed of a second amplifying medium doped with an active substance for the optical amplification and of a second optical pumping light source unit for emitting the excitation light, said second gain block serving to effect the optical amplification;

a gain equalizer for, in the case of exciting said first optical pumping light source unit by excitation power serving as an amplification operating level of said first amplifying medium at the time of a maximum wavelength count of the optical signal, monotonically increasing or decreasing a gain wavelength characteristic of the optical signal outputted from said first gain block;

a first excitation control unit controlling said first optical pumping light source unit to output monitor value fixing excitation power to fix the monitor value with respect to the optical signal outputted from said first gain block;

a wavelength allocation bias estimation unit recognizing a wavelength count from power of the optical signal to be inputted and for, if there is a change in the wavelength count, setting, as reference excitation power, the excitation power needed to get the same amplifying operating level of said first amplifying medium as at the time of the maximum wavelength count when allocating wavelengths after the change in the wavelength count at an equal interval in a wavelength range, comparing the monitor value fixing power with the reference excitation power, and thus estimating a wavelength allocation bias occurred as a concomitant of the change in the wavelength count;

a gain fluctuation determining unit previously storing a primary gradient characteristic occurred in an output and obtaining a quantity of the gain fluctuation from the wavelength allocation bias and from the primary gradient characteristic; and a second excitation control unit setting said second optical pumping light source unit to emit the excitation power necessary for restraining the gain fluctuation, and changing a sum of gains of said first gain block and of said second gain block.

19. An optical amplifying device according to claim 18, wherein gain forms of said first gain block and of said second gain block are previously set, and a gain wavelength characteristic at an output stage of said gain equalizer is monotonically increased or decreased.

20. An optical apparatus comprising:

a first amplifying medium doped with an active substance for optical amplification;

a first light source for emitting excitation light to said first amplifying medium;

a gain equalizer inputting an optical signal outputted from said first amplifying medium;

a second amplifying medium doped with an active substance for optical amplification;

a second light source for emitting excitation light to said second amplifying medium;

a variable optical attenuator, disposed between said first amplifying medium and said second amplifying medium;

a first monitor monitoring the power of the input light of the first amplifying medium; and a second monitor monitoring the power of the output light of the gain equalizer, wherein an wavelength allocation bias of a multiplexed optical signal in an input signal is estimated by the first monitor and the second monitor, and the first light source and the second light source are controlled based on the estimated wavelength allocation bias.

21. An apparatus comprising:

a first amplifying medium inputting an optical signal so that the inputted optical signal travels through the first amplifying medium;

a first light source providing excitation light to the first amplifying medium so that the optical signal is optically amplified as the optical signal travels through the first amplifying medium;

a gain equalizer modifying a gain wavelength characteristic of the amplified optical signal, to thereby output amplified optical signal having the gain wavelength characteristic modified;

a second amplifying medium through which the optical signal travels after having the gain wavelength characteristic modified by the gain equalizer;

a second light source providing excitation light to the second amplifying medium so that the optical signal is optical amplified as the optical signal travels through the second amplifying medium; and means for estimating a wavelength allocation bias of the optical signal based on monitoring a power of the optical signal as input in the first amplifying medium, and a power of the optical signal as output from the gain equalizer, and for controlling the first light source and the second light source based on the estimated wavelength allocation bias.

* * * * *

UNITED STATES PATENT AND TRADEMARK OFFICE
CERTIFICATE OF CORRECTION

| | |
|---|---|
| PATENT NO. | : 7,236,294 B2 |
| APPLICATION NO. | : 11/069015 |
| DATED | : June 26, 2007 |
| INVENTOR(S) | : Tomoaki Takeyama et al. |

It is certified that error appears in the above-identified patent and that said Letters Patent is hereby corrected as shown below:

Column 45, Line 32 change "source-unit" to --source unit--.

Column 48, Line 15, after "output" insert --the--.

Signed and Sealed this

Sixth Day of November, 2007

JON W. DUDAS
*Director of the United States Patent and Trademark Office*